United States Patent
Kuroda et al.

(10) Patent No.: US 10,473,823 B2
(45) Date of Patent: Nov. 12, 2019

(54) FINE STRUCTURE, OPTICAL MEMBER, ANTIREFLECTION FILM, WATER-REPELLENT FILM, SUBSTRATE FOR MASS SPECTROMETRY, PHASE PLATE, PROCESS FOR PRODUCING FINE STRUCTURE, AND PROCESS FOR PRODUCING ANTIREFLECTION FILM

(71) Applicant: CANON KABUSHIKI KAISHA, Tokyo (JP)

(72) Inventors: Kazuyuki Kuroda, Tokyo (JP); Shin Kitamura, Machida (JP); Hirokatsu Miyata, Hadano (JP); Masahiko Takahashi, Hachioji (JP); Yosuke Kanno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 685 days.

(21) Appl. No.: 14/407,605

(22) PCT Filed: Jul. 3, 2013

(86) PCT No.: PCT/JP2013/068801
§ 371 (c)(1),
(2) Date: Dec. 12, 2014

(87) PCT Pub. No.: WO2014/007401
PCT Pub. Date: Jan. 9, 2014

(65) Prior Publication Data
US 2015/0160377 A1 Jun. 11, 2015

(30) Foreign Application Priority Data

Jul. 4, 2012 (JP) .................................. 2012-150232
May 17, 2013 (JP) .................................. 2013-105491

(51) Int. Cl.
| | | |
|---|---|---|
| *G02B 1/118* | (2015.01) | |
| *G02B 1/18* | (2015.01) | |
| *G02B 27/00* | (2006.01) | |

(52) U.S. Cl.
CPC .............. *G02B 1/118* (2013.01); *G02B 1/18* (2015.01); *G02B 27/0006* (2013.01); *G02B 2207/107* (2013.01); *Y10T 428/24355* (2015.01)

(58) Field of Classification Search
CPC .............. G02B 1/118; G02B 27/0006; G02B 2207/107; Y10T 428/24355
See application file for complete search history.

(56) References Cited

U.S. PATENT DOCUMENTS

| | | |
|---|---|---|
| 6,288,390 B1 | 9/2001 | Siuzdak et al. |
| 6,846,546 B2 | 1/2005 | Kuroda et al. |

(Continued)

FOREIGN PATENT DOCUMENTS

| | | |
|---|---|---|
| CN | 102460227 A | 5/2012 |
| EP | 2 065 736 A1 | 6/2009 |

(Continued)

OTHER PUBLICATIONS

Translation to English JP2008158293. accessed Oct. 19, 2017. (Year: 2008).*

(Continued)

*Primary Examiner* — Nancy R Johnson
(74) *Attorney, Agent, or Firm* — Venable LLP

(57) ABSTRACT

Provided are an antireflection film having a high antireflection effect and a production process therefor, an optical member excellent in antireflection effect, a water-repellent film having excellent water repellency, a substrate for mass spectrometry having high detection sensitivity, a high-accuracy phase plate, and a fine structure that can be used in the (Continued)

foregoing and a production process therefor. The fine structure is a structure, including multiple conical portions on a surface thereof, in which the conical portions have a mesostructure; and the mesostructure includes a structure having mesopores.

23 Claims, 24 Drawing Sheets

(56) References Cited

U.S. PATENT DOCUMENTS

| | | | |
|---|---|---|---|
| 7,391,018 | B2 | 6/2008 | Niu et al. |
| 7,413,792 | B2 | 8/2008 | Miyata et al. |
| 7,755,038 | B2 | 7/2010 | Niu et al. |
| 7,776,398 | B2 | 8/2010 | Miyata et al. |
| 8,328,371 | B2 | 12/2012 | Taniguchi |
| 8,384,998 | B2 | 2/2013 | Taguchi et al. |
| 8,435,899 | B2 | 5/2013 | Miyata et al. |
| 8,747,994 | B2 | 6/2014 | Imaoku et al. |
| 9,158,038 | B2 | 10/2015 | Taguchi et al. |
| 9,291,748 | B2 | 3/2016 | Momoki et al. |
| 2003/0102286 | A1 | 6/2003 | Takahara et al. |
| 2006/0128155 | A1 | 6/2006 | Miyata et al. |
| 2008/0160257 | A1 | 7/2008 | Takada et al. |
| 2008/0196624 | A1 | 8/2008 | Chiang et al. |
| 2009/0081429 | A1* | 3/2009 | Lee .................. B01J 23/52 428/212 |
| 2011/0128664 | A1 | 6/2011 | Coue et al. |
| 2011/0198214 | A1 | 8/2011 | Miyata et al. |
| 2011/0242662 | A1 | 10/2011 | Momoki et al. |
| 2011/0317270 | A1 | 12/2011 | Minoura et al. |
| 2012/0087012 | A1 | 4/2012 | Imaoku et al. |

FOREIGN PATENT DOCUMENTS

| | | |
|---|---|---|
| JP | 2000-071290 A | 3/2000 |
| JP | 2001-272505 A | 10/2001 |
| JP | 2004-294565 A | 10/2004 |
| JP | 2005-157119 A | 6/2005 |
| JP | 2006-010831 A | 1/2006 |
| JP | 2008-513781 A | 5/2008 |
| JP | 2008-158293 A | 7/2008 |
| JP | 2009-037878 A | 2/2009 |
| JP | 2009-215104 A | 9/2009 |
| JP | 2009-242475 A | 10/2009 |
| JP | 2010-180113 A | 8/2010 |
| JP | 2010-186198 A | 8/2010 |
| JP | 2010-188584 A | 9/2010 |
| JP | 2011-063482 A | 3/2011 |
| KR | 10-2009-0101396 A | 9/2009 |
| WO | 2010/032610 A1 | 3/2010 |
| WO | 2010/064715 A1 | 6/2010 |
| WO | 2010/122924 A1 | 10/2010 |
| WO | 2011/013401 A1 | 2/2011 |

OTHER PUBLICATIONS

First Office Action in Chinese Application No. 201380043698.9 (dated Sep. 14, 2015).
Xiao Li et al., "Porous Polymer Films with Gradient-Refractive-Index Structure for Broadband and Omnidirectional Antireflection Coatings," 20 Adv. Funct. Mater. 259-265 (Dec. 2009).
Chih-Hsun Hsu et al., "Generally Applicable Self-Masked Dry Etching Technique for Nanotip Array Fabrication," 4(3) Nano Lett. 471-475 (Feb. 2004).
Saleem H. Zaidi et al., "Characterization of Random Reactive Ion Etched-Textured Silicon Solar Cells," 48(6) IEEE Trans. Electron Devices 1200-1206 (Jun. 2001).
Third Office Action in Chinese Application No. 201380043698.9 (dated Sep. 26, 2016).
Second Office Action in Chinese Application No. 201380043698.9 (dated Mar. 17, 2016).
Lauri Sainiemi et al., "Non-Reflecting Silicon and Polymer Surfaces by Plasma Etching and Replication," 23(1) Adv. Mater. 122-126 (Oct. 2010).
Kyoo-Chul Park et al., "Nanotextured Silica Surfaces with Robust Superhydrophobicity and Omnidirectional Broadband Supertransmissivity," 6(5) ACS Nano 3789-3799 (Apr. 2012).
Cheng-Tai Chen et al., "Desorption/Ionization Mass Spectrometry on Nanocrystalline Titania Sol-Gel-Deposited Films," 18(17) Rapid Communications in Mass Spectrometry 1956-1964 (Sep. 2004).
K. S. W. Sing et al., "Reporting Physisorption Data for Gas/Solid Systems with Special Reference to the Determination of Surface Area and Porosity," 57(4) Pure & Appl. Chem. 603-619 (1985).
Ying-Bing Jiang et al., "Nanometer-Thick Conformal Pore Sealing of Self-Assembled Mesoporous Silica by Plasma-Assisted Atomic Layer Deposition," 128 (34) J. Am. Chem. Soc. 11018-11019 (Aug. 2006).
Extended European Search Report in European Application No. 13813172.7 (dated Jun. 20, 2016).
Official Action in Russian Application No. 2015103481 (dated Apr. 25, 2016).

* cited by examiner

FIG. 5A
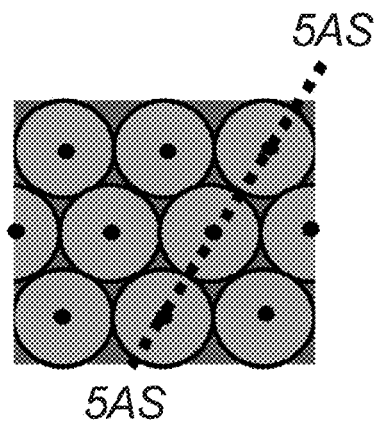
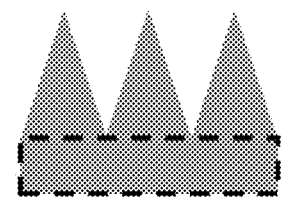
FIG. 5AS
FIG. 5B
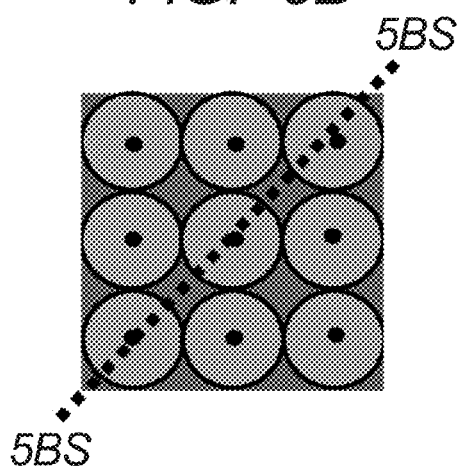
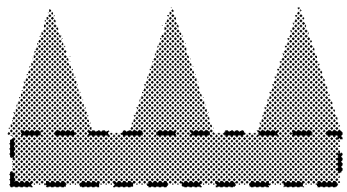
FIG. 5BS
FIG. 5C
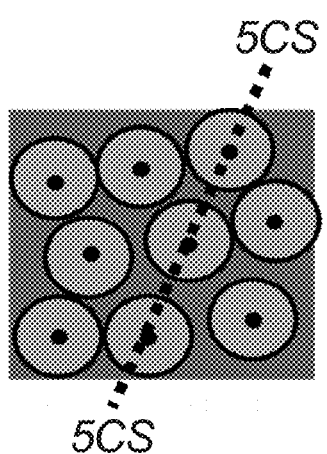
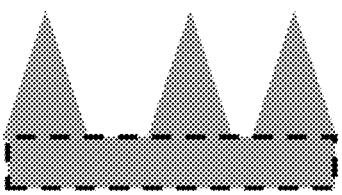
FIG. 5CS

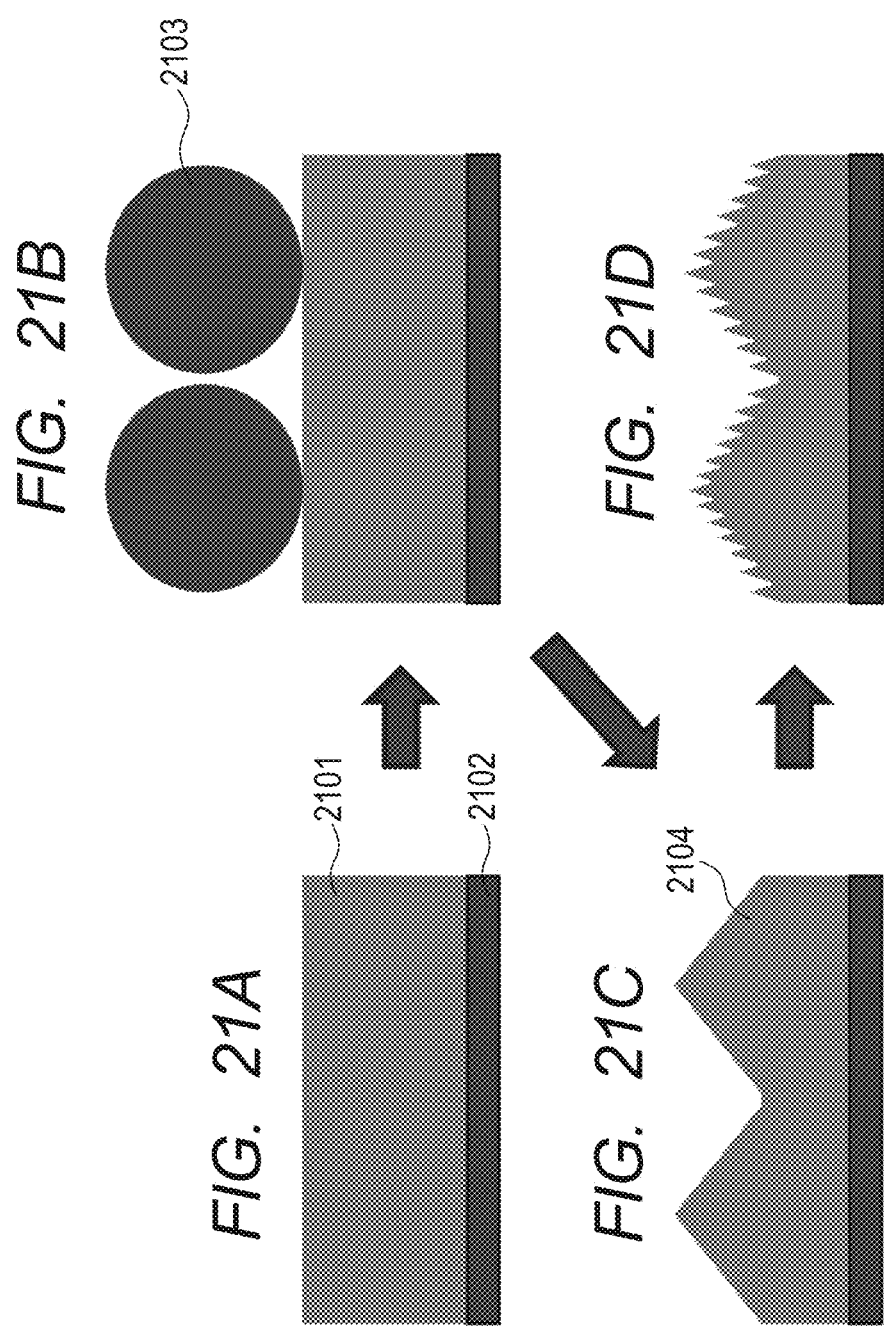

FIG. 24
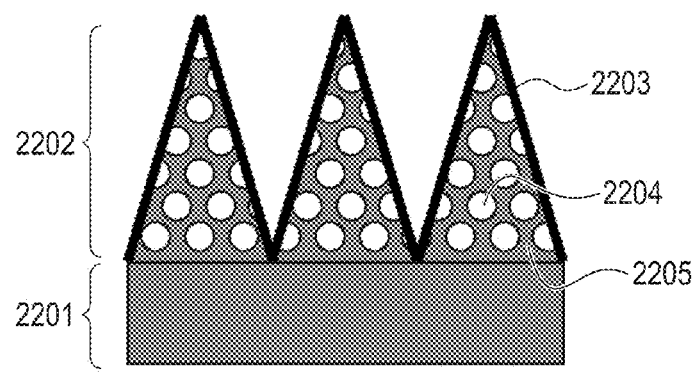
FIG. 25A  FIG. 25B  FIG. 25C
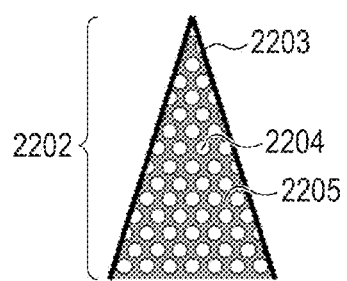 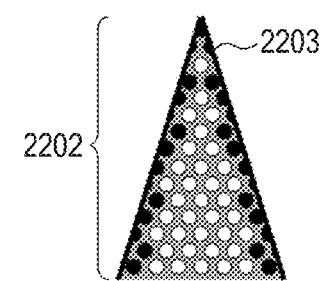 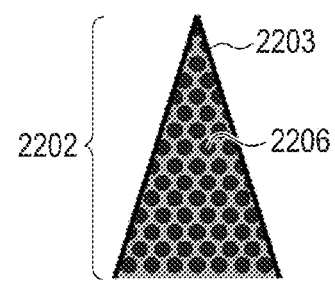

FINE STRUCTURE, OPTICAL MEMBER, ANTIREFLECTION FILM, WATER-REPELLENT FILM, SUBSTRATE FOR MASS SPECTROMETRY, PHASE PLATE, PROCESS FOR PRODUCING FINE STRUCTURE, AND PROCESS FOR PRODUCING ANTIREFLECTION FILM

TECHNICAL FIELD

The present invention relates to a fine structure having multiple conical portions or salient portions to be used in various applications such as an antireflection material, a sensor, a super-water-repellent material, and a super-hydrophilic material, an optical member, an antireflection film, a water-repellent film, a substrate for mass spectrometry, a phase plate, and to a process for producing a structure, and to a process for producing an antireflection film.

BACKGROUND ART

A structure having multiple fine salient portions of a scale smaller than the wavelength of light (hereinafter also referred to as "fine structure") has heretofore been used as various structural materials such as a super-water-repellent material, a super-hydrophilic material, a battery material, an antifriction material, and an antireflection material.

Processes for producing such fine structure having multiple fine salient portions of a scale smaller than the wavelength of light can be roughly classified into the following three processes:
(1) a process involving forming a product to serve as a mask on a product to be processed in advance and then etching the product to be processed (involving a mask-placing step and an etching step);
(2) a process involving etching a product to be processed (involving only the etching step); and
(3) a process involving subjecting the product to be processed to transfer molding with a fine structure produced by the process (1), (2), or the like as a mold.

Production by a semiconductor process including a main lithography technology has been attempted as the conventional production example (1) including the mask-placing step and the etching step (Patent Literature 3). The process involves: applying a resist to a substrate to be used in fine structure formation; exposing and developing the resist through a photomask to provide a mask pattern; and transferring the mask pattern onto the substrate for fine structure formation through etching. The lithography technology is advantageous as a process by which a precisely designed fine pattern can be formed (Patent Literature 1).

A technology involving spontaneously forming the mask pattern without employing the lithography technology has also been proposed. For example, there has been disclosed a technology by which a fine structure of a scale smaller than the wavelength of light can be easily produced with fine particles arranged on a substrate, an island-shaped metal thin film, or the like as a mask (Patent Literatures 2 and 3).

A phenomenon in which a needle shape is formed in an Si plasma etching (reactive ion etching) process has been known as the conventional production example (2) formed "only of the etching step," and the material is called "black silicon" (Non Patent Literature 1).

For example, a process involving transferring a fine protrusion shape onto a photocurable resin or the like with a carbon material having fine protrusions, which is formed by using a plasma etching apparatus as a mold has been proposed as the conventional production example (3) involving transferring the fine structure as a mold (Patent Literature 4).

In particular, when the shapes of the salient portions in the fine structure are cone shapes, i.e., the salient portions is of such a shape that the area of a cross section perpendicular to a direction from its bottom portion to its tip reduces along the direction, the fine structure can be used as, for example, an antireflection film, a water-repellent film, a super-hydrophilic film, a substrate for mass spectrometry, a battery material, or an antifriction material.

A technology involving suppressing reflection with a light interference effect obtained by laminating one or more optical films each having a refractive index different from that of a substrate so that the thickness of the laminate may be several tens to several hundreds of nanometers is general as a technology concerning an antireflection film. A vacuum deposition process such as vapor deposition or sputtering, or a wet deposition process such as dip coating or spin coating is employed for forming the optical films. Such general antireflection film has a light beam incident angle of 0° and is designed to have an excellent antireflection effect in a wavelength region where the film is used, which is a relatively narrow wavelength region. However, an antireflection film to be used in, for example, a lens having a large aperture or a lens having a surface with a small radius of curvature is desired to have an excellent antireflection function for a wide wavelength region and to have a good incident angle characteristic for light flux. The arrangement of a fine structure whose pitch is shorter than the wavelength of incident light (referred to as, for example, "sub-wavelength structure (SWS)" or "moth-eye structure") has been known as an antireflection measure available in a wide wavelength region and having a good incident angle characteristic (Patent Literatures 5 and 6). In particular, when the fine structure has a sharpened structure, a volume occupied by a substance in a space gradually increases from the upper portion of a salient structure to its lower portion, and hence an abrupt change in refractive index at an interface is suppressed. As a result, the reflection is largely reduced.

The fact that a film having, on its surface, a fine structure formed of multiple salient portions shows high water repellency has been known as a lotus effect (Patent Literature 7 and Non Patent Literature 2). Such super water repellency that the contact angle of a water droplet at the surface of the film exceeds 150° can be realized by properly designing conditions such as the shapes, arrangement, and hydrophobic modification groups of the salient portions. The film showing such super water repellency has been expected to find applications in, for example, surface coating for various optical members and building members.

The film having, on its surface, the fine structure formed of the multiple salient portions can be used as a substrate for mass spectrometry as well. The foregoing is a technology involving holding a material to be analyzed on a semiconductor thin film having the fine structure, applying laser or an ion beam to ionize the object to be analyzed without destroying its structure, and measuring its mass with high sensitivity to identify a component of the material, and the technology has been known as surface-assisted laser desorption/ionization mass spectrometry (SALDI-MS) similar to matrix-assisted mass spectrometry (Patent Literature 8). The fine structure on the surface of the substrate mainly has a role of preventing the destruction of the specimen sample in association with the ionization and hence needs to be of a size of about 10 nm. Porous silicon produced by the anodization of silicon is most general as the substrate to be used in surface-assisted laser desorption/ionization mass spectrometry. In addition, for example, a titanium oxide thin film having a fine structure on its surface, the thin film being produced by causing a polyethylene glycol to coexist or by a sol-gel process, has been proposed as a material capable of solving the problem of the deterioration of a characteristic resulting from a reduction in electric conductivity of the porous silicon due to oxidation in air (Non Patent Literature 3). Random-shaped fine pores of about 10 nm are present in the titanium oxide thin film to be used in the foregoing and these fine pores each mainly have a role of preventing the destruction of the specimen sample in association with the ionization.

CITATION LIST

Patent Literature

PTL 1: Japanese Patent Application Laid-Open No. 2001-272505
PTL 2: Japanese Patent Application Laid-Open No. 2000-71290
PTL 3: Japanese Patent Application Laid-Open No. 2009-215104
PTL 4: Japanese Patent Application Laid-Open No. 2010-186198
PTL 5: Japanese Patent Application Laid-Open No. 2005-157119
PTL 6: Japanese Patent Application Laid-Open No. 2006-10831
PTL 7: Japanese Patent Application Laid-Open No. 2010-188584
PTL 8: U.S. Pat. No. 6,288,390

Non Patent Literature

NPL 1: Adv. Mater. 2011, 23, 122-126
NPL 2: ACS NANO, 6, 2012, 3789-3799
NPL 3: Rapid Communication in Mass Spectrometry, 18, 1956-1964

SUMMARY OF INVENTION

Technical Problem

However, the prior art has involved several problems.

First, a problem concerning the production of the fine structure having multiple salient portions is as described below. In the case of the process involving forming the product to serve as a mask on the product to be processed in advance and then etching the product to be processed, a step for mask arrangement is needed, and hence the production process is complicated and it is difficult to produce the fine structure at a low cost. In addition, the production process involving only etching without the use of any mask has involved the following problem: its applications are limited because the number of applicable materials is extremely small. For example, the black silicon or carbon having a fine structure cannot be applied as an antireflection film for a member like a lens because none of the materials allows visible light to permeate therethrough. Accordingly, a technology of forming multiple cone-shaped and fine salient portions on a wide variety of materials, in particular, a transparent and stable material having a wide band gap without using any mask has been required.

In addition, in such a water-repellent material film reported heretofore that only the surface of each salient portion is provided with hydrophobic chemical modification, a cross-sectional portion to be newly exposed upon destruction of a salient portion shape due to the application of an external force to the surface of the film does not have any hydrophobic modification group. As a result, the following problem has arisen: a site where water repellency deteriorates in a remarkable manner locally occurs in the film surface. Accordingly, a water-repellent material film whose water repellency does not reduce even when a ruptured surface occurs has been required.

In addition, a conventional substrate for mass spectrometry having a fine structure on its surface has involved the following problem. The size of the structure is remarkably small as compared with the wavelength of a probe (laser light or the like) to be used in ionization and hence the reflection of probe light at the surface of the film reduces energy to be injected into the film, and as a result, ionization efficiency is reduced in some cases. Accordingly, there has been required a technology by which the morphology of a film can be subjected to microprocessing so that the reflection can be prevented while a fine structure having a role of preventing the destruction of a specimen sample in association with the ionization is held.

Further features of the present invention will become apparent from the following description of exemplary embodiments with reference to the attached drawings.

Solution to Problem

An exemplary embodiment of the present invention relates to a fine structure, comprising multiple conical portions on a surface thereof, in which: the conical portions have a mesostructure; and the mesostructure comprising a structure having mesopores.

Another exemplary embodiment of the present invention relates to a fine structure, comprising multiple salient portions on a surface thereof, in which: the salient portions have such a shape that an area of a cross section when the salient portions are cut by a plane perpendicular to a direction from a bottom of the salient portion to a tip thereof reduces along the direction; the salient portions have a mesostructure having mesopores; a metal element is present at the tip of the salient portions; and when a length of a bottom line of the salient portions is represented by D and a height of the salient portions is represented by H, a ratio H/D is 2.0 or more.

Another exemplary embodiment of the present invention relates to an antireflection film, including a fine structure having multiple salient portions on a surface thereof, in which: the salient portions each have a mesostructure; the mesostructure is a structure having mesopores; and the salient portions have such a shape that an area of a cross section when the salient portions are cut by a plane perpendicular to a direction from a bottom of the salient portions to a tip thereof reduces along the direction.

Another exemplary embodiment of the present invention relates to a process for producing a fine structure, including subjecting an inorganic oxide to plasma etching with a reactive gas without use of a mask to form, on the inorganic oxide, multiple salient portions an average interval between the tips of which is 400 nm or less and each having such a shape that an area of a cross section when the salient portions are cut by a plane perpendicular to a direction from a bottom thereof to a tip thereof reduces along the direction.

Another exemplary embodiment of the present invention relates to a process for producing a fine structure, including: forming a mesostructure having mesopores; and reactive gas to form, on the mesostructure, multiple salient portions having such a shape that an area of a cross section when the salient portions are cut by a plane perpendicular to a direction from a bottom thereof to a tip thereof reduces along the direction.

Another exemplary embodiment of the present invention relates to a process for producing a fine structure, including: forming a mesostructured material having mesopores; and subjecting the mesostructured material to plasma etching while depositing, on the surface of the mesostructured, a substance having a material constituting part of an etching chamber of a plasma etching apparatus to form a structure having multiple salient portions having such a shape that an area of a cross section when the salient portions are cut by a plane perpendicular to a direction from a bottom thereof to a tip thereof reduces along the direction.

Another exemplary embodiment of the present invention relates to a process for producing a fine structure having multiple salient portions, including: forming a first layer formed with a mesostructure having mesopores;
forming, on a surface of the first layer, a second layer formed with a material having an etching rate smaller than that of the first layer; subjecting the second layer to first plasma etching without use of a mask to form multiple salient portions on the second layer; and subjecting the first layer to second plasma etching through the salient portions of the second layer to form, on the first layer, multiple salient portions having such a shape that an area of a cross section when the salient portions are cut by a plane perpendicular to a direction from a bottom thereof to a tip thereof reduces along the direction.

Advantageous Effects of Invention

According to the present invention, there can be provided an antireflection film having a high antireflection effect and a production process therefor, an optical member excellent in antireflection effect, a water-repellent film having excellent water repellency, a substrate for mass spectrometry having high detection sensitivity, a high-accuracy phase plate, and a structure that can be used in the foregoing and a production process therefor.

Further features of the present invention will become apparent from the following description of exemplary embodiments with reference to the attached drawings.

BRIEF DESCRIPTION OF DRAWINGS

FIGS. 5A, 5B, 5C, 5AS and 5BS and 5CS are each a schematic view for illustrating the arrangement of multiple salient portions in the structure described in the first embodiment.

FIGS. 21A, 21B, 21C and 21D are each a schematic view for illustrating the step of producing a water-repellent film having multiple irregular shapes different from each other in period and size described in Example 33.

FIG. 24 is a schematic view of a structure having a protective layer on its surface.

FIGS. 25A, 25B and 25C are each a schematic view of a structure having a protective layer on its surface.

DESCRIPTION OF EMBODIMENTS

Hereinafter, the present invention is described in detail by way of examples of embodiments of the present invention.
First Embodiment First, a first embodiment of the present invention is described.

Figure 1A:
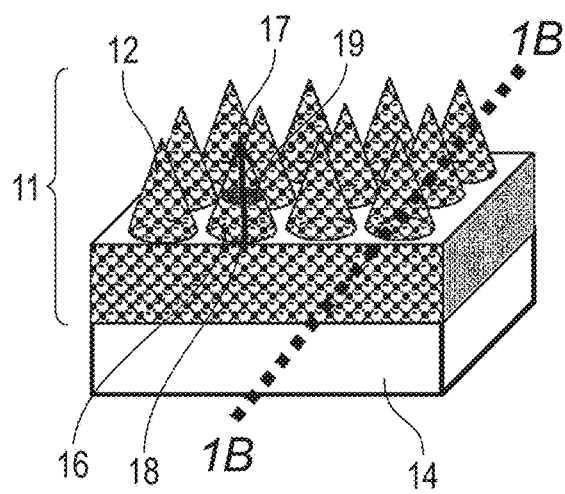
FIGS. 1A, 1B and 1C are each a schematic view for illustrating the structure of a structure described in a first embodiment and a production procedure therefor.
Figure 1B:
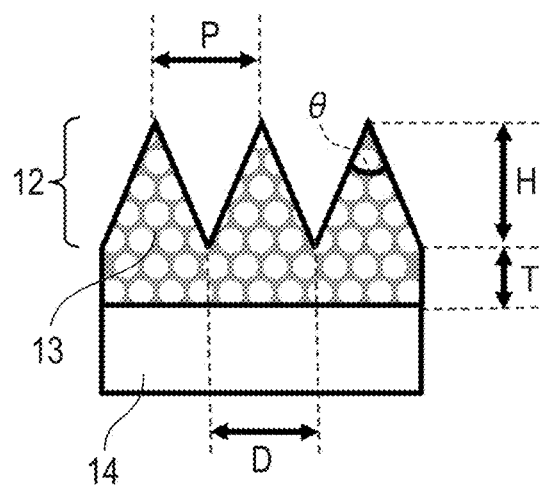
Figure 1C:
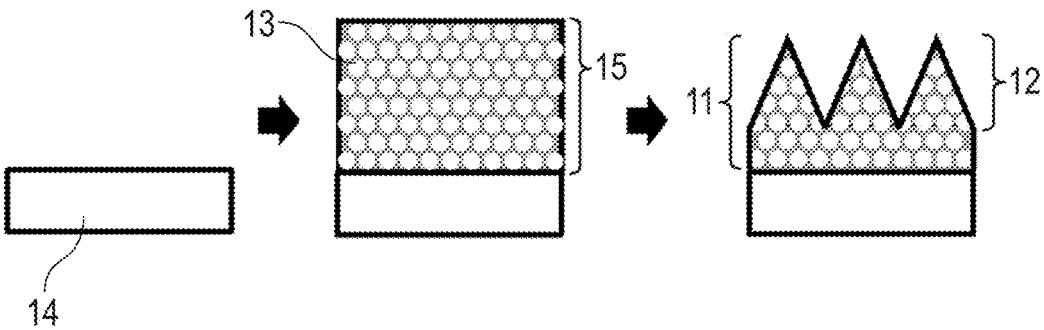

FIGS. 1A to 1C each illustrate a schematic view of a structure according to this embodiment. FIG. 1A is a single view drawing of the structure and FIG. 1B is a sectional view upon cutting of the structure of FIG. 1A in a cross section 1B-1B.

A structure 11 of this embodiment is a structure having multiple salient portions 12 on its surface, the salient portions 12 have a mesostructure, and the mesostructure is a structure having mesopores 13.

The structure 11 forms a mesostructure having (including) the mesopores 13. The term "mesopore" as used herein refers to a pore having a diameter of 2 nm or more and less than 50 nm according to the definition of the International Union of Pure and Applied Chemistry. The diameter of the pore means the diameter of the pore in a cross section where the cross-sectional area of the pore becomes smallest. When the cross section of the pore is circular, the diameter refers to the diameter of the circle, and when the shape of the cross section is a polygon, the diameter refers to the maximum of the lengths of the diagonals of the polygon. When the cross-sectional shape is indeterminate, the maximum span diameter in the cross-sectional shape is defined as the pore diameter. In addition, the mesostructure refers to a structure obtained by placing the mesopore in a matrix formed of a material forming a pore wall (hereinafter sometimes described as a wall portion). As described later, the inside of the mesopore may be a void (hollow), or an organic material or an inorganic material may be present in the mesopore. Here, in the present invention and the description, a structure in the case where the mesopore is hollow is referred to as "mesoporous material." The porosity of the mesoporous material is preferably 20% or more and 80% or less. It should be noted that, needless to say, the porosity range of 30% or more to 65% or less is included in the range of the porosity of the mesoporous material of 20% or more to 80% or less.

Figure 26A:
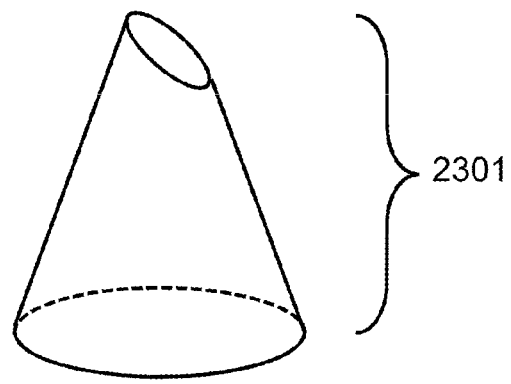
FIGS. 26A, 26B and 26C are each a view illustrating such a shape that the tip of a cone is partially lacked.
Figure 26B:
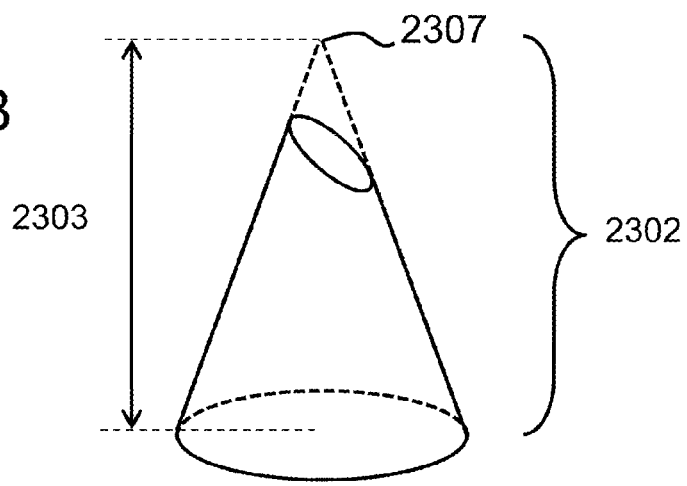
Figure 26C:
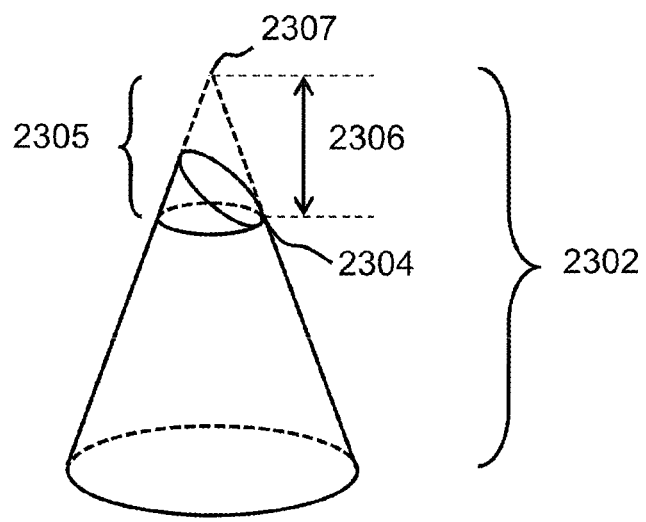

The structure 11 of this embodiment has such multiple salient portions 12 as illustrated in FIGS. 1A to 1C. The salient portions 12 form such a shape that the area of a cross section when the salient portions 12 are cut by a plane 19 perpendicular to a direction 18 from a bottom portion 16 to a tip 17 reduces along the direction 18 (in other words, such a shape that the cross-sectional area perpendicular to the direction from the bottom portion 16 to the tip 17 reduces along the direction). It should be noted that when a hollow portion forming part of a mesopore is present in the cross section obtained by cutting the salient portion in the surface 19, the area of the hollow portion is included in the area of the cut cross section. Although the salient portions 12 are each preferably a conical portion of such a cone shape that the area of its tip portion is substantially 0 or such a shape that the tip of a cone is partially lacked, the area is not necessarily needed to reduce monotonically along the direction 18, and the salient portion may partially have a distorted shape as long as the salient portion is of a cone shape or a shape that can be approximated to a cone. It should be noted that a region where the cross-sectional area perpendicular to the direction 18 from the bottom portion 16 to the tip 17 does not change (is equal) along the direction toward the direction may be partially present. In addition, the salient portions may be of such a shape that its tip is split (the tip is split into multiple portions). It should be noted that in the following description, the expression "conical potion" is defined to include both of such cone shape that the area of the tip portion is substantially 0 and such shape that the tip of the cone is partially lacked. The expression "such shape that the tip of the cone is partially lacked" as described herein is defined as the following shape: when a height 2303 of a virtual cone A 2302 (illustrated in FIG. 26B) formed when a conical surface 2301 illustrated in FIG. 26A is extended is defined as 1, a height 2306 of a virtual cone B 2305 including, in its bottom face, a point 2304 most distant from the apex of the virtual cone A of the lacking portion and having the same apex 2307 as the apex of the virtual cone A as illustrated in FIG. 26C is 1/7 or less. When the salient portions have such shape, the apparent refractive index real part of the structure 11 reduces along the direction 18.

When the length of the bottom line of the salient portions 12 of the structure 11 is represented by D and the height of the salient portions 12 is represented by H, a ratio H/D (hereinafter sometimes described as an aspect ratio) is preferably 1/2 or more, more preferably 1.0 or more, still more preferably 3.0 or more, most preferably 5.0 or more. When the salient portions 12 are conical portions, a ratio H/D of 1/2 or more can effectively suppress the reflection of an electromagnetic wave upon formation of an antireflection film with the structure. When the salient portions 12 are not conical portions, a ratio H/D of 1.0 or more can effectively suppress the reflection. It should be noted that a ratio H/D of 1/2 or more means that an apex angle θ of each salient portion in the cross-sectional projection view of the structure of this embodiment illustrated in FIG. 1B is an acute angle. As the ratio H/D increases, a better antireflection characteristic is obtained in many cases. However, when the ratio H/D is excessively large, the mechanical strength of the structure may reduce. Accordingly, the ratio H/D is preferably 12 or less in view of the strength.

Here, the bottom line D represents the shortest distance of a line segment passing the position of the center of gravity of the bottom face which is of the shape of the bottom portion 16 and connecting two points on its outer periphery. In addition, the bottom portion represents a shape formed by making a round around the end of each salient portion, in other words, is a shape surrounded by a boundary line between the salient portions.

In addition, the height H of the salient portions 12 represents the length of a line segment connecting the tip 17 of the salient portion 12 and the center of the bottom portion 16. It should be noted that when the end portion of the line segment connecting the tip 17 and the center of the bottom portion 16 is not present in the bottom portion 16, the height H is defined as the length of a line segment pulled down perpendicularly from the tip 17 of the salient portions 12 to a flat surface including the bottom portion 16.

It should be noted that when the tip of the salient portions forms a split shape, the bottom line D of the bottom portion and the height H are calculated by setting, in a cross-sectional SEM image of the salient portions, multiple virtual cones formed by extending conical surfaces from the respective apexes to the point of intersection of a salient portion including the apex and another salient portion adjacent thereto up to the height of the point of intersection closest to the base body of multiple point of intersections in the cross-sectional SEM image of the salient portions.

The height H of the salient portions 12 is preferably 50 nm or more, more preferably 100 nm or more, most preferably 200 nm or more.

An average interval (p in FIG. 1B) between the tips 17 (average tip-to-tip interval) of the salient portions 12 is preferably 400 nm or less. When the average interval between the tips of the salient portions 12 becomes larger than the value, the scattering of light becomes remarkable, which may lead to a reduction in performance in the case of an optical application.

With regard to the shapes of the salient portions 12, it is preferred that the average interval between the tips 17 be 400 nm or less, the height H(H in FIG. 1B) be 50 nm or more, and the ratio H/D be 1.0 or more. It is more preferred that the average interval between the tips 17 be 100 nm or less, the height H be 50 nm or more, and the ratio H/D be 3.0 or more. It is still more preferred that the average interval between the tips 17 be 100 nm or less, the height H be 300 nm or more, and the ratio H/D be 3.0 or more.

Any arrangement can be used as the arrangement of the salient portions in the structure of this embodiment. Examples thereof include such arrangement as hexagonal close-packed arrangement as illustrated in FIG. 5A (FIG. 5AS is a 5AS-5AS cross section of FIG. 5A), cubic close-packed arrangement (FIG. 5B) (FIG. 5BS is a 5BS-5BS cross section of FIG. 5B), and random arrangement (FIG. 5C) (FIG. 5CS is a 5CS-5CS cross section of FIG. 5C). In FIGS. 5A to 5C, a circle represents the contour of the bottom portion of each salient portion and a black dot at the center of the circle schematically represents the apex of the salient portion. The bottom face of the salient portion is not needed to be completely circular. The bottom face of that salient portion may be ellipse. The apex of that salient portion is not needed to be at the center of the contour of its bottom portion. In the arrangement of the salient portions schematically illustrated in FIGS. 5A to 5C and FIGS. 5AS to 5CS, each salient portion is independently formed as can be seen from the schematic view of its cross section.

Figure 6A:
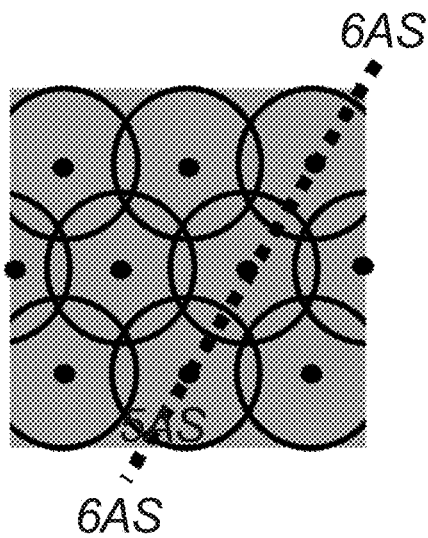
FIGS. 6A, 6B, 6AS and 6BS are each a schematic view for illustrating a situation where the multiple salient portions are formed in the structure described in the first embodiment.
Figure 6A:
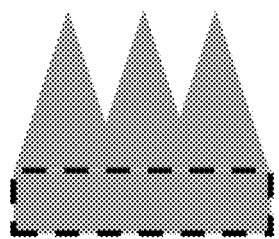
Figure 6B:
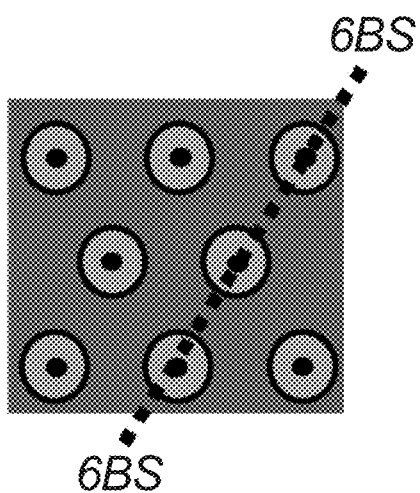
Figure 6B:
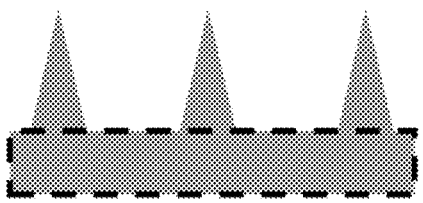

However, as illustrated in FIG. 6A, the salient portions of the structure of this embodiment may be arranged so that part of the ridge lines (or conical surfaces) of the adjacent salient portions may intersect each other in a portion above the surface of a base body (FIG. 6AS is a 6AS-6AS cross section of FIG. 6A). In addition, it is not necessarily the case that the bottom portions or ridge lines of the salient portions must be in contact with, or intersect, each other, but a salient portion and another salient portion may be out of contact with each other as illustrated in FIG. 6B (FIG. 6BS is a 6BS-6BS cross section of FIG. 6B). However, when the structure of this embodiment is used in an application such as an antireflection film to be described later, an increase in interval between a salient portion and another salient portion increases the ratio of a portion having a flat surface to the entire surface of the structure. As a result, a change in refractive index at an interface becomes abrupt, and the following problem may occur: an antireflection characteristic reduces. Such a construction as illustrated in FIG. 6A in which the ridges of the adjacent salient portions intersect each other in the portion above the surface of the base body is preferred for such application.

Figure 7A:
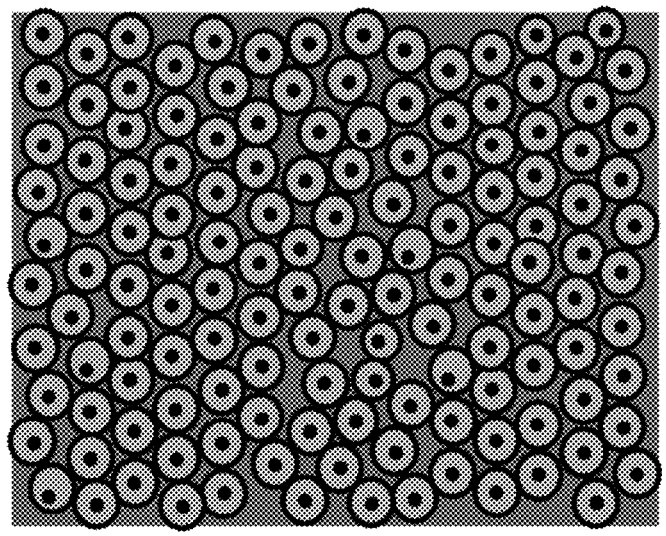
FIGS. 7A and 7B are each a schematic view for illustrating the distribution of the multiple salient portions in the structure described in the first embodiment in its surface.
Figure 7B:
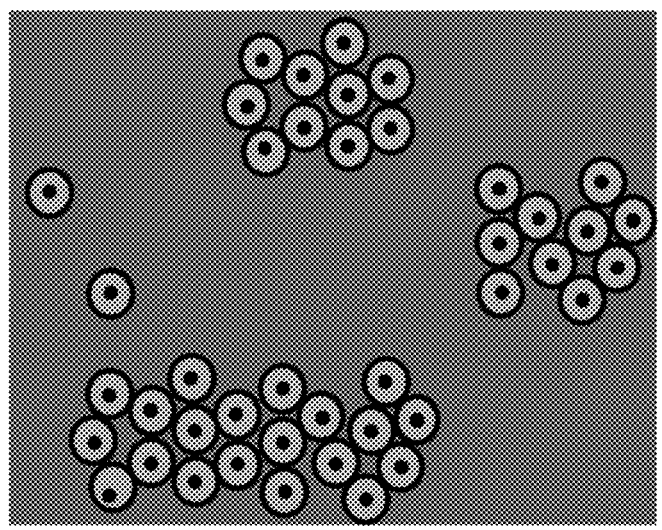

It is preferred that the salient portions in the structure of this embodiment be uniformly formed over the entirety of the structure. The term "uniform" as described herein refers to a state where the salient portions are distributed at a substantially constant density like FIG. 7A and refers to a state where a region where no salient portion is present is not formed in part of the structure unlike FIG. 7B. In FIGS. 7A and 7B, a circle represents the contour of the bottom portion of each salient portion and a black dot at the center of the circle schematically represents the apex of the salient portion. Specific uniformity is as described below. When the average interval between the tips of the salient portions is represented by p and a standard deviation in the distribution of the intervals between the tips is represented by σ, the following expression 1 is satisfied.

$$0.1 < \sigma/p < 0.5 \qquad \text{Expression 1}$$

The condition means the range within which the degree of a variation in interval between the respective salient portions falls with respect to the value for the average interval p. When the value is smaller than 0.1, the salient portions are arranged at a constant interval, which may cause an unpreferred interference effect. In addition, when the value is larger than 0.5, the wide distribution of the formation positions of the salient portions may appear as the unevenness of an optical characteristic.

It should be noted that the calculation of the tip interval is based on the following process: the coordinates of each tip portion are acquired through image processing of an electron microscope photograph obtained by photographing a fine structure from just above the structure and then a distance between the tips of the respective salient portions is obtained by Delaunay triangulation (process involving forming a triangle using the coordinates of the respective given tip portions as apexes and performing division under such a condition that the circumscribed circle of the triangle does not include any point except the apexes). Electron microscope photographs each having a field of view of 1 μm are taken at twenty sites impartially in a region where the fine structure has been formed, and then the average interval p and the standard deviation σ are determined by calculating the distance between the respective tips.

The mesopores in the structure of this embodiment are preferably of cylindrical shapes and preferably have a uniform diameter. It is more preferred that the mesopores be of cylindrical shapes and have a uniform diameter. In such case, a process involving filling a material into a hollow mesopore to be described later is facilitated and the amount of the material to be filled into the mesopore is easily adjusted. Here, the phrase "having a uniform diameter" as used in the present invention and the description is defined as follows: the diameter of a mesopore observed with an electron microscope falls within a size in the range of ±50% with respect to the average of the diameters of the mesopores.

Figure 2A:
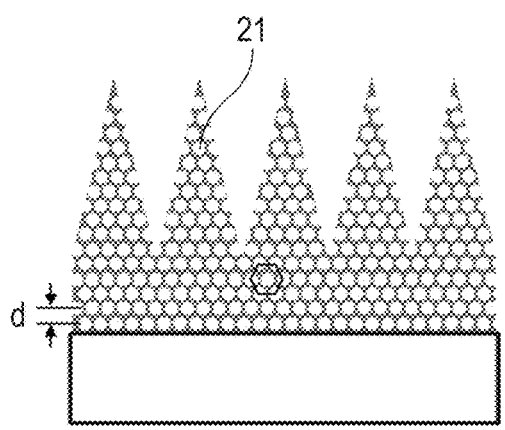
FIGS. 2A and 2B are each a schematic view of the structure described in the first embodiment constituted of a mesostructure having a structure in which cylindrical pores having a uniform diameter are regularly arranged.
Figure 2B:
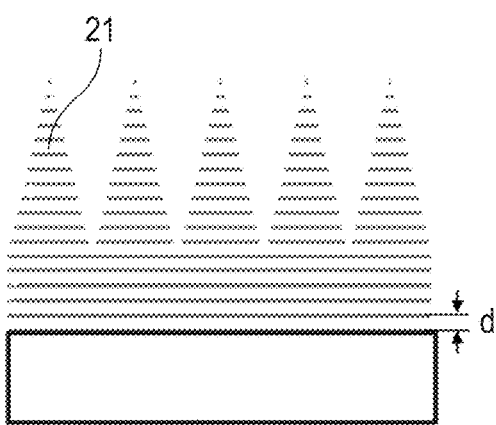

However, it is not necessarily the case that an effect of the present invention is not obtained unless the shapes of the mesopores are cylindrical. Mesopores of various shapes such as a spherical shape, an elliptical sphere shape, and a rod shape are also practicable. As schematically illustrated in FIGS. 2A and 2B, when the mesopores are of cylindrical shapes, a cylindrical mesopore 21 is oriented parallel to the base body in many cases. FIG. 2A is a schematic view when the cylindrical mesopore is viewed from the longitudinal direction of the mesopore and FIG. 2B is a schematic view when the mesopore is viewed from a direction perpendicular to the longitudinal direction, but the direction of the cylindrical mesopore may not be controlled in the structure. From the viewpoint of the uniformity of refractive index, it is preferred that the cylindrical mesopores having a uniform diameter be periodically arranged in the structure. The case where the mesopores (pores) are regularly arranged like hexagonal packing in which the mesopores form such arrangement as represented by a hexagon as illustrated in FIG. 2A is given as an example in which the mesopores are periodically arranged in the structure. The arrangement of the mesopores is not limited to the hexagonal packing and such arrangement that the pores form a rectangle or a square is also practicable.

The regular arrangement is preferably such that a diffraction peak corresponding to a periodic structure of 1.0 nm or more is observed when the structure of the preset invention having the mesostructure is analyzed by X-ray diffraction analysis, and is more preferably such that a diffraction peak corresponding to a periodic structure of 5.0 nm or more is observed. It should be noted that the arrangement in which a diffraction peak corresponding to a periodic structure of 1.0 nm or more is observed means that a structural period d specified by the regular arrangement of the pores as illustrated in FIGS. 2A and 2B is 1.0 nm or more. Even when the mesopores are not of cylindrical shapes, it is preferred that the mesopores be regularly arranged and the arrangement is preferably such that a diffraction peak corresponding to a periodic structure of 5.0 nm or more is observed in X-ray diffraction analysis. However, it is not necessarily the case that the effect of the present invention is not obtained unless the mesopores are regularly arranged, and the mesopores of the structure of this embodiment may be of, for example, such a structure that the cylindrical mesopores are irregularly linked.

Figure 3:
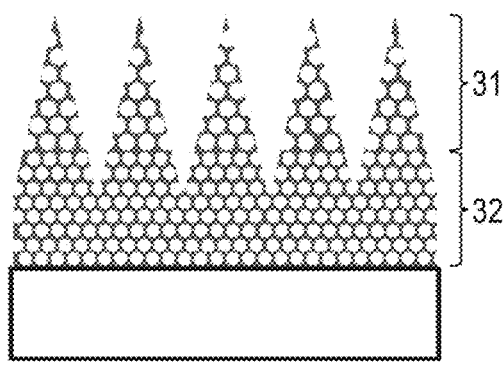
FIG. 3 is a schematic view of the structure constituted of multiple mesostructures having different structures in the first embodiment.

When the structure having the mesostructure of this embodiment is constituted of multiple mesostructures 31, 32 having different structures as illustrated in FIG. 3, the structure can be provided with a change in refractive index by changing, in one salient portion, the abundance of an organic compound or inorganic compound present in a mesopore near the bottom portion of the salient portion and a mesopore near its tip portion as described later. The term "different structures" as described herein means that there is a difference in any one of the structural parameters such as a mesopore diameter, the arrangement of the mesopores, and an interval between the mesopores. Although FIG. 3 schematically illustrates the case where the diameter of a mesopore near the tip of a salient portion is larger than the diameter of a mesopore at the bottom portion of the salient portion, the multiple mesostructures having different structures in the present invention are not limited to structures different from each other in mesopore diameter.

A substance containing a metal, a nitride, a carbide, a fluoride, a boride, an oxide, or the like as a component can be used as a substance constituting the wall portion (matrix forming the mesopores) of the structure of this embodiment. When the structure of the present invention is used in an optical material such as an antireflection film, the substance constituting the wall portion is preferably a material transparent to visible light and having a large band gap, and a material having a band gap in the range of 2.5 eV or more to 10 eV or less is preferably used. Examples thereof include silicon oxide, titanium oxide, tin oxide, zirconium oxide, niobium oxide, tantalum oxide, aluminum oxide, tangstain oxide, hafnium oxide, and zinc oxide. Of those, in consideration of stability of the material, silicon oxide, zirconium oxide, and titanium oxide are particularly preferably used. In addition, when the material constituting the wall portion is titanium oxide, it is preferred that at least part of the titanium oxide be crystallized. This is because of the following reasons. When at least part of titanium oxide is crystallized, the refractive index of the material for the wall portion can be additionally increased as compared with that in the case where titanium oxide is not crystallized. In addition, the properties of titanium oxide as an optical semiconductor are significantly exerted. It should be noted that the degree of crystallization of titanium oxide can be measured by, for example, X-ray diffraction analysis.

With regard to the mesopores 13 in the structure of this embodiment, the inside of the mesopores may be a void (hollow), or an organic material or an inorganic material may be present in the mesopores. Here, needless to say, the phrase "the organic material or the inorganic material is present in the mesopore" includes the case where only the organic material is present in the mesopore, the case where only the inorganic material is present, the case where the organic material and the inorganic material such as an organic-inorganic hybrid material are present, and the case where the organic material and/or the inorganic material and any other material are present. In addition, when the organic material or the inorganic material is present in the mesopores, the organic material or the inorganic material has only to be present in at least some of the mesopores, and such situation includes the case where the organic material or the inorganic material is present in a state of being completely filled into some of the multiple mesopores and the case where most of the multiple mesopores are mesopores each having the organic material or the inorganic material present in part of the inside thereof. It should be noted that in the present invention, even the case where all the multiple mesopores are completely filled with the organic material or the inorganic material is included in the concept "the mesostructure has mesopores" because the mesostructure has the mesopores, in which the organic material or the inorganic material is present.

Examples of the organic material present in the mesopores include an amphipathic substance to be used as a structure-directing agent upon production of the mesostructure to be described later, a high-molecular weight material such as a polymer, and a monomeric material having a molecular weight of less than 10,000.

In addition, an example in which the organic material has hydrophobic functional groups and the surface of a mesopore is chemically modified with the hydrophobic functional groups is given as an example in which the organic material is present in the mesopores. In such case, as described later, the form of a structure having multiple salient portions to be formed can be controlled. Here, the hydrophobic functional group in the present invention and the description is defined as the following functional group: when a clean surface of a fused quartz substrate is modified with the compound to a saturation level, the contact angle of water at the surface after the modification is larger than 90°. Examples of such hydrophobic functional groups include alkyl groups and fluoroalkyl groups.

The inorganic material present in the mesopores can be selected from a wide variety of materials such as a conductive material, an insulating material, and a semiconductor material.

An inorganic material using, for example, a metal, a nitride, a carbide, a fluoride, a boride, or an oxide as a main component can be used as the inorganic material. The inorganic material may be of single composition, may be a mixture of two or more kinds, or may be a composite material. When the structure of this embodiment is used in an optical material such as an antireflection film, the inorganic material present in the mesopores is preferably a material having a large band gap and being transparent to visible light, and a material having a band gap in the range of 2.5 eV or more to 10 eV or less is particularly preferably used. Examples thereof include silicon oxide, titanium oxide, tin oxide, zirconium oxide, niobium oxide, tantalum oxide, aluminum oxide, tangstain oxide, hafnium oxide, and zinc oxide. Of those, in consideration of high transparency of the material, silicon oxide, zirconium oxide, and titanium oxide are particularly preferably used in terms of optical application.

Figure 4A:
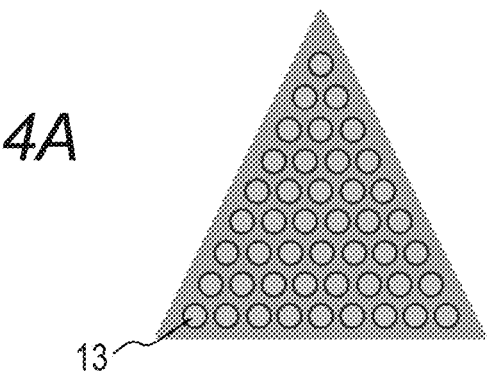
FIGS. 4A, 4B, 4C and 4D are each a schematic view for illustrating the state of the introduction of a material into a mesopore.
Figure 4B:
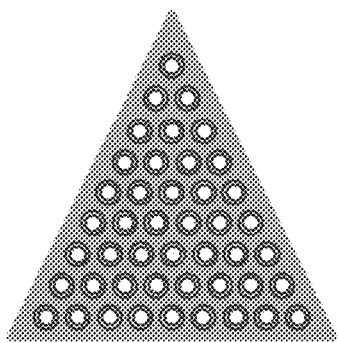

The inorganic material present in the mesopores may be included in the mesopores of the structure having the salient portions so as to be uniformly distributed as schematically illustrated in FIGS. 4A and 4B, or the filling amount of the inorganic material may be controlled so that the filling ratio of the inorganic material in the mesopores may reduce in a direction from the bottom portion of the salient portions to their tip, preferably so that the porosity may increase in a direction from the bottom portion of the salient portions to their tip. Such local change in filling ratio can be achieved by, for example, constituting the mesostructure forming the salient portions of multiple mesostructures having different structures as described in the foregoing (FIG. 4D).

Figure 4C:
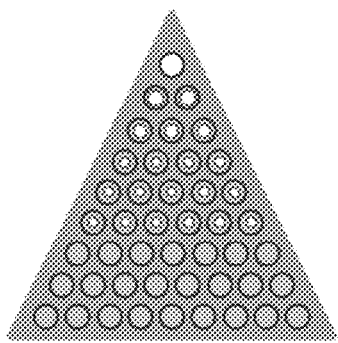
Figure 4D:
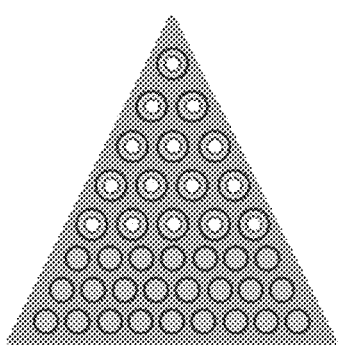

In the case of the structure in which the filling ratio of the inorganic material in the mesopores reduces in the direction from the bottom portion of the salient portions to their tip, the ratio "(amount of an element constituting the inorganic material)/(amount of an element constituting the structure having the mesostructure)" representing the local abundance ratio of the element constituting the inorganic material to the element constituting the material forming the structure having the mesostructure reduces in the direction from the bottom portion of the salient portions to their tip (FIG. 4C).

The ratio "(amount of the element constituting the inorganic material)/(amount of the element constituting the structure having the mesostructure)" can be determined by the in-depth analysis of photoelectron spectroscopy to be performed while ion sputtering is repeated.

It should be noted that, in the case of filling all the mesopores, a material constituting the wall portion is preferably different from a material present in the mesopores.

The structure of this embodiment is formed on a substrate in many cases. The material and shape of the substrate are not basically limited as long as the structure of the present invention can be formed thereon.

In addition, the structure of this embodiment may have a protective layer on its surface.

Hereinafter, the protective layer is described in detail.

FIG. 24 illustrates a schematic view of a structure formed of salient portions present on its surface. When salient portions 2202 formed on a substrate 2201 each have a protective layer 2203 on its surface, mesopores 2204 of the salient portions 2202 are shielded from the air containing moisture. As a result, the adsorption of moisture to the inside of a mesostructure forming the salient portions 2202 can be inhibited and hence a stable refractive index can be maintained. In addition, the arrival of moisture to the substrate 2201 through the mesopores 2204 is similarly inhibited. Accordingly, even when a substrate containing an oxide component such as an alkali metal oxide, an alkaline earth metal oxide, or boron oxide is used, the occurrence of clouding or whitening in association with the elution of such component can be prevented. It should be noted that the term "pore" as described herein includes a pore produced in a portion not completely filled with the organic material or the inorganic material when such material is filled into at least part of the inside of a pore. Similarly, the term "porosity" in the following description refers to the ratio of a pore to the entire volume in a state where the organic material or the inorganic material is filled when the organic material or the inorganic material is present in at least part of the inside of a pore.

A material having a porosity smaller than that of the salient portions having the pores is desirably selected as a material forming the protective layer for the purpose of suppressing the penetration of moisture into the salient portions. The magnitude of the porosity can be evaluated with, for example, an adsorption and desorption isotherm obtained by a nitrogen gas adsorption process in the presence or absence of the protective layer. The term "adsorption and desorption isotherm" as described herein refers to an isotherm in a category defined by the IUPAC and the isotherm is described in the literature "Pure Appl. Chem., Vol. 57, p. 603 (1985)." Specifically, in the case of only the salient portions with no protective layer or in the case where a protective layer having a porosity larger than that of the salient portions is formed on its surface, adsorption and desorption to the pores in the salient portions become dominant, and hence the isotherm shows the type IV adsorption-desorption behavior. On the other hand, when a protective layer having a porosity smaller than that of the salient portions is formed on its surface, adsorption-desorption behavior concerning the pores in the salient portions is inhibited by the protective layer. As a result, adsorption-desorption behavior to the surface of the protective layer becomes dominant, and hence the adsorption-desorption behavior shows the type II behavior or behavior close to the type II behavior.

Although the protective layer desirably covers the entire region of the surface of the salient portions having the mesopores, a region where the protective layer is not formed may be partially present for production convenience. Although an effect of the protective layer can be expected even in such case, the protective layer is desirably formed on at least 50% of the surface of the salient portions having the mesopores.

Hereinafter, the salient portion having the mesopores and the protective layer formed on its surface are described in more detail with reference to FIGS. 25A to 25C. Although the mesopores 2204 present in the salient portion are schematically illustrated in round shapes here, the shapes of the mesopores are not particularly limited and the mesopores may be linked to each other.

FIG. 25A is a schematic view illustrating an example of a structure having a protective layer. The protective layer 2203 is formed only on a surface portion in the salient portion 2202 including the mesopores 2204 and a porosity in the salient portion maintains a state before the formation of the protective layer. A plasma-assisted atomic layer deposition process described in, for example, "Journal of American Chemical Society Vol. 128, p. 11018 (2006)" can be used as a method to produce such structure.

FIG. 25B is a schematic view illustrating another example of the structure having the protective layer. When the mesopores are exposed to the outside in the surface of the salient portion 2202 having the mesopores and when these mesopores are continuous from the surface of the salient portion to a certain depth, a material to be formed into the protective layer 2203 penetrates mesopores corresponding to several layers from the surface to be filled in some cases. Even in such cases, the formed protective layer 2203 serves to block moisture in the air. Accordingly, such structure is practicable as long as a refractive index in the structure including the salient portion continuously reduces in a direction from the bottom face of the salient portion to its tip.

FIG. 25C is a schematic view illustrating still another example of the structure having the protective layer. This example is an example in which an organic material or an inorganic material is present in mesopores 2206 of the salient portion 2202 and the protective layer 2203 is formed on the surface of the salient portion. At this time, the material forming the protective layer 2203 is not particularly limited as long as the material has a porosity lower than the porosity of the salient portion before the formation of the protective layer. In addition, the material (the organic material or the inorganic material) present in the mesopores and the material forming the protective layer may be the same material. Such structure is easily obtained by, for example, forming the salient portion having the mesopores, filling the organic material or the inorganic material into the mesopores, and forming the protective layer on the surfaces of the mesopores. Deposition based on application such as a spin coating process or a dip coating process as well as a deposition approach with a general vacuum apparatus can be employed. In addition, the protective layer may be formed on the surface of the salient portion by employing the same material as the material (the organic material or the inorganic material) to be filled into the mesopores and the same process. In such case, the protective layer can be formed by, after the mesopores have been filled with the organic material or the inorganic material, continuously performing the filling without any treatment.

Alternatively, the protective layer can be formed by, after the mesopores have been filled with the organic material or the inorganic material, stopping the filling and then restarting the filling.

Specific examples of the material forming the protective layer include silicon oxide, titanium oxide, zirconium oxide, and aluminum phosphate.

The thickness of the protective layer is desirably 1 nm or more and 20 nm or less. When the thickness of the protective layer is less than 1 nm, sufficient film thickness uniformity cannot be maintained and a shielding effect on moisture in the air is not sufficiently obtained in some cases. In addition, when the film thickness of the protective layer is more than 20 nm, the proportion of the protective layer in the form of the salient portion of the present invention becomes so large that when the structure is utilized as, for example, an antireflection film, a continuous change in refractive index in the salient portion may be partially offset.

Second Embodiment

A structure of this embodiment is a structure having multiple salient portions on its surface, the structure being characterized in that: the salient portions have such a shape that a cross section when the salient portions are cut by a plane perpendicular to a direction from the bottom portion of the salient portions to the tip thereof becomes smaller along the direction; the salient portions have a mesostructure having mesopores; a metal element is present at the tip of the salient portions; and when the length of the bottom line of the salient portions is represented by D and the height of the salient portion is represented by H, the ratio H/D is 2.0 or more.

The structure of this embodiment is the same as that of the first embodiment except that: the shapes of the salient portions are different; the metal element is present at the tip of the salient portions; and when the height of the salient portions is represented by H and the length of the bottom line of the salient portions is represented by D, the ratio H/D is 2.0 or more.

Therefore, only the different points are described in the following.

The metal element present at the tip of the salient portions of the structure of this embodiment may contain a member constituting the etching chamber of a plasma etching apparatus. As described later in description concerning a production process, in the structure of this embodiment, a substance containing the member constituting the etching chamber can be formed so as to be a fine domain on a film surface during a plasma etching treatment by adjusting a condition for the etching treatment and then the substance formed into a domain shape can be produced as an etching-resistant material. In this case, a structure in which the substance containing the member constituting the etching chamber of the plasma etching apparatus remains is formed at the tip of the salient portions. The substance containing the member constituting the etching chamber of the plasma etching apparatus is typically a substance containing the metal element, in particular, a substance containing aluminum.

As described later in description concerning a production process for the structure of this embodiment, when the metal element is present at the tip of the salient portions as described above, the aspect ratio of the salient portions of the structure tends to be a high aspect ratio (a ratio H/D of 2.0 or more).

Third Embodiment

A structure of this embodiment is a structure having multiple salient portions, the structure being characterized in that: the salient portions have such a shape that the area of a cross section when the salient portions are cut by a plane perpendicular to a direction from the bottom portion of the salient portion to the tip thereof reduces along the direction; an average interval between the tips of the adjacent salient portions is 100 nm or less; and when the length of the bottom line of the salient portions is represented by D and the height of the salient portion is represented by H, the ratio H/D is 1/2 or more.

The shape of the structure having the multiple salient portions is basically the same as the shape of the structure described in the first embodiment illustrated in FIGS. 1A to 1C. The structure of this embodiment does not have any mesopore, though the structure forms the shape having the multiple salient portions. An average interval between the tips of the adjacent salient portions of the structure of this embodiment is 100 nm or less, and an aspect ratio defined as a ratio H/D where D represents the length of the bottom line of the salient portions and H represents the height of the salient portions is 1/2 or more. The formation of such structure on a substrate can significantly reduce a reflectance at the surface of the substrate. Although the reducing effect on the reflectance is observed at an aspect ratio of 1/2 or more, the aspect ratio is preferably as high as possible, more preferably 1 or more, still more preferably $\sqrt{3}/2$ or more. The structure having such morphological feature has been difficult to produce by a conventional material processing technology and can be produced by the production process of this embodiment to be described later.

In addition, as in the first embodiment, it is preferred that the salient portions in the structure of this embodiment be uniformly present over the entirety of the structure. Specifically, when the average interval between the tips of the salient portions is represented by p and a standard deviation in the distribution of the intervals between the tips is represented by σ, the following expression 1 is preferably satisfied.

$$0.1 < \sigma/p < 0.5 \tag{Expression 1}$$

Fourth Embodiment

An antireflection film of this embodiment has the structure described in any one of the first to third embodiments.

The structures described in the first to third embodiments described like the foregoing each have, on its surface, multiple salient portions having such a shape that the area of a cross section when the salient portions are cut by a plane perpendicular to a direction from the bottom portion of the salient portion to the tip thereof reduces along the direction, and hence the apparent refractive index real part of the structure reduces along the direction from the bottom portion of the salient portion to its tip.

Accordingly, a change in refractive index between air and the structure becomes moderate. Therefore, when any one of the structures described in the first to third embodiments is formed on the surface of a substrate, the abruptness of the change in refractive index at an optical interface reduces. As a result, the structure functions as an excellent antireflection film that suppresses the reflection of visible light to near infrared radiation.

The wavelength range of an electromagnetic wave where the antireflection film of this embodiment shows an antireflection ability is present in a visible to near infrared region.

Further, reflection due to a difference in refractive index at an interface between the substrate and the antireflection film of this embodiment can be suppressed by forming the antireflection film of this embodiment with a material having substantially the same refractive index as that of the substrate, or by controlling the porosity of the mesopores of the structure of the present invention produced with the mesostructure, or introducing any other material into the mesopores with its quality and amount controlled, so that the refractive index of the structure may match the refractive index of the substrate.

The foregoing is described with reference to FIGS. 8A to 8D.

The effective refractive index $n_{film}$ of the fine structures described in the first to third embodiments is represented by the following expression (3) and each value can be appropriately set according to a member where antireflection is to be performed.

$$n_{film} = (1-P)n1 + n2(P) \tag{3}$$

Figures 8A, 8B, 8C:
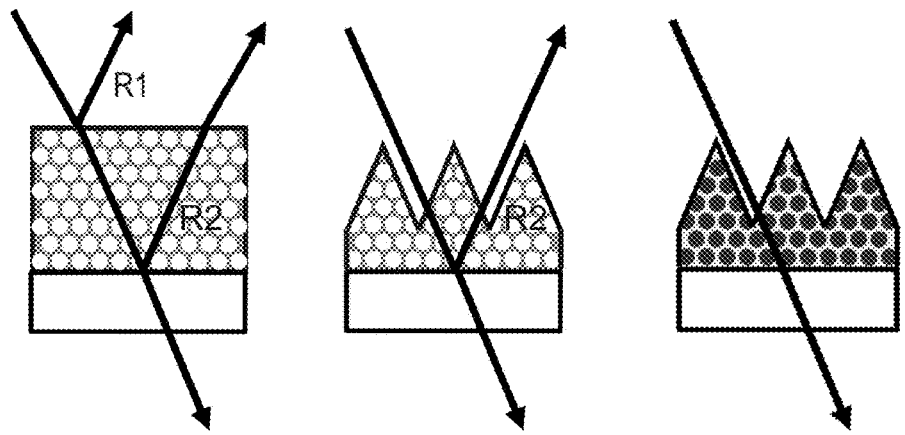
FIGS. 8A, 8B, 8C and 8D are schematic views for illustrating the antireflection effects of antireflection films described in a fourth embodiment and a graph showing a change in film refractive index in association with the filling of a material into a mesopore.

In ordinary cases, when a second material is formed on a substrate formed of a first material, with regard to an electromagnetic wave having such a wavelength as to permeate the second material, reflection R2 at the surface of the substrate and reflection R1 at the surface of the second material occur as illustrated in FIG. 8A. Here, when the antireflection film of this embodiment is formed on the surface of the second material, reflection Rtotal is determined by the reflection R1 reduced by the shape effect of the fine structures (salient portions) of the antireflection film, and the reflection R2 at an interface between the member and each fine structure, and is represented by the expression (4).

$$R\text{total} = R1 + R2 \tag{4}$$

The reflectance is largely reduced at the surface of the second material because no interface can be defined.

Even in such case, however, when the first material and the second material have different refractive indices, the reflection R2 at an interface between the substrate and the second material cannot be prevented (FIG. 8B).

Figure 22:
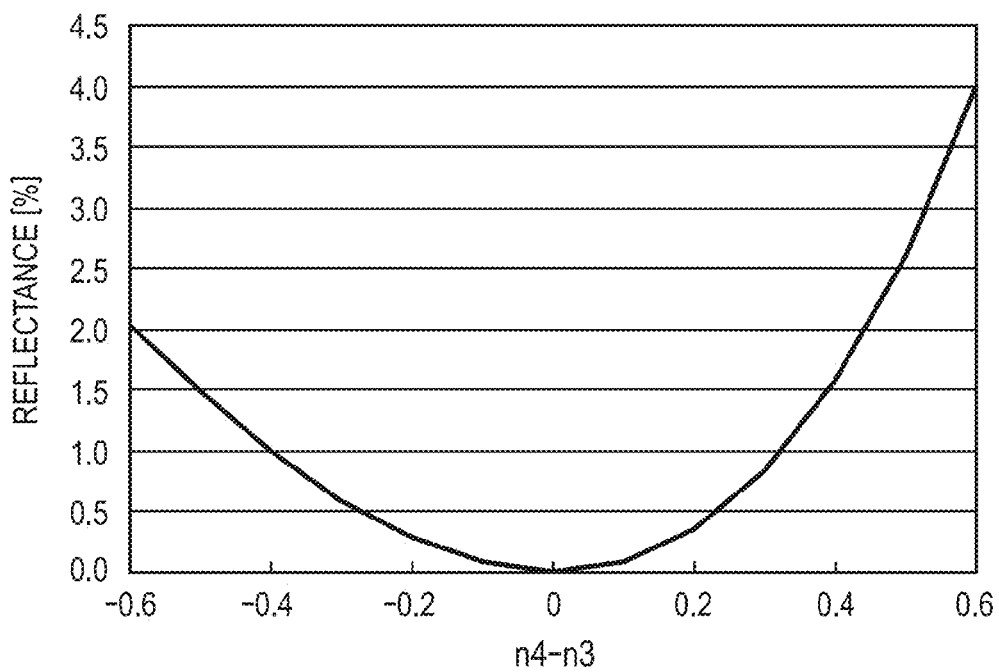
FIG. 22 is a view showing a relationship between a difference between a refractive index n4 (nsub) of a member where antireflection is performed and an effective refractive index n3 (nfilm) of a fine structure, and a reflectance at an interface between the member and the structure.

FIG. 22 shows a relationship between a difference between a refractive index n_sub of the member where antireflection is performed and an effective refractive index n3 (n_film) of each fine structure, and a reflectance at an interface between the member and the structure. It should be noted that in FIG. 22, the n_sub is represented by n4 and the effective refractive index n_film of the fine structure is represented by n3.

Here, when the refractive indices of the first and second materials are matched with each other, both the R1 and the R2 can be suppressed as illustrated in FIG. 8C, and hence no reflection occurs in principle. In other words, in addition to the reduction of the reflection (R1) by the shape effect of a fine structure 1203, the reflection (R2) can be reduced by matching the refractive indices of the fine structure and the member with each other, and hence antireflection can be realized in principle.

With regard to the range of the difference (n_sub−n_film) between both the refractive indices, a relationship between both the refractive indices is more preferably caused to satisfy the following expression (5).

$$(n_{sub} - n_{film})^2 \leq 0.0025 \tag{5}$$

Figure 8D:
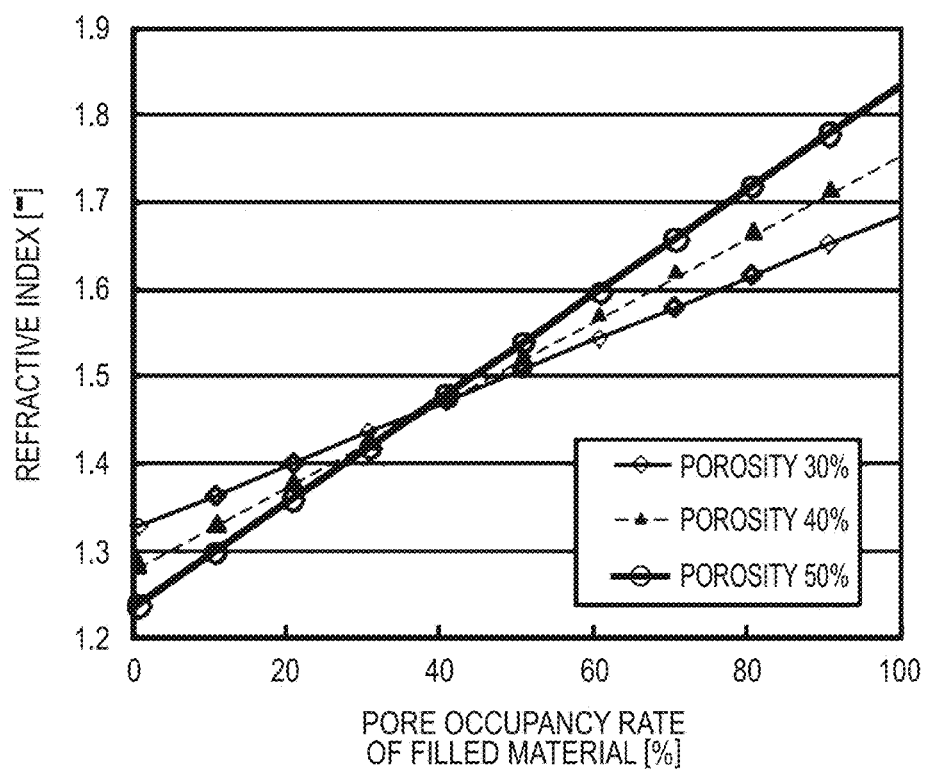

In the antireflection film of this embodiment, the suppressions of the R1 and the R2 are simultaneously achieved, and the following processes are each available as a process for suppressing the R2: a process involving forming the fine structures (salient portions) of the antireflection film of this embodiment on a material having a refractive index matched with that of the first material, and a process involving forming the fine structures (salient portions) on the mesostructure and then introducing, into its mesopores, a material having a proper refractive index with its amount controlled to match the refractive indices of the structure and the substrate with each other. FIG. 8D is a graph showing a change in refractive index when titanium oxide is introduced into the pores of a silica mesostructure having hollow mesopores. As can be seen from the figure, its refractive index can be precisely controlled depending on the porosity of the original silica mesostructure and the amount of titanium oxide to be introduced. Although an example concerning the introduction of titanium oxide is described here, the ratio of the change in refractive index of a mesostructure having the same porosity with an introduction amount can be changed by changing a material to be introduced into the pores.

It is preferred that the conical surfaces of the adjacent salient portions thus formed be merged each other, the positions where the conical surfaces are merged each other be present in the antireflection film side with respect to the surface of the substrate, and a distance between the portion where the conical surfaces are merged each other and the substrate be not constant. This is because when the distance between the portion where the conical surfaces are merged each other and the substrate is not constant, the ratio of a change in refractive index at the interface between the substrate and the antireflection film reduces, and hence an antireflection effect is additionally improved.

In addition, when the structure of the antireflection film of this embodiment has a mesostructure, it is preferred that the portion of the antireflection film in contact with the substrate has the mesostructure, and a refractive index na of the substrate and a refractive index nb of the layer in contact with the substrate of that portion of the antireflection film constituting the antireflection film satisfy the following relationship.

$$0 \le |na-nb| 0.05$$

This is because of the following reason. When the porosity is controlled, or any other material is introduced into the mesopores with its quality and amount controlled, so that the refractive index of the structure in contact with the substrate may match the refractive index of the substrate, in an optical member having the antireflection film of this embodiment and the substrate, a difference in refractive index at the interface between the substrate and the antireflection film becomes 0.05 or less, and a change in refractive index between air and the structure at the tip of each salient portion of the structure becomes moderate, and hence a high antireflection effect can be realized.

The substrate of an optical element having the antireflection film of this embodiment present on the surface of the substrate is preferably a substrate that concentrates visible light (i.e., a convex lens) or a substrate that diverges visible light (i.e., a concave lens). In such case, the antireflection effect is particularly high.

Further, in the optical member having the substrate and the antireflection film of this embodiment, when the structure of the antireflection film has a mesostructure and an organic material or an inorganic material is present in the mesopores of the structure, it is preferred that the mesopores of the mesostructure be periodically arranged in the normal direction of the substrate. In other words, the structure of the antireflection film has one crystallographic azimuth with respect to the substrate of the mesostructure. Upon filling of the organic material or the inorganic material into the mesopores, such structure facilitates the control of its filling amount.

Fifth Embodiment

A water-repellent film of this embodiment is a water-repellent film having such a structure that an organic material is present in the mesopores of the structure described in the first embodiment.

That is, the water-repellent film of this embodiment is a water-repellent film having a structure having multiple salient portions on its surface, the film being characterized in that the salient portions each have a mesostructure, the mesostructure is a structure having mesopores, and the organic material is present in the mesopores.

FIGS. 2A and 2B each schematically illustrate the structure of the water-repellent film of this embodiment.

In the water-repellent film of this embodiment, the organic material is present in the mesopores of the structure and the organic material present in the mesopores preferably has hydrophobic functional groups. Here, the organic material present in the mesopores may be present in all the mesopores or may be present only in part of the mesopores. In addition, the organic material may be present only on the surfaces of all the mesopores or may be present only on the surfaces of some of the mesopores. The case where the organic material having hydrophobic functional groups is present only on the surfaces of the mesopores can be represented as follows: the surfaces of the mesopores are modified with the hydrophobic functional groups. Further, the case where the surfaces of the mesopores are modified with the hydrophobic functional groups and the organic material having the hydrophobic functional groups is present in the mesopores is also practicable.

The foregoing is described in detail with reference to the schematic views of FIGS. 4A to 4D.

The phrase "the organic material is present in the mesopores" includes both the case where an organic material 13 containing an organic compound as a component is present in the mesopores like FIG. 4A and the case where the surface of a mesoporous material is modified with an organic material such as hydrophobic functional groups 14 like FIG. 4B. The modification with the hydrophobic functional groups is not limited to the modification of the surfaces of the mesopores and the mesopores may be completely embedded with the hydrophobic functional groups. In addition, an introduction amount and a modification amount are not necessarily needed to be uniform like FIG. 4C. Although FIG. 4B is illustrated as if the inner walls of the mesopores were completely covered with the hydrophobic functional groups, the coverage ratio may be incomplete, i.e., the pore walls of the mesopores may be partially exposed. Even when the inner walls are not completely covered with the hydrophobic functional groups, a water-repellent effect is significant in the case where the hydrophobic functional groups contain alkyl groups or fluoroalkyl groups.

Examples of the functional group to be formed on the surfaces of the mesopores are described below, provided that the functional group that can be used in the present invention is not limited thereto. Each modification group preferably forms a covalent bond with the main skeleton of the mesoporous film through an oxygen atom. n in the examples of the functional group listed below represents the number of hydrophobic groups directly bonded to a silicon atom in the modification group. A silane coupling agent is preferred as a material to introduce such modification group, and an alkoxide or halide having such functional group is preferably used. A process for introducing the hydrophobic modification group into the mesoporous film is not limited, and a chemical vapor deposition process, immersion in a solution containing a raw material for the hydrophobic modification group, or the like is employed.

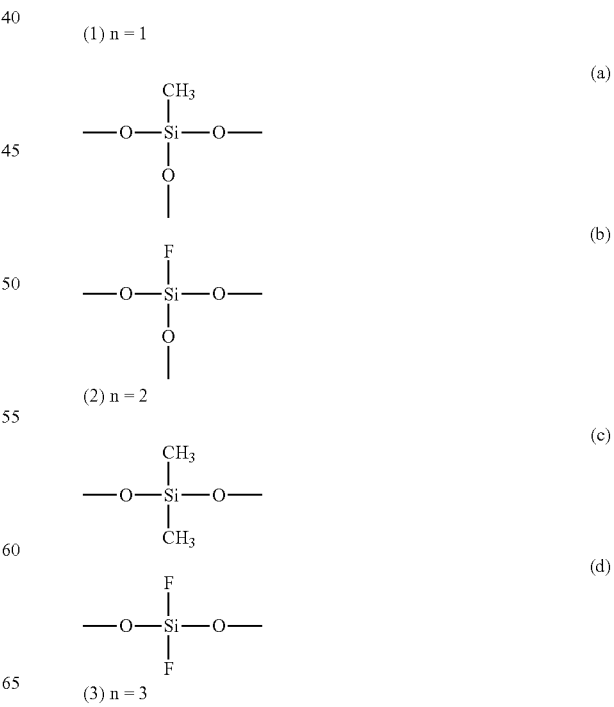

-continued

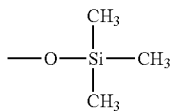
(e)

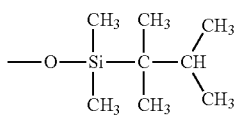
(f)

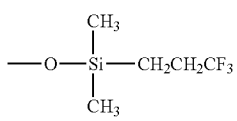
(g)

The water-repellent film of this embodiment has excellent water-repellent performance by virtue of its fine and characteristic surface shape, and the hydrophobic property of the organic material present in the mesopores. The water-repellent film of this embodiment has the following advantage: even when the surface layer of the film is partially destroyed by mechanical impact or abrasion, the organic material present therein is exposed to its surface and hence the film is excellent in durability.

In addition, the water-repellent film of this embodiment is preferably such that the multiple salient portions are present on a surface having a morphology with convex and concave portions (irregular shape), and the interval and height of the convex portion are larger than the period and height of the multiple salient portions. In such case, the following structure is practicable: the water-repellent film is constituted of multiple layers, a layer b having the structure is present on the surface of a layer a having the multiple salient portions, and the multiple salient portions of the layer b are present on the surface of one salient portion of the layer a.

In such case, a significant water-repellent effect may be exerted by the increase of an apparent surface area. As described in the foregoing, the multiple salient portions of the water-repellent film of this embodiment can be formed without placing any mask. As a result, fine salient portions can be uniformly formed even on a non-flat surface on which a salient portion has been difficult to form by a conventional process involving using a mask. It has been known that a water-repellent film having salient portions on its surface shows a higher water-repellent effect as the area of the surface modified with hydrophobic functional groups enlarges. Accordingly, the apparent surface area is increased by forming a first irregular shape having a period and difference of elevation larger than those of the salient portions on the surface in advance; and then forming fine salient portions on the surface of the first irregular shape. When the surfaces of the salient portions and the surfaces of the mesopores are modified with the hydrophobic functional groups under such circumstances, a water-repellent film whose surface is additionally excellent in water repellency can be obtained. The foregoing is described with reference to FIGS. 19A and 19B.

Figure 19A:
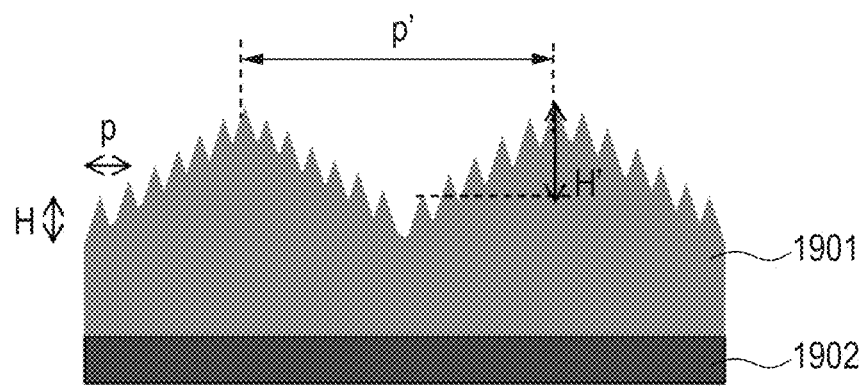
FIGS. 19A and 19B are each a schematic view for illustrating the construction of a water-repellent film having multiple irregular shapes different from each other in period and size.
Figure 19B:
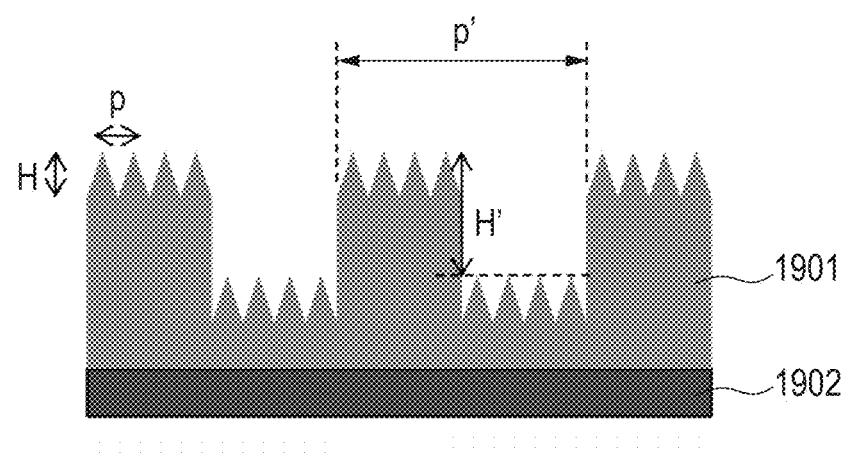

FIG. 19A is a schematic view illustrating an example of the water-repellent film of this embodiment in which a conical first irregular shape (average interval between tips: p', height of a tip portion: H') is formed on a substrate 1902, and its surface 1901 having multiple fine salient portions (average interval between tips: p, height of a tip portion: H), the structure having a mesostructure and having an organic material present in at least part of mesopores in the mesostructure. At this time, the shape of the surface becomes a shape similar to a fractal structure when the p' is designed so as to be larger than the p and the H' is designed so as to be larger than the H. As a result, the apparent surface area increases, whereby the water repellency of the surface can be additionally improved. It should be noted that in FIG. 19A, the H' is defined as representing the maximum difference of elevation of the height of a tip portion in a region corresponding to a period in the first irregular shape. A rectangular shape can also be preferably used as the first irregular shape. In this case, the formation of the structure described in the first embodiment having the organic material in the mesopores provides a film of such a structure as schematically illustrated in FIG. 19B. In this case as well, as in FIG. 19A described in the foregoing, when the p' is designed so as to be larger than the p and the H' is designed so as to be larger than the H, the apparent surface area increases, whereby the water repellency of the surface can be additionally improved.

Although an upper limit for the p' upon formation of such first irregular shape is not particularly limited, the p' at which the improving effect on the water repellency can be sufficiently observed is preferably about 1 mm or less in consideration of the size of a water droplet actually generating on the surface of the water-repellent film. Although an upper limit for the H' upon formation of the first irregular shape is also not particularly limited, the H' is desirably about 10 μm or less in consideration of, for example, the difficulty of a production process for the first irregular shape.

A substance constituting the wall portion of the mesostructure in the structure of the water-repellent film of this embodiment is preferably silicon oxide in terms of, for example, stability and the ease of the surface modification.

In addition, the water-repellent film of this embodiment described above is defined as that having a contact angle at its surface with respect to a water droplet of 150° or more. The large contact angle is a value that cannot be achieved in a substrate having a flat surface free of irregularities irrespective of the extent to which the hydrophobicity of the surface is improved.

Sixth Embodiment

A substrate for mass spectrometry of this embodiment is a substrate for mass spectrometry having a substrate having conductivity; and the structure described in the first or second embodiment present on the surface of the substrate in which the wall portion of the mesostructure is titanium oxide.

In addition, a substrate for mass spectrometry according to another mode included in this embodiment is a substrate for mass spectrometry having a substrate having conductivity; and the structure described in the third embodiment present on the surface of the substrate whose salient portions are formed of titanium oxide.

The limitation on the material is based on the following two requirements: titanium oxide should have conductivity and should have strong absorption in the wavelength region of the laser light for excitation of mass spectrometry. Although titanium oxide forming the pore wall may be amorphous or may be partially crystallized, titanium oxide preferably contains a fine crystal because ionization efficiency additionally improves and an S/N ratio increases.

Accordingly, the abruptness of a change in refractive index at an optical interface reduces, whereby the reflection of probe light at the surface of the structure can be prevented. That is, the substrate for mass spectrometry of this embodiment can improve the ionization efficiency by preventing the reflection while maintaining a fine structure having a role of preventing the destruction of a specimen sample in association with the ionization. The case where the substrate for mass spectrometry of this embodiment has the mesostructure and the insides of the mesopores of the mesostructure are voids has another advantage. The advantage is the following effect. The formation of the fine structure increases the specific surface area of the film, that is, increases the opening portions of the mesopores, and hence specimen molecules ionized by laser irradiation easily desorb from the mesopores holding the molecules. When the substrate for mass spectrometry of this embodiment has mesopores whose insides are voids, the pore diameter of the mesoporous titanium oxide film is desirably optimized according to the size of a substance to be detected. A typical pore diameter is 5 nm or more, and particularly when a bio-related molecule having a large molecular size is detected, a pore diameter of 10 nm or more is preferably used in many cases. The pore diameter can be controlled depending on the kind of a surfactant and solution composition to be used as described in the forgoing.

Seventh Embodiment

A phase plate of this embodiment is constituted of the structure described in the first embodiment or the second embodiment in which the mesopores are cylindrical and the orientation direction of the mesopores is controlled to one direction in a surface perpendicular to the thickness direction of the structure. In the structure, apparent densities differ from each other in a direction parallel to mesopores and a direction perpendicular thereto. Accordingly, a mesostructure thin film having different refractive indices in the two directions, i.e., having birefringence can be obtained. In this case, a difference between the refractive indices in the two directions becomes larger as the refractive index of a material forming a pore wall increases, and the difference is large when the insides of the pores are voids. Such oriented hollow mesostructure thin film has birefringence and hence functions as a phase plate having a desired characteristic through the change of its film thickness according to its birefringence value.

For example, when a birefringence value Δn is 0.1, setting the film thickness to 1 μm can set a retardation to 100 nm, and hence the film functions as a ¼ wavelength plate for light having a wavelength of 400 nm and can transform linearly polarized light into circularly polarized light.

When the surface of such mesostructure thin film having birefringence is the structure of the shape described in the first embodiment or the second embodiment, such a phase plate additionally excellent in characteristics that reflection at its film surface is suppressed can be obtained.

Next, an example of a process for producing the structures described in the first to third embodiments is described in detail.

The structure described in the third embodiment can be formed by, for example, a process for producing a structure including the step of subjecting an inorganic oxide to plasma etching with a reactive gas without the use of a mask to form, on the inorganic oxide, multiple salient portions having an average tip-to-tip interval of 400 nm or less and having such a shape that the area of a cross section when the salient portions are cut by a plane perpendicular to a direction from its bottom to its tip reduces along the direction. In the case of the process for producing a structure including such step, the multiple salient portions having the average tip-to-tip interval of 400 nm or less and having such a shape that the area of the cross section when the salient portions are cut by the plane perpendicular to the direction from the bottom to the tip thereof reduces along the direction are formed on the inorganic oxide by the plasma etching, and hence the structure described in the third embodiment can be obtained.

The gas species to be used in the plasma etching advances the etching as follows: the gas species ionizes with plasma to react chemically with the inorganic oxide, thereby forming a volatile compound. Although an approach based on a known process such as capacitive coupling, inductive coupling (ICP), electron cyclotron resonance (ECR), or magnetic neutral loop discharge (NLD) can be employed as an approach to produce the plasma for the plasma etching, the ICP process is preferably employed because plasma having a high density ($10^{12}$ portions/cm$^{-3}$) is obtained with a relatively simple apparatus construction and at a gas pressure as low as 10 Pa or less. The gas to be used in the plasma etching of the inorganic oxide preferably contains fluorine, and for example, a sulfide such as $SF_6$ or a fluorocarbon-based gas represented by $C_xF_y$ is used.

Properly controlling conditions for the plasma etching can form the multiple salient portions on the surface of the inorganic oxide. The salient portions described herein are such a shape that the area of the cross section when the salient portions are cut by the surface 19 perpendicular to the direction 18 from the bottom portion 16 to the tip 17 reduces along the direction 18. As described in the foregoing, when the salient portions are conical portions, the portions have a cone shape or such a shape that the tip of a cone is partially lacked (such a shape that when the height of a virtual cone formed when the conical surface of the cone is extended is defined as 1, a distance from the tip of the virtual cone to a site most distant from the virtual tip of the lacking portion is 1/7 or less).

In addition, the conditions for the etching described herein refer to, for example, the pressure of the gas, the power of a radiofrequency field to be applied for forming the plasma, the power of a radiofrequency field to be applied to a cathode on which an object to be etched is arranged, an etching time, and a substrate temperature. Typically, the pressure of the gas is about 0.05 Pa to 20 Pa, the power of the radiofrequency field to be applied for forming the plasma is 100 to 500 W, the power density of the radiofrequency field to be applied to the cathode on which the object to be etched is arranged is 0.1 to 2.5 W·cm$^{-3}$, the etching time is 10 seconds to 5 hours, and the substrate temperature is room temperature to 200° C.

The structure described in the third embodiment is, for example, such that in the plasma etching step, the etching is performed while at least part (part or the entirety) of a reactive gas component is incorporated into the inorganic oxide. As a result, the inorganic oxide and a component in the reactive gas are bonded to each other, and the fine structure having the multiple salient portions can be formed on the inorganic oxide by a difference in etching resistance between the bonding portion and any other portion. For example, when the inorganic oxide is $SiO_2$, $SiO_xF_y$ is locally formed, and a fine structure having multiple salient portions is formed on $SiO_2$ by a difference in etching resistance between the portion and $SiO_2$ that has not reacted with the etching gas.

The reactive gas preferably contains fluorine, and for example, a sulfide such as $SF_6$ or a fluorocarbon-based gas represented by $C_xF_y$ is used.

The etching conditions need to be optimized according to the quality of the inorganic oxide material on which the salient portions are formed. When various conditions are optimized to set an etching rate to 10 nm/min or less, the structure described in the third embodiment is satisfactorily formed.

The inorganic oxide to be subjected to the plasma etching is preferably a substance having a band gap in the range of 2.5 eV or more to 10 eV or less, and of such substances, any one of silicon oxide, zirconium oxide, and titanium oxide is most preferred.

Next, an example of a process for producing the structure described in the first embodiment is described.

The structure described in the first embodiment can be produced by, for example, a process for producing a structure characterized by including the steps of forming a mesostructure (i.e. mesostructured material) having mesopores; and subjecting the mesostructure to plasma etching to form, on the mesostructure, multiple salient portions having such a shape that the area of a cross section when the salient portions are cut by a plane perpendicular to a direction from a bottom to a tip thereof reduces along the direction.

The process is described with reference to FIG. 1C. The structure 11 described in the first embodiment is produced through the step of forming a mesostructure 15 having the mesopores 13 and the step of subjecting the formed mesostructure to plasma etching, by forming the multiple salient portions 12 on the surface of the mesostructure.

Here, the step of forming the mesostructure is described in detail. As described in the foregoing, the mesostructure of that material refers to a structure which has void (hollow) mesopores; or the mesopores in which an organic material or an inorganic material is present are arranged in the matrix of a material forming a pore wall.

Therefore, the step of forming the mesostructure having the mesopores described herein may be the step of forming a mesostructure having void mesopores, or may be the step of forming a mesostructure having mesopores in which the organic material or the inorganic material is present. When the step of forming the mesostructure having the mesopores is the step of forming mesopores having the organic material or the inorganic material therein, the organic material or the inorganic material may be present in the mesopores at the stage of their formation, or the step may have the stage at which a mesostructure having void mesoporesand the stage at which the organic material or the inorganic material is filled into the void mesopores.

The following is also practicable: the step of forming the mesostructure having the mesopores is the step of forming a mesostructure having void mesopores, and after the step of forming the multiple salient portions on the mesostructure, the step of filling the mesopores of the multiple salient portions with one of organic material or an inorganic material is present.

It should be noted that the phrase "B or C is present in A" as described in the present invention and the description includes, of course, the case where both B and C are present in A. In addition, needless to say, the phrase includes the case where a composite of B and C is present in A.

Although the step of forming the mesostructure having the mesopores is not particularly limited, the mesostructure can be produced from, for example, an amphipathic substance and a precursor solution containing a precursor for an inorganic oxide by a process such as a sol-gel process. In this case, such a mesostructure that a molecular aggregate of the amphipathic substance is arranged in the matrix of an inorganic material is spontaneously formed. In other words, the molecular aggregate functions as a mold for forming the mesopores. A hollow structure (such a structure that the insides of the mesopores are voids) can be obtained by removing the amphipathic substance of the mold through a process such as baking, extraction with a solvent, oxidation with ozone, or UV irradiation, and a material different from the amphipathic substance can be introduced into the mesopores that have become hollow. A process to be particularly preferably employed as a process for introducing the organic material or the inorganic material into the mesopores is a chemical vapor deposition process, a layer-by-layer deposition process, or a sol-gel process.

As described in the first embodiment, a material to be used upon formation of the mesostructure is preferably transparent in a visible region. Accordingly, the material forming the mesostructure is preferably a substance having a band gap in the range of 2.5 eV or more to 10 eV or less. It should be noted that, needless to say, a substance having a band gap in the range of 5.0 eV or more to 10 eV or less is included in the category of the substance having a band gap in the range of 2.5 eV or more to 10 eV or less. Any one of silicon oxide, zirconium oxide, and titanium oxide is particularly preferred.

The amphiphilic substance to be used in the production of the mesostructure is not particularly limited, and is preferably a surfactant. Examples of the surfactant molecule may include ionic and anionic surfactants. Examples of the ionic surfactant may include a halide salt of a trimethylalkylammonium ion. The halide salt of a trimethylalkylammonium ion has an alkyl chain having a length of preferably 10 to 22 carbon atoms. An anionic surfactant containing polyethylene glycol as a hydrophilic group can be used as the anionic surfactant. Polyethylene glycol alkyl ether and polyethylene glycol-polypropylene glycol-polyethylene glycol as a block copolymer can be used as the surfactant containing polyethylene glycol as a hydrophilic group. A structural period can be changed by, for example, changing the sizes of the hydrophobic component and the hydrophilic component. In general, a pore diameter can be enlarged by increasing the sizes of the hydrophobic component and the hydrophilic component. It should be noted that a preferred alkyl chain length of the polyethylene glycol alkyl ether is 10 to 22 carbon atoms and a preferred number of repetitions of a PEG is 2 to 50 carbon atoms. In addition, an additive for adjusting the structural period as well as the surfactant may be added. A hydrophobic substance can be used as the additive for adjusting the structural period. Alkanes and aromatic compounds free of hydrophilic groups can each be used as the hydrophobic substance, and specifically, octane or the like can be used.

An alkoxide and a halide of silicon or metal element may be used as the precursor of the inorganic oxide. A methoxide, an ethoxide, a propoxide, or one that a part thereof is substituted by an alkyl group can be used as the alkoxide. Chlorine is most generally used as the halogen.

The mesostructure of the structure described in the first embodiment can be produced by, for example, applying or casting the precursor solution. The application step is generally, for example, a dip coating process, a spin coating process, or a mist coating process. In addition, the mesostructure of the present invention can be produced by a hydrothermal synthesis process different from the application step. In this case, the mesostructure is formed by nonuniform nucleation-nucleus growth in a state where a substrate is held in the precursor solution. In addition, the mesostructure can be produced by the chemical vapor deposition process.

Further, the mesostructure of the structure described in the first embodiment may be multiple mesostructures having different structures. In such case, a structure having the mesostructures having different structures can be formed by employing, in the step of forming the mesostructure having the mesopores, a process involving, for example, applying multiple layers of the precursor solution in which the kind of the surfactant to be used and the concentration of the surfactant are changed.

The step of subjecting the mesostructure to the plasma etching to form the multiple salient portions on the mesostructure is preferably performed without the use of a mask. The term "mask" as described herein refers to a mask arranged between the film of the mesostructure on which the salient portions are to be formed and plasma in the step of etching the mesostructure for partially forming a region that is not etched in the etching step, the mask serving to partially prevent the exposure of the mesostructure to the plasma, and the term includes, for example, a resist pattern to be formed on the mesostructure by a process such as photolithography or nanoimprinting and a masking shield with pores.

Therefore, the term "mask" as described herein refers to a mask to be intentionally formed or arranged, and a product like such a contamination to be spontaneously formed on the mesostructure in the plasma etching step as described later is not included in the definition of the mask.

The plasma etching is preferably an etching process involving performing etching with a reactive gas that reacts with the material forming the mesostructure while incorporating a component of the reactive gas into the mesostructure. In this case, as in the case of the production of the structure formed by etching the inorganic oxide material, at least part of the reactive gas is incorporated into the inorganic oxide to form a portion where the inorganic oxide and a component in the reactive gas are bonded to each other, and a fine structure having the multiple salient portions can be formed through the utilization of a difference in etching resistance between the bonding portion and any other portion. The reactive gas is preferably a gas containing fluorine. For example, when the material having the mesopores is $SiO_2$, $SiO_xF_y$ is locally formed, and the multiple salient portions as fine structures are formed on $SiO_2$ by a difference in etching resistance between the portion and $SiO_2$ that has not reacted with the etching gas. The foregoing is confirmed by, for example, the composition analysis of the surface of the mesostructure in association with the time of the plasma etching step in the present invention.

Figure 9:
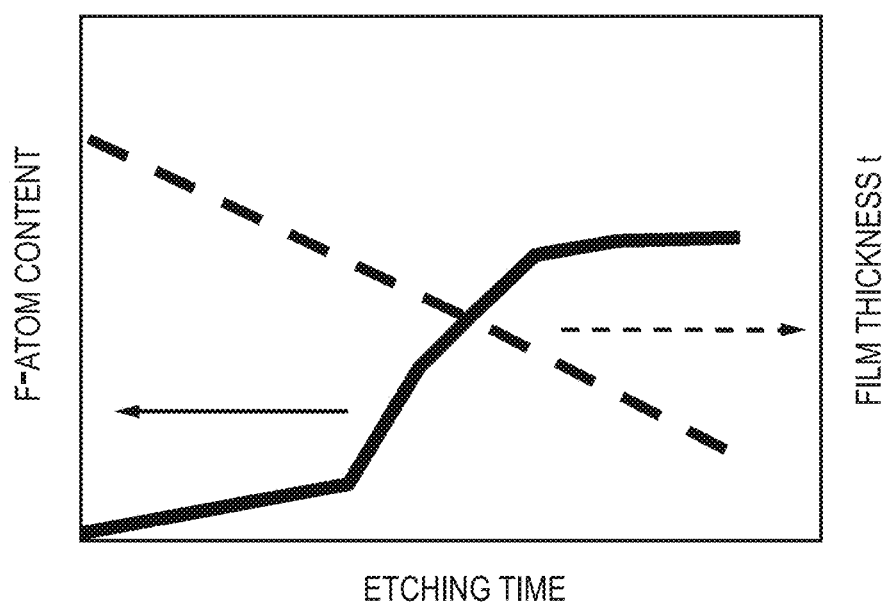
FIG. 9 is a view schematically showing the results of the in-depth analysis of the amount of fluorine in the structure described in the first embodiment formed by performing plasma etching.

FIG. 9 is a graph showing the results of the analysis of a change in amount of fluorine detected at a film surface with a plasma etching time by X-ray photoelectron spectroscopy when the structure having the salient portions of the present invention is produced by etching a silica mesostructure with an etching gas containing fluorine as a component. It is confirmed from the figure that the amount of fluorine gradually increases with the etching time, i.e., as the film thickness (corresponding to t in FIG. 9) of the porous film having the multiple salient portions as fine structures reduces. Performing the in-depth analysis of X-ray photoelectron spectroscopy confirms that fluorine atoms are present not only on the film surface but also in the film. Particularly in the case of a porous body, the incorporation of the fluorine atoms can be observed even in the vicinity of its interface with a substrate. It should be noted that it is confirmed from a binding energy position based on X-ray photoelectron spectroscopy that the fluorine atoms are present while being bonded to atoms serving as a main component for the porous body.

The step of modifying the surface of the mesostructure with an organic material is preferably present before the step of subjecting the mesostructure to the plasma etching. The presence of the step of modifying the surface of the mesostructure with the organic material can change the aspect ratio (H/D) of the salient portion, and in many cases, can increase the aspect ratio. The step of modifying the surface with the organic material specifically means, for example, the step of covering the surface with the organic substance or the step of terminating at least part of the surface with the organic substance. The step of terminating part of the surface with the organic compound is preferably used in the present invention. The term "terminating" as used herein means that an organic functional group is fixed to the surface through a covalent bond and the termination can be confirmed through the analysis of a bonding state by means of an infrared absorption spectrum or photoelectron spectroscopy. The step of terminating part of the surface with the organic compound is particularly effective when the surface of the fine structure having the salient portions has a functional group that has strong polarity and tends to increase interfacial energy such as an OH group or a COOH group, and the step is performed for the purpose of reducing the interfacial energy through the modification of the surface with the organic substance having the organic functional group having a weakening effect on the polarity. Examples of such organic functional group can include alkyl groups formed of C and H atoms, and fluorocarbons formed of C and F atoms. By reason of the foregoing, the organic material particularly preferably has alkyl groups. A substance having the functional group and having an active group that reacts with the surface of the mesostructure to form a bond is preferred as such organic compound, and for example, an alkoxide or a halide can be used. The size of the organic compound to be used in the modification is determined in view of, for example, the structure of the mesostructure and the diameter of mesopore for the purpose of efficiently supplying the molecules of the organic compound into the mesostructure. Specifically, the organic compound to be used in the modification is preferably a compound represented by a structure $SiX_yR_{4-y}$, and the step of modifying the surface of the mesostructure with the organic compound is preferably the step of exposing the structure to an atmosphere containing a compound represented by the following general formula (I) or the step of applying a liquid containing the compound.

$$SiX_yR_{4-y} \hspace{2cm} \text{General formula (1)}$$

(It should be noted that in the formula (1), X represents a halogen or an alkoxy group, R represents an alkyl group, and y represents an integer of any one of 1 to 3.)

It should be noted that when y represents 2 or 3, the X's may be identical to or different from each other. In addition, when y represents 1 or 2, the compound contains multiple alkyl groups, which may be identical to or different from each other. Chlorotrimethylsilane is particularly preferably used as the compound represented by the structure $SiX_yR_{4-y}$. In the present invention, however, the compound to be used in the step of terminating at least part of the surface with the organic compound is not limited thereto. Heating may be performed during the exposure for the purpose of causing the active group of the organic compound containing the functional group in the organic compound to be used in the modification and the surface of the mesostructure to react with each other. A heating temperature, which is appropriately optimized depending on a combination of both the organic compound and the mesostructure, preferably falls within the range of room temperature to 100° C. or less, for example, when the component of the mesostructure is silica and the organic compound is chlorotrimethylsilane. In order that the excessive organic compound may be removed after the exposure to the organic compound, for example, the step of washing the mesostructure with an alcohol or the like may be provided after the terminating step.

The inventors of the present invention assume as follows: the modification of the surface with such organic compound reduces the interfacial energy, and as a result, an etching product easily agglomerates on the porous film and a partial difference in processing rate additionally increases, thereby providing a fine structure having salient portions having a high aspect ratio.

Next, an example of a process for producing the structure described in the second embodiment is described.

The structure described in the second embodiment can be formed by, for example, a process for producing a structure including the steps of forming a meso structure having mesopores; and subjecting the mesostructure to plasma etching while depositing, on the surface of the mesostructure, a substance having a material constituting part of the etching chamber of a plasma etching apparatus to form a structure having multiple salient portions on the surface of the mesostructure.

It should be noted that the multiple salient portions described herein have such a shape that a cross section when the salient portions are cut by a plane perpendicular to a direction from the bottom portion of the salient portions to the tip thereof becomes smaller along the direction as described in the second embodiment.

The step of forming the mesostructure having the mesopores is the same as the step of forming the mesostructure having the mesopores in the example of the process for producing the structure described in the first embodiment.

The step of subjecting the mesostructure to the plasma etching while depositing, on the surface of the mesostructure, the substance having the material constituting part of the etching chamber of the plasma etching apparatus onto an inorganic oxide to form the structure having the multiple salient portions on the surface means that in the etching step, the etching is performed under such a condition that a substance produced by the sputtering of a member in the etching apparatus with an ion produced in plasma is deposited in an island shape onto the surface of an etching member. The plasma density at the time of the plasma etching is desirably set to a plasma density of $10^{11}$ portions/$cm^{-3}$ or more by a known high-density plasma-producing process such as ICP, ECR, or NLD, and the ICP process is preferably employed because plasma having a high density ($10^{12}$ portions/$cm^{-3}$) is obtained with a relatively simple apparatus construction and at a low gas pressure. A gas to be used in the plasma etching is preferably a reactive gas and is more preferably $SF_6$ or a gas containing fluorine represented by $C_xF_y$. In addition, it is desired that plasma be produced with such gas at a low pressure in the range of 0.05 Pa to 1 Pa and a bias RF power density to be applied to a substrate be set within the range of 0.12 W/$cm^2$ to 0.40 W/$cm^2$. Under such low-pressure and low-substrate bias conditions, a difference between the potential of the produced high-density plasma and the potential of the member present in the etching chamber is substantially the same as a potential difference between the substrate and the plasma. Accordingly, the amount of the ion to be incident on the member constituting the etching chamber increases. In addition, under a low vacuum, the mean free path of a particle lengthens and a substance (contamination) beaten out of the member constituting the etching chamber by the sputtering scatters onto the substrate. In addition, the scattered contamination is deposited in an island shape onto the substrate (the deposit may contain a component of the etching gas in addition to the contamination) to inhibit the etching partially. As a result, a fine structure having an aspect ratio H/D as high as 2.0 or more is formed. The contamination containing the member in the plasma etching apparatus is preferably a substance containing a metal element because the contamination is desirably a substance that is etched at a significantly small rate by the plasma etching as compared with the mesostructure material. Particularly in the case of aluminum, a compound having a high vapor pressure is not formed by the fluorine-based gas (for example, a nonvolatile compound like $AlF_3$ is formed). Accordingly, the metal element is particularly preferably aluminum.

In addition, the plasma etching is preferably performed with the reactive gas without the use of a mask.

Figure 10:
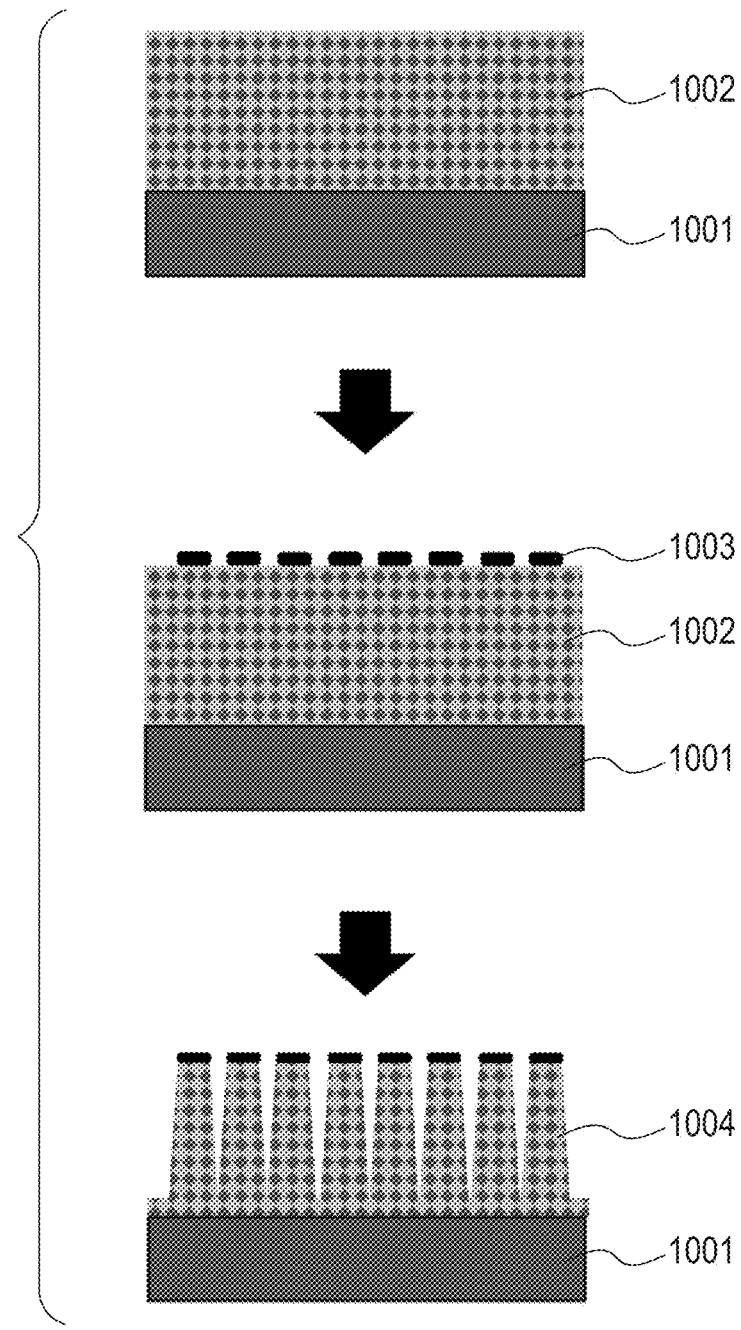
FIG. 10 is a schematic view illustrating a formation process for a structure described in the fourth embodiment produced by performing plasma etching while forming, on its surface, a contamination derived from a member constituting an etching apparatus in an island shape.

The process is described in detail with reference to FIG. 10. In FIG. 10, reference numeral 1001 represents a substrate and reference numeral 1002 represents a mesostructure. When the structure described in the second embodiment is produced in the production process, such a condition that a contamination 1003 containing the member constituting the etching chamber is deposited in an island shape onto the mesostructure is selected. The contamination thus formed has high resistance to the plasma etching, and hence a portion where the contamination has been formed is almost unetched and the mesostructure in a non-formed portion is selectively etched. As a result, a structure having multiple pillar-shaped salient portions 1004 having a large aspect ratio and having such a shape that the area of a cross section when the salient portions are cut in a direction from a bottom to a tip thereof reduces can be obtained. Adjusting the conditions for the plasma etching can provide a fine structure having the following relatively uniformized shape: the average of the heights H of the pillar-shaped salient portions falls within the range of 300 nm to 600 nm and the average interval p between their head ends falls within the range of 20 nm to 400 nm. The respective salient portions formed in this step adopt such random arrangement poor in regularity as illustrated in FIG. 5C and the in-plane density distribution of the respective salient portions is relatively uniform like FIG. 7A. Accordingly, the structure can be of a preferred construction when used as an antireflection structure. The distribution of the interval distances of the pillar-shaped salient portions is of a shape close to a normal distribution, and through the adjustment of the conditions for the plasma etching, the pillar-shaped salient portions can be appropriately formed so that the ratio σ/p between the average interval p between the respective columnar structures and the standard deviation σ in the distribution of the intervals of the respective pillar-shaped salient portions may fall within the range of 0.1<σ/p<0.5.

A material having a slow etching rate can be utilized for increasing the aspect ratio of the salient portion of the structure described in any one of the first to third embodiments. The foregoing is described in detail.

First, on the surface of a first layer constituted of a mesostructure having mesopores, a second layer constituted of a material having an etching rate smaller than that of the first layer is formed. A fine structure formed of multiple salient portions is formed on the second layer by subjecting the second layer to first plasma etching without the use of a mask. Next, multiple salient portions are formed on the first layer by subjecting the first layer to second plasma etching through the fine structure formed on the second layer thus produced. Here, the fine structure formed of the multiple salient portions formed on the second layer is formed as follows: in the first plasma etching, the material constituting the second layer and a component in a reactive gas are locally bonded to each other, and a difference in etching resistance between the bonding portion and the non-bonding portion is utilized to form the fine structure. In addition, the multiple salient portions formed on the first layer after the second plasma etching are of a salient portion having such a shape that the area of a cross section when the salient portions are cut by a plane perpendicular to a direction from a bottom to a tip thereof reduces along the direction.

Figure 11:
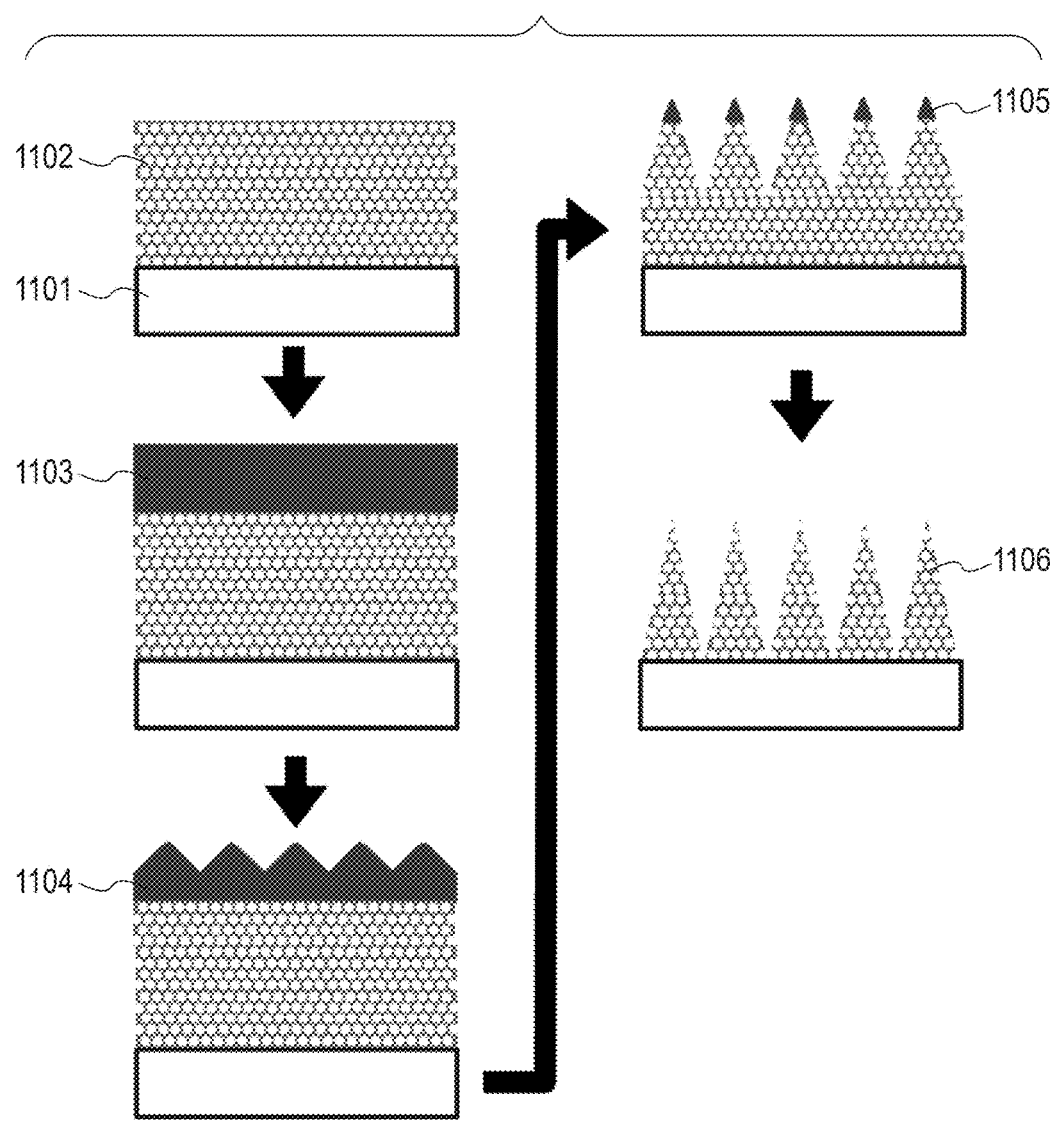
FIG. 11 is a schematic view illustrating a formation process for a structure described in any one of the first to third embodiments based on a step involving forming a material having a small etching rate on its surface and performing plasma etching in two stages for increasing the ratio H/D of a salient portion in the structure.

The process is described in detail with reference to FIG. 11. In FIG. 11, reference numeral 1101 represents a substrate and reference numeral 1102 represents a mesostructure. When the structure of the present invention is produced in the production process, first, a layer 1103 of a material having an etching rate smaller than that of the mesostructure is formed on the mesostructure. Then, a fine structure 1104 formed of the multiple salient portions is formed on the surface of the layer of the material having the smaller etching rate by subjecting the layer to plasma etching without the use of a mask. Next, the plasma etching of the mesostructure layer is performed through the fine structure 1104 thus produced to form multiple salient portions 1106 on the mesostructure layer. In many cases, conditions for the plasma etching of the layer of the material having the smaller etching rate and conditions for the plasma etching of the mesostructure differ from each other, and a gas species, a gas pressure, plasma power, and the like are optimized for each plasma etching. The term "material having an etching rate smaller than that of the mesostructure" means a difference in etching rate under the conditions for the etching of the mesostructure. The fine structure 1104 formed of the multiple salient portions formed by the process on the surface of the layer of the material having the smaller etching rate is formed as follows: the material and the component in the reactive gas are locally bonded to each other, and a difference in etching resistance between the bonding portion and the non-bonding portion is utilized to form the fine structure. When the plasma etching is performed through the fine structure formed of the multiple salient portions of the material having the smaller etching rate, the etching of the mesostructure progresses in a state where the material having the smaller etching rate partially remains on its surface by virtue of the difference in etching rate. In this case, a material 1105 having the smaller etching rate remaining in an island shape on the surface locally inhibits the plasma etching. Accordingly, a structure 1106 of the present invention having the multiple salient portions having a high aspect ratio can be obtained.

In the production process, the material forming the first layer formed of the mesostructure is preferably transparent in the visible region. Accordingly, a substance having a band gap in the range of 2.5 eV or more to 10 eV or less is preferably used, and any one of silicon oxide, zirconium oxide, and titanium oxide is particularly preferably used. In addition, an inorganic oxide is preferably used as the material having an etching rate smaller than that of the mesostructure, i.e., the material constituting the second layer.

In the process for producing a structure described above as well, a gas containing fluorine is preferably used as the reactive gas to be used in the first plasma etching and the second plasma etching.

In addition, the structure described in the first embodiment and the structure of the second embodiment can be produced by a process for producing a structure including the steps of producing a structure by such process for producing a structure; and transferring the shape of the produced structure onto another substrate with the structure as a mold.

Figure 12:
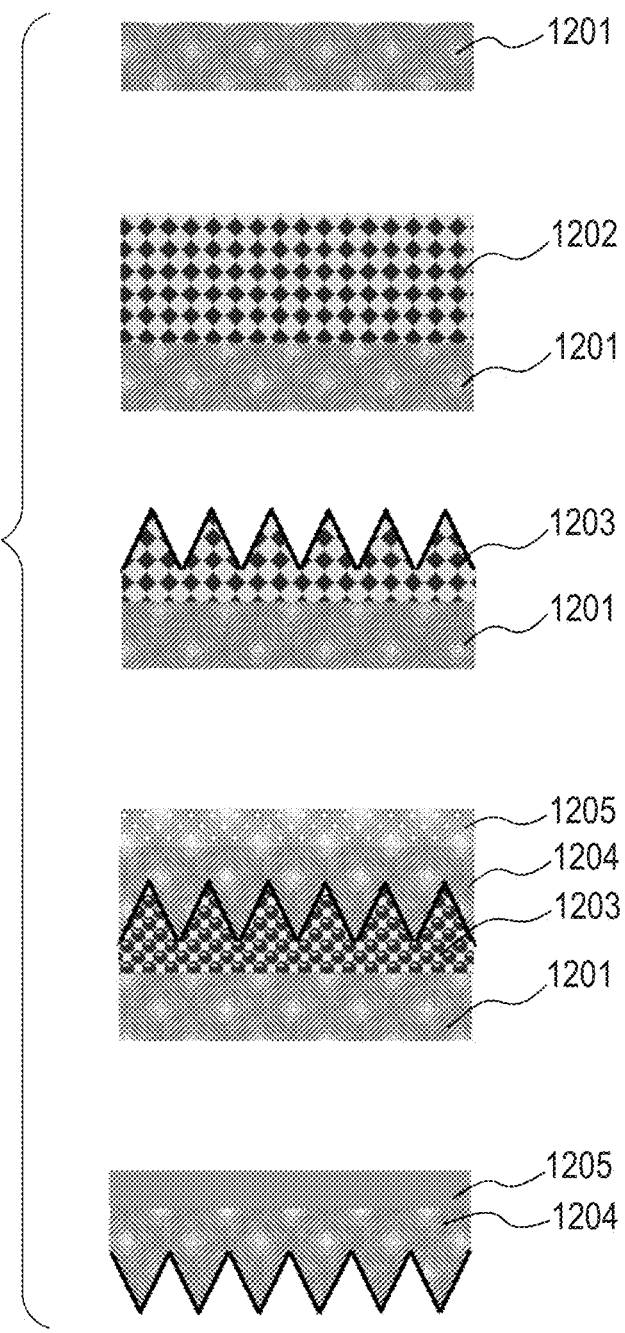
FIG. 12 is a schematic view for illustrating the step of producing a structure corresponding to the negative of the structure described in any one of the first to third embodiments with the structure as a mold.

The production process is described with reference to FIG. 12. A layer 1202 of a material forming a structure having multiple salient portions is formed on a substrate 1201, and then the structure 1203 having multiple salient portions of any one of the first to third embodiments is formed by plasma etching as processing means according to any one of the processes described above. Next, a material 1204 is formed so as to embed the structure 1203 completely. Subsequently, another substrate 1205 is brought into close contact with the material. The quality of the material 1204 and a formation process therefor are not particularly limited as long as the shape of the structure of any one of the first to third embodiments can be accurately transferred. For example, the casting of a resin having flowability, the casting of an inorganic material precursor having flowability, a vacuum deposition process, the chemical vapor deposition process, or the layer-by-layer deposition process is preferably employed. Finally, the structure 1203 having the multiple salient portions produced at the beginning is removed. Thus, a fine structure in which a structure corresponding to a negative in the case where the structure produced at the beginning is regarded as a positive is transferred onto the substrate 1205 formed at the end is formed. Needless to say, even when a process for producing a structure having a structure complementary to the structure described in any one of the first to third embodiments involving transferring the structure does not completely coincide with the foregoing description, for example, includes an additional step, the process is included in the present invention. The additional step is, for example, the step of hardening the material 1204, which has had flowability in the step of taking an impression of the structure 1203 having the multiple salient portions, before the removal of the structure 1203 in order that the material 1204 may maintain its fine structure even after the removal of the structure 1203.

As described above, the structure produced by the production process corresponds to the negative in the case where the structure formed by the plasma etching is regarded as the positive. The structure corresponding to the negative has a structure complementary to the structure formed by the plasma etching. When the transferring step is performed again with the negative structure as a mold, the same structure having the positive structure as the initial structure can be obtained. Such process for producing a structure is namely a process for producing a structure including the steps of transferring the shape of a structure having multiple salient portions produced by employing the plasma etching onto another substrate with the structure as a mold; and further transferring a structure produced by the transfer onto the other substrate onto any other member (substrate) with the structure as a mold.

In addition, an optical member having a substrate and an antireflection film can be produced by forming, on the surface of the substrate, a structure according to a process described in the examples of the processes for producing the structures described in the first to third embodiments described above.

Hereinafter, the present invention is described in more detail by way of examples.

EXAMPLE 1

Described in Example 1 is an example in which an optical member provided with an antireflection structure was obtained by forming a fine structure on a silica mesostructure film deposited onto a quartz glass substrate. The structure of this example corresponds to the case where in FIGS. 1A to 1C, a substrate 14 is quartz, the silica mesostructure is represented by reference numerals 11 and 15, and a salient portion formed of the silica mesostructure is represented by reference numeral 12.

First, a process for producing the optical member of this example is described in order with reference to FIGS. 1A to 1C.

(1-1) Substrate Preparation

A quartz glass substrate was prepared as the substrate 14.

(1-2) Formation of Silica Mesostructure Film (1-2-1) Preparation of Precursor Solution for Silica Mesostructure Film A precursor solution for a mesostructure is prepared by adding an ethanol solution of a block polymer to a solution described below and stirring the mixture for 3 hours. The solution is obtained by adding ethanol, 0.01 M hydrochloric acid, and tetraethoxysilane and mixing the contents for 20 minutes. The block polymer used is ethylene oxide (20) propylene oxide (70) ethylene oxide (20) (hereinafter, represented as EO(20)PO(70)EO(20) (numbers in parentheses each represent the number of repetitions of the respective blocks)). Methanol, propanol, 1,4-dioxane, tetrahydrofuran, or acetonitrile can be used instead of ethanol. The mixing ratio (molar ratio) "tetraethoxysilane:HCL:water:ethanol:block polymer" is set to 1.0:0.0011:6.1:8.7:0.0096. The solution is appropriately diluted before use, for the purpose of adjusting a film thickness.

(1-2-2) Deposition of Silica Mesostructure Film

A washed quartz glass substrate 14 is subjected to dip coating with a dip coating apparatus at a lifting speed of 0.5 mms$^{-1}$. After the deposition, the resultant is held in a thermo-hygrostat at 25° C. and a relative humidity of 40% for 2 weeks and subsequently at 80° C. for 24 hours to form the silica mesostructure film 15. In the silica mesostructure film produced in this example, the EO(20)PO(70)EO(20), which is an organic substance, is held in its mesopores. The observation of a cross section of the silica mesostructure film with a scanning electron microscope showed that cylindrical mesopores having a uniform diameter were periodically arranged in a honeycomb manner in the film produced in this example. The periodic arrangement of the mesopores in the film was able to be confirmed by the fact that a diffraction peak corresponding to a structural period of 8.0 nm was able to be observed in X-ray diffraction analysis.

(1-3) Plasma Etching

The silica mesostructure film formed on the quartz glass substrate 14 was subjected to plasma etching with an ICP-type plasma etching apparatus (manufactured by SAMCO INC.; high-density plasma ICP etching apparatus: RIE-101iP) under the following conditions to form the salient portions 12.

Reactive gas: $C_3F_8$
Gas flow rate: 20 sccm
Pressure: 3 Pa
ICP power: 500 W
Bias power: 20 W
Etching time: 9 minutes Multiple conical salient portions were formed on the surface of the mesostructure silica film after the plasma etching so as to be adjacent to each other. Thus, a fine structure having, on its surface, such salient portions that the averages of the respective numerical values illustrated in the schematic view of FIG. 1B were as follows was obtained: H=150 nm, Θ=30°, p=100 nm, T=60 nm, H/D=1.5. Here, the density of the salient portions was estimated to be 3.1×10$^{10}$ portions/cm$^2$. The distribution of the intervals of the respective salient portions is a normal distribution having a σ of 32 nm and the ratio σ/p is 0.32.

With regard to the respective values, the Θ, the H, the T, and the D were determined from a cross section photograph obtained with an electron microscope, and the p and the density were calculated by subjecting a plane photograph obtained with the electron microscope to image processing and acquiring the coordinates of the tip position of each salient portion. It should be noted that the H can be calculated by using an atomic force microscope, and it has been confirmed that the value thus obtained can match the value obtained from the electron microscope photograph. Those values are each determined by impartially taking electron microscope photographs whose fields of view have a size of 1 μm at twenty sites in a region, where the fine structure has been formed; and calculating the average of the respective values.

The composition analysis of the fine structure 11 was performed after the plasma etching in the depth direction of the film by X-ray photoelectron spectroscopy. At this time, fluorine atoms were incorporated into the fine structure 11 and a value for their amount was 25% on average in terms of Si atom ratio. It should be noted that it is confirmed from a binding energy position based on X-ray photoelectron spectroscopy that the fluorine atoms are present while being bonded to an Si atom. The foregoing shows that the etching progressed while fluorine was incorporated into the mesostructure silica film.

Here, as a comparison, a dense silica film free of any pore is subjected to plasma etching under the same conditions as those of this step. At this time, no salient portions (H=5 nm or less) are formed on its surface and no fluorine atom is detected in the depth direction of the film. In addition, even when the silica mesostructure film is used, in the case where plasma etching is performed with an Ar gas, no salient portions (H=5 nm or less) are formed on its surface and no argon atom derived from the etching gas is detected in the depth direction of the film.

The foregoing shows that in the step of forming the multiple salient portions by the plasma etching alone, the following conditions have important meaning upon formation of the structure of the present invention: the material is a mesostructure having mesopores; and the etching step is such that the etching is advanced with a reactive gas that reacts with the material forming the mesostructure while a component of the gas is incorporated into the mesostructure.

Thus, the antireflection structure 11 was formed on the quartz glass substrate 14.

(1-4) Reflectance Measurement

Reflectance measurement is performed by causing light to be perpendicularly incident on the quartz glass substrate, on which the structure having the multiple salient portions produced in Example 1 is formed, with a halogen lamp; and measuring the quantity of light reflected from the surface of the substrate (side on which the silica mesostructure film having the multiple salient portions is present). When an average reflectance in the light wavelength range of 400 nm to 700 nm is calculated, the reflectance of the surface of the substrate produced in Example 1 is 1.5%. As a comparison, the reflectance of a quartz glass substrate provided with no antireflection structure is measured by the same process. The reflectance is 5.0% and hence it is confirmed that the antireflection structure produced in Example 1 reduces the reflectance. The foregoing showed that as described in this example, the structure of the present invention having the multiple salient portions, which was provided with a mesostructure, functioned as an antireflection film.

EXAMPLE 2

Described in Example 2 is an example in which an optical member provided with an antireflection structure was obtained by forming a structure having multiple fine salient portions on a mesoporous silica film deposited onto a quartz glass substrate. The structure of this example corresponds to the case where in FIGS. 1A to 1C, a substrate 14 is quartz, the mesoporous silica is represented by reference numerals 11 and 15, and a salient portion formed of the mesoporous silica is represented by reference numeral 12.

A mesostructure silica thin film was formed on the quartz glass substrate 14 by the same process as that from the steps (1-1) to (1-2) of Example 1 ((2-1) to (2-2-2)).

(2-2-3) Transformation into Porous Body

The organic component held as a mold in the pores of the formed mesostructure film was removed by baking the film in a kiln under an air atmosphere at 400° C. for 4 hours. Thus, the mesoporous silica film 15 was obtained. The transmission electron microscope analysis of the resultant film showed that cylindrical mesopores having a uniform diameter were periodically arranged in a honeycomb manner in the mesoporous silica film produced in this example. The periodic arrangement of the mesopores in the film was able to be confirmed by the fact that a diffraction peak corresponding to a structural period of 6.0 nm was able to be observed in X-ray diffraction analysis.

(2-3) Plasma Etching

The mesoporous silica films formed on the quartz glass substrate 14 was subjected to plasma etching with an ICP-type plasma etching apparatus (manufactured by SAMCO INC.; high-density plasma ICP etching apparatus: RIE-101iP) under the following conditions.

Reactive gas: $SF_6$ gas
Gas flow rate: 20 sccm
Pressure: 3 Pa
ICP power: 100 W
Bias power: 100 W
Etching time: 2 minutes Multiple conical salient portions were formed on the surface of the mesoporous silica film after the plasma etching so as to be adjacent to each other. Thus, a fine structure having, on its surface, such salient portions that the averages of the respective numerical values illustrated in the schematic view of FIG. 1B were as follows was obtained: H=60 nm, Θ=30°, p=D=50 nm, T=60 nm, H/D=1.2. The density of the salient portions was estimated to be $6.5 \times 10^{10}$ portions/$cm^2$. The distribution of the intervals of the respective salient portions is a normal distribution having a σ of 14 nm and the ratio σ/p is 0.28.

The composition analysis of the fine structure 11 was performed after the plasma etching in the depth direction of the film by X-ray photoelectron spectroscopy. The analysis revealed that fluorine atoms were incorporated into a range up to the vicinity of the interface with the quartz glass substrate 14, and their amount was 50% on average in terms of Si atom ratio. It should be noted that it is confirmed from a binding energy position based on X-ray photoelectron spectroscopy that the fluorine atoms are present while being bonded to an Si atom. The foregoing shows that the etching progressed while fluorine was incorporated into the pores of the mesoporous silica film. The structure produced in this example, which had the multiple salient portions formed on the mesoporous silica film from which the organic component used as a mold had been removed, contained a larger amount of fluorine than the structure produced in Example 1, which had the multiple salient portions formed on the silica mesostructure film in a state where the organic substance as a mold remained. In addition, the structure of the present invention was able to be formed within a shorter plasma etching time than that of Example 1.

Thus, the structure 11 having the multiple salient portions of the present invention was formed on the quartz glass substrate 14.

(2-4) Reflectance Measurement

Reflectance measurement is performed by the same process as that of the step (1-4) of Example 1. The reflectance of the quartz glass having the structure of the present invention produced in Example 2 formed on its surface is 2.5% and the reflectance is reduced as compared with the reflectance of a quartz substrate on which no structure is formed. The foregoing showed that the structure of the present invention constituted of mesoporous silica produced in this example functioned as an antireflection film.

EXAMPLE 3

Described in Example 3 is an example in which an optical member provided with an antireflection structure was obtained by forming a fine structure on a titania mesostructure film deposited onto a quartz glass substrate. The structure of this example corresponds to the case where in FIGS. 1A to 1C, a substrate 14 is quartz, the titania mesostructure is represented by reference numerals 11 and 15, and a salient portion formed of the titania mesostructure is represented by reference numeral 12.

(3-1)

A quartz glass substrate was prepared as the substrate 14.

(3-2) Formation of Titania Mesostructure Film (3-2-1) Preparation of Precursor Solution for Titania Mesostructure Film A precursor solution for a titania mesostructure film is prepared by adding a butanol solution of a block polymer to an aqueous solution obtained by mixing 12 M hydrochloric acid and tetraethoxytitanium and stirring the resultant for 3 hours. The block polymer used is the same as that used in Examples 1 and 2, EO(20)PO(70)EO(20). The mixing ratio (molar ratio) "tetraethoxytitanium:hydrochloric acid:water: block polymer:butanol" is set to 1.0:2.0:6.0:0.013:9.0. The solution is appropriately diluted before use, for the purpose of adjusting a film thickness.

(3-2-2) Deposition of Titania Mesostructure Film

A titania mesostructure film of this example is formed by dropping the prepared solution onto the washed quartz glass substrate 14 and then performing spin coating. The spin coating is performed for 15 seconds under the conditions of 25° C., a relative humidity of 40%, and a rotational speed of the substrate of 3,000 rpm. After the deposition, the resultant is held in a thermo-hygrostat at 25° C. and a relative humidity of 95% for 30 hours to form the titania mesostructure film 15. The film thickness of the formed titania mesostructure film 15 is about 550 nm and its refractive index is determined to be 1.5 by ellipsometry. In the titania mesostructure film produced in this example, the EO(20)PO(70)EO(20), which is an organic substance, is held in its mesopores. The observation of a cross section of the titania mesostructure film with a scanning electron microscope shows that cylindrical mesopores having a uniform diameter are periodically arranged in a honeycomb manner in the film produced in this example. The periodic arrangement of the mesopores in the film can be confirmed by the fact that a diffraction peak corresponding to a structural period of 8.4 nm can be observed in X-ray diffraction analysis.

(3-3) Plasma Etching

The mesostructure titania thin film 15 formed on the quartz glass substrate 14 is subjected to plasma etching with the same ICP-type plasma etching apparatus as that used in Examples 1 and 2 under the following conditions.

Reactive gas: $SF_6$
Gas flow rate: 20 sccm
Pressure: 3 Pa
ICP power: 100 W
Bias power: 20 W
Etching time: 7 minutes Multiple conical salient portions were formed on the surface of the titania mesostructure film after the plasma etching so as to be adjacent to each other. Thus, a fine structure having, on its surface, such salient portions that the averages of the respective numerical values illustrated in the schematic view of FIG. 1B were as follows was obtained: H=80 nm, Θ=25°, p=60 nm, T=200 nm, H/D=1.33. Here, the density of the salient portions was estimated to be $6.5 \times 10^{10}$ portions/cm$^2$. The distribution of the intervals of the respective salient portions is a normal distribution having a σ of 14 nm and the ratio σ/p is 0.23.

The composition analysis of the fine structure 11 was performed after the plasma etching in the depth direction of the film by X-ray photoelectron spectroscopy. At this time, fluorine atoms were incorporated into the fine structure 11 and their amount was 25% in terms of Ti atom ratio. The foregoing shows that the etching progressed while fluorine was incorporated into the mesostructure titania film.

(3-4) Reflectance Measurement

Reflectance measurement is performed by the same process as that of the step (1-4) of Example 1. The reflectance of the quartz glass having formed thereon the structure of the present invention produced in Example 3 is 2%, and hence it is confirmed that the produced antireflection structure reduces the reflectance. The foregoing shows that the structure of the present invention constituted of the titania mesostructure produced in this example functions as an antireflection film.

EXAMPLE 4

Described in Example 4 is an example in which an optical member provided with an antireflection structure was obtained by forming a fine structure on a zirconia mesostructure film deposited onto a quartz glass substrate. The structure of this example corresponds to the case where in FIGS. 1A to 1C, a substrate 14 is quartz, the zirconia mesostructure is represented by reference numerals 11 and 15, and a salient portion formed of the zirconia mesostructure is represented by reference numeral 12.

(4-1)

A quartz glass substrate was prepared as the substrate 14.

(4-2) Formation of Zirconia Mesostructure Film (4-2-1) Preparation of Precursor Solution for Zirconia mesostructure film A precursor solution for a zirconia mesostructure film is prepared by adding a butanol solution of a block polymer to an aqueous solution obtained by mixing 12 M hydrochloric acid and zirconium chloride and stirring the resultant for 3 hours. The block polymer used is the same as that used in Examples 1 to 3, EO(20)PO(70)EO(20). The mixing ratio (molar ratio) "zirconium chloride:hydrochloric acid:water: block polymer:butanol" is set to 1.0:2.0:6.0:0.013:9.0. The solution is appropriately diluted before use, for the purpose of adjusting a film thickness.

(4-2-2) Deposition of Zirconia Mesostructure Film

A zirconia mesostructure film of this example is formed by dropping the prepared solution onto the washed quartz glass substrate 14 and then performing spin coating. The spin coating is performed for 15 seconds under the conditions of 25° C., a relative humidity of 40%, and a rotational speed of the substrate of 3,000 rpm. After the deposition, the resultant is held in a thermo-hygrostat at 25° C. and a relative humidity of 95% for 30 hours to form the zirconia mesostructure film 15. The film thickness of the formed zirconia mesostructure film 15 is about 400 nm and its refractive index is determined to be 1.4 by ellipsometry. In the zirconia mesostructure film produced in this example, the EO(20)PO(70)EO(20), which is an organic substance, is held in its mesopores. The observation of a cross section of the zirconia mesostructure film with a scanning electron microspoce shows that cylindrical mesopores having a uniform diameter are periodically arranged in a honeycomb manner in the film produced in this example. The periodic arrangement of the mesopores in the film can be confirmed by the fact that a diffraction peak corresponding to a structural period of 8.6 nm can be observed in X-ray diffraction analysis.

(4-3) Plasma Etching

The mesostructure zirconia thin film 15 formed on the quartz glass substrate 14 is subjected to plasma etching with the same ICP-type plasma etching apparatus as that used in Examples 1 to 3 under the following conditions.

Reactive gas: $SF_6$
Gas flow rate: 20 sccm
Pressure: 3 Pa
ICP power: 100 W
Bias power: 20 W
Etching time: 7 minutes Multiple conical salient portions were formed on the surface of the zirconia mesostructure film after the plasma etching so as to be adjacent to each other. Thus, a fine structure having, on its surface, such salient portions that the averages of the respective numerical values illustrated in the schematic view of FIG. 1B were as follows was obtained: H=60 nm, Θ=30°, p=50 nm, T=200 nm, H/D=1.2. Here, the density of the salient portions was estimated to be $6.5 \times 10^{10}$ portions/cm$^2$. The distribution of the intervals of the respective salient portions is a normal distribution having a σ of 15 nm and the ratio σ/p is 0.30.

The composition analysis of the fine structure 11 was performed after the plasma etching in the depth direction of the film by X-ray photoelectron spectroscopy. At this time, fluorine atoms were incorporated into the fine structure 11 and their amount was 25% in terms of Zr atom ratio. The foregoing shows that the etching progressed while fluorine was incorporated into the mesostructure zirconia film.

(4-4) Reflectance Measurement

Reflectance measurement is performed by the same process as that of the step (1-4) of Example 1. The reflectance of the quartz glass having formed thereon the structure of the present invention produced in Example 4 is 2%, and hence it is confirmed that the produced antireflection structure reduces the reflectance. The foregoing showed that the structure of the present invention constituted of zirconia mesostructure produced in this example functioned as an antireflection film.

EXAMPLE 5

Described in Example 5 are the structure of the present invention and a process for producing an optical member using the structure, the process involving transferring the shape of a fine structure onto another member by mold forming with the structure of the present invention having the multiple salient portions, which is produced on a glass substrate by the same process as that of Example 1, as a mold. Hereinafter, the process for producing an optical member of this example is described with reference to FIG. 12.

The structure 1203 of the present invention is produced on the quartz substrate 1201 by the same process as that from the steps (1-1) to (1-3) of Example 1.

(5-4) Mold Forming

A 50-μm spacer is provided on the substrate having formed thereon the structure and then the UV-curable resin 1204 (RC-C001: manufactured by Dainippon Ink and Chemicals, Inc.) is dropped onto the resultant. Subsequently, the quartz glass substrate 1205 subjected to a coupling treatment is slowly brought into contact with the UV-curable resin 1204 from above. After that, the substrate is brought into pressure contact with the resin, followed by pressing slow enough to prevent the inclusion of air bubbles. Thus, the UV-curable resin 1204 is uniformly filled between the quartz glass substrate 1205 and the fine structure 1203 formed on the quartz substrate 1201. Subsequently, the filled UV-curable resin 1204 is cured by being irradiated with ultraviolet light having a center wavelength of 365 nm at 40 mW for 750 seconds. After that, the cured product 1204 is separated from the surface of the fine structure 1203. Thus, the resin 1204 having the fine structure transferred on its surface is obtained on the quartz glass substrate 1205. When the structure of the structure having the multiple salient portions produced in Example 1 is defined as a positive, the transferred fine structure has a structure corresponding to the negative thereof.

(5-5) Reflectance Measurement

Reflectance measurement is performed by the same process as that of the step (1-4) of Example 1. The reflectance of the quartz glass having formed thereon the structure of the present invention produced by using the transferring step in Example 5 is 4%. It is confirmed from the foregoing that the antireflection structure produced in this example reduces the reflectance. The foregoing shows that as described in this example, the structure of the present invention having the multiple salient portions, which is provided with a mesostructure, functions as an antireflection film.

EXAMPLE 6

Described in Example 6 is a process for producing the structure of the present invention having the same shape as that of the structure produced in Example 1, the process involving further performing mold forming with the structure of the present invention having the multiple salient portions, which is produced on the quartz glass substrate by using the transferring step in Example 5, as a mold to transfer the structure onto another member.

(6-4) Mold Forming

A structure having a structure corresponding to the negative of the structure produced in Example 1, the structure being constituted of a photocurable resin, is formed on a quartz substrate by the same process as that of the steps up to the step (5-4) of Example 5. After amorphous carbon has been deposited as a separation layer onto the surface of the resin, a UV-curable resin is dropped by the same approach as that performed in Example 5. Subsequently, in the same manner as that described in Example 5, a quartz glass substrate subjected to a coupling treatment is slowly brought into contact with the UV-curable resin from above. After that, the substrate is brought into pressure contact with the resin, followed by pressing slow enough to prevent the inclusion of air bubbles. Thus, the UV-curable resin is uniformly filled between the quartz glass substrate and the fine structure formed on the quartz substrate in Example 5, the fine structure being constituted of the cured resin. Subsequently, the filled UV-curable resin is cured by being irradiated with ultraviolet light having a center wavelength of 365 nm at 40 mW for 750 seconds. After that, the two resins are separated from each other with the carbon separation layer. Thus, a resin having the fine structure transferred on its surface is obtained on the quartz glass substrate. The transferred fine structure has a structure having multiple salient portions substantially identical with the structure having the multiple salient portions produced in Example 1 because mold shaping has been performed twice.

(6-5) Reflectance Measurement

Reflectance measurement is performed by the same process as that of the step (1-4) of Example 1. The reflectance of the quartz glass having formed thereon the structure of the present invention produced by using the two-stage transferring step in Example 6 is 1.2%. It is confirmed from the foregoing that the antireflection structure produced in this example reduces the reflectance. The foregoing shows that as described in this example, the structure of the present invention having the multiple salient portions, which is provided with a mesostructure, functions as an antireflection film.

EXAMPLE 7

Described in Example 7 is an example in which an optical member having an antireflection ability is obtained by forming a structure having multiple fine salient portions on a mesoporous silica film deposited onto an optical glass substrate; and then introducing titania into the mesopores to match the refractive indices of the structure and the optical glass substrate with each other. The structure of this example corresponds to the case where in FIGS. 1A to 1C, the substrate 14 is optical glass, and reference numerals 11 and 15, and the salient portions 12 each represent mesoporous silica having titania formed in its mesopores.

Figure 23:
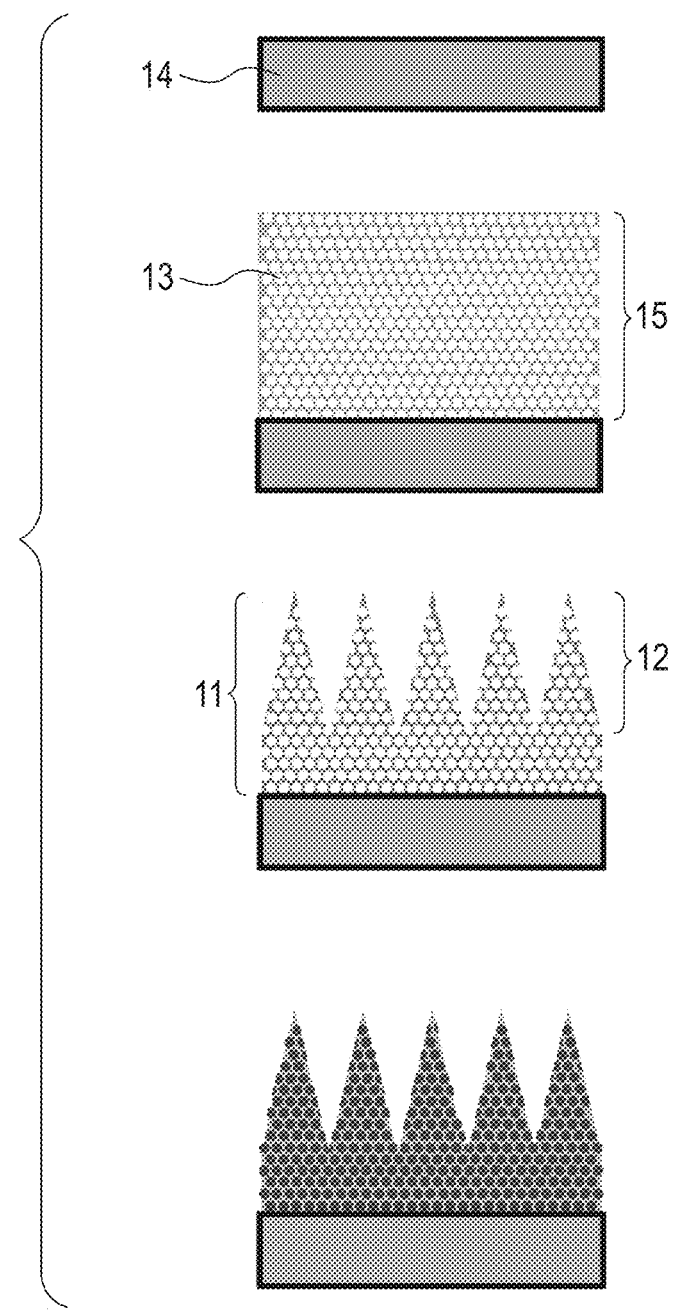
FIG. 23 is a view illustrating the production step of Example 7.

The production steps of this example are described with reference to FIG. 23.

(7-1) Substrate Preparation

An optical glass substrate having a refractive index of 1.6 is prepared as the substrate 14.

(7-2) Formation of Mesoporous Silica Film

A silica mesostructure film is formed on the optical glass substrate 14 by the same process as that from the steps (1-1) to (1-2) of Example 1 and the organic substance in its pores is removed by the same process as that of the step (2-2-3) of Example 2. Thus, the mesostructure (mesoporous silica film) 15 whose inside is a void is obtained. The transmission electron microscope analysis of the resultant film shows that cylindrical mesopores having a uniform diameter are periodically arranged in a honeycomb manner in the mesoporous silica film produced in this example. The periodic arrangement of the mesopores in the film can be confirmed by the fact that a diffraction peak corresponding to a structural period of 6.0 nm can be observed in X-ray diffraction analysis. The thickness of the film is about 500 nm. The refractive index of the mesoporous silica film produced in this step is determined to be 1.22 by ellipsometry.

(7-3) Plasma Etching

The mesoporous silica film 15 formed on the optical glass substrate 14 is subjected to plasma etching with the same ICP-type plasma etching apparatus as that used in Examples 1 to 6 under the following conditions.

Figure 13A:
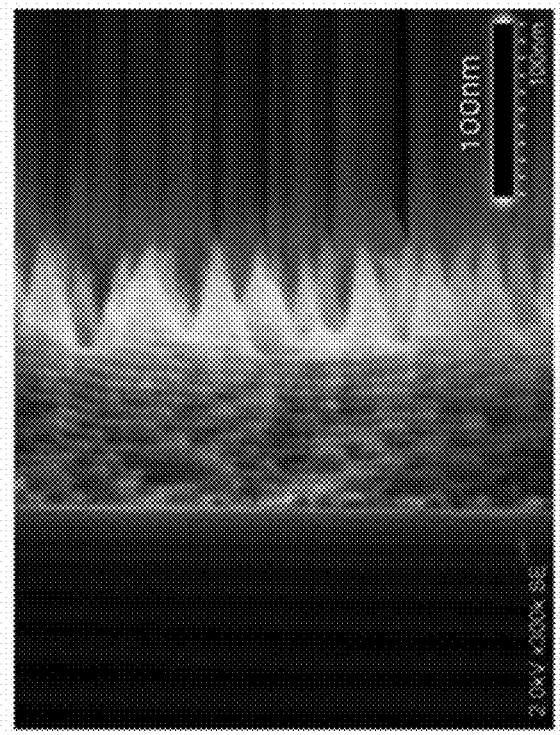
FIGS. 13A and 13B are each a scanning electron microscope photograph of a structure constituted of multiple fine and cone-shaped salient portions formed by plasma etching on a mesoporous silica film in Example 7.
Figure 13B:
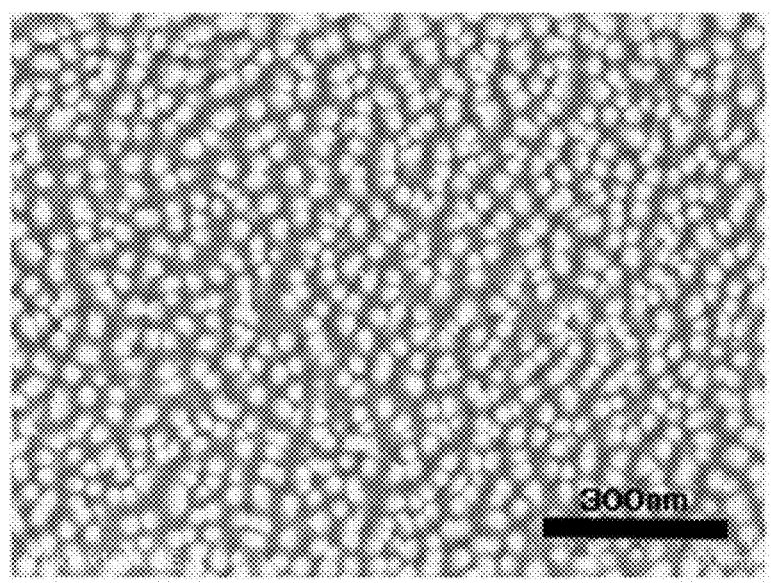

Reactive gas: $SF_6$ gas
Gas flow rate: 20 sccm
Pressure: 3 Pa
ICP power: 100 W
Bias power: 100 W
Etching time: 2 minutes The multiple conical salient portions 12 are formed on the surface of the mesoporous silica film after the plasma etching so as to be adjacent to each other. Thus, the fine structure 11 having, on its surface, such salient portions that the averages of the respective numerical values illustrated in the schematic view of FIG. 1B are as follows is obtained: H=60 nm, Θ=30°, p=50 nm, T=80 nm, H/D=1.2. FIGS. 13A and 13B show a scanning electron microscope photograph of the formed fine structure. FIG. 13A is a photograph of a cross section thereof and FIG. 13B is a photograph of the surface thereof. The density of the salient portions is estimated to be $6.5 \times 10^{10}$ portions/cm². The distribution of the intervals of the salient portions is a normal distribution having a σ of 14 nm and the ratio σ/p is 0.28.

The composition analysis of the fine structure 11 was performed after the plasma etching in the depth direction of the film by X-ray photoelectron spectroscopy. The analysis revealed that fluorine atoms were incorporated into a range up to the vicinity of the interface with the optical glass substrate 14, and their amount was 50% in terms of Si atom ratio. It should be noted that it is confirmed from a binding energy position based on X-ray photoelectron spectroscopy that the fluorine atoms are present while being bonded to an Si atom. The foregoing shows that the etching progressed while fluorine was incorporated into the mesoporous silica film.

(7-4) Introduction of Inorganic Material into Mesopores

Figure 14:
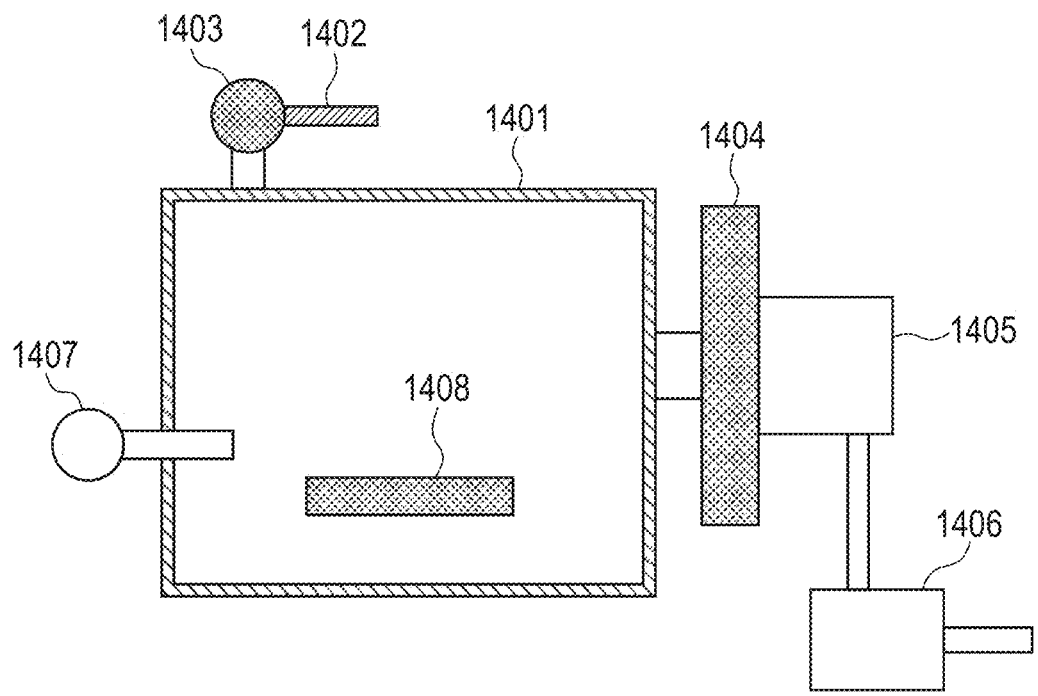
FIG. 14 is a schematic view for illustrating the construction of a low-pressure CVD apparatus to be used in the step of filling an inorganic material into a mesopore.

Subsequently, titania is introduced into the pores of mesoporous silica with such a low-pressure chemical vapor deposition (CVD) apparatus as illustrated in FIG. 14 to control its refractive index precisely. Thus, a structure is obtained. In FIG. 14, reference numeral 1401 represents a vacuum chamber, reference numeral 1402 represents a test tube in which a precursor has been stored, reference numeral 1403 represents a needle valve, reference numeral 1404 represents a main valve, reference numeral 1405 represents a turbo-molecular pump, reference numeral 1406 represents a dry scroll pump, reference numeral 1407 represents a vacuum gauge, and reference numeral 1408 represents a substrate holder.

As a pretreatment for CVD, the optical glass substrate having formed thereon the fine structure formed of mesoporous silica produced in the operations up to the step (7-3) is baked under an air atmosphere at 400° C. for 4 hours. After that, the substrate is set in the substrate holder in the vacuum chamber 1401 and then the inside of the chamber is evacuated to $2 \times 10^{-5}$ Pa, followed by heating at 300° C. for 3 hours to remove water adsorbing to the surface of the substrate and to clean the surface.

After the temperature of the substrate has been returned to room temperature, titanium isopropoxide is introduced into the vacuum chamber 1401 until the pressure becomes 5 Pa, and then low-pressure CVD is performed. In the CVD step, a silanol group present on the surface of a mesopore of mesoporous silica reacts with titanium isopropoxide to form an Si—O—Ti bond.

Seven hours after that, the substrate is taken out of the inside of the vacuum chamber and then subjected to in-depth analysis by X-ray photoelectron spectroscopy in a direction from the surface of the fine structure to a substrate interface. The analysis shows that Ti atoms are introduced in a relatively uniform manner from the surface of the fine structure to the vicinity of the substrate interface, and that the Ti atoms are introduced at about 73% in terms of Ti/Si atom ratio. It should be noted that it can be confirmed from a binding energy position based on X-ray photoelectron spectroscopy that the Ti atoms are present as titanium oxide (titania) $TiO_2$. As a result of the observation of the structure after the CVD with a scanning electron microscope, no significant change in shape of the structure is observed and the pores become hard to observe. Accordingly, it is found that titanium oxide is formed in the mesopores.

In this example, the introduction amount of titania is controlled so that the effective refractive index of the structure after the introduction of titania may be equal to the refractive index of the optical glass used here, i.e., 1.6 by determining such a calibration curve concerning the dependence of the refractive index on the introduction amount of titania as shown in FIG. 8D for CVD conditions, in particular, the time period for which the CVD is performed. The refractive indices in the cases where the structure constituted of mesoporous silica used in this example is subjected to the CVD under the same conditions for 5 hours and 3 hours for comparison are 1.5 and 1.4, respectively. The foregoing shows that the refractive index can be precisely controlled by precisely controlling the introduction amount of titania according to the low-pressure CVD process of this step.

As described above, it is shown that according to this step, the refractive index of the structure having the multiple salient portions of the present invention constituted of mesoporous silica can be matched with the refractive index of the substrate, i.e., 1.6 through the introduction of titania.

(7-5) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of mesoporous silica having titania introduced into its pores, the structure being produced in this example, is determined to be 2%. As a comparison, the reflectance of the optical glass having formed thereon the fine structure of the present invention constituted of mesoporous silica having hollow mesopores, the fine structure being produced by the same process as that from the steps (7-1) to (7-3) of this example while the step (7-4) of introducing titania into the mesopores is omitted, is measured. The reflectance is 4% and hence it is confirmed that the effect of refractive index control reduces the reflectance.

EXAMPLE 8

Described in Example 8 is an example in which the introduction of titania into the mesopores as the step (7-4) in Example 7 is performed by a layer-by-layer deposition process instead of the low-pressure CVD.

A structure having multiple irregularities constituted of mesoporous silica is produced by the same steps as the steps (7-1) to (7-3) of Example 7.

(8-4) Introduction of Inorganic Material into Mesopores

The introduction of titania into the mesopores and the precise control of the refractive index based thereon are performed with the same apparatus as that used in Example 7.

As a pretreatment for layer-by-layer deposition, the optical glass substrate having formed thereon the fine structure formed of mesoporous silica is baked under an air atmosphere at 400° C. for 4 hours. After that, the substrate is set in the substrate holder in the vacuum chamber 1401 and then the inside of the chamber is evacuated to $2 \times 10^{-5}$ Pa, followed by heating at 300° C. for 3 hours to remove water adsorbing to the surface of the substrate and to clean the surface.

After the temperature of the substrate has been returned to room temperature, titanium isopropoxide is introduced into the vacuum chamber 1401 until the pressure becomes 2 Pa, and then the pressure is held at the value for 30 minutes. The inside is evacuated to $1 \times 10^{-4}$ Pa again. After that, the valve 1404 of the vacuum pump is closed and then the pressure is returned to normal pressure by opening the chamber to the air. Five minutes after that, the inside is evacuated to $2 \times 10^{-5}$ Pa again and then heating is performed at 300° C. for 1 hour. In a state where the temperature of the substrate has reduced to room temperature, titanium isopropoxide is introduced again until the pressure becomes 2 Pa, and then the pressure is held at the value for 30 minutes.

In this step, in the initial step of introducing titanium isopropoxide, a silanol group present on the surface of a mesopore of mesoporous silica reacts with titanium isopropoxide to form an Si—O—Ti bond. In the next step of opening to the air, moisture in the air reacts with titanium isopropoxide bonded to the silanol group to form a Ti—OH bond. Further, in the next step of introducing titanium isopropoxide, the Ti—OH group reacts with titanium isopropoxide to form a Ti—O—Ti bond.

Therefore, in this step, titania can be formed on the inner wall of a mesopore layer by layer by repeating the following operations: titanium isopropoxide introduction→opening to the air→heating→cooling→titanium isopropoxide introduction. Accordingly, the process is called the layer-by-layer deposition process. The process is also called a surface sol-gel process and is an approach classified into one kind of the sol-gel processes.

Under the conditions of this example, the refractive index of the structure having the multiple salient portions of the present invention constituted of mesoporous silica can be matched with the refractive index of the substrate, i.e., 1.6 through the introduction of titania by repeating the step of introducing titanium isopropoxide three times including the initial introduction of titanium isopropoxide. When the refractive index of the substrate is different, the refractive index of the structure of the present invention can be precisely controlled by adjusting the number of times of repetition.

When the produced structure of this example is subjected to in-depth analysis by X-ray photoelectron spectroscopy in a direction from the surface of the fine structure to a substrate interface, it is found that Ti atoms are introduced at about 73% in terms of Si atom ratio in a relatively uniform manner from the surface of the fine structure to the vicinity of the substrate interface. It should be noted that it can be confirmed from a binding energy position based on X-ray photoelectron spectroscopy that the Ti atoms are present as titanium oxide (titania) $TiO_2$. As a result of the observation of the structure after the CVD with a scanning electron microscope, no significant change in shape of the structure is observed and the pores become hard to observe. Accordingly, it is found that titanium oxide is formed in the mesopores.

(8-5) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of mesoporous silica having titania introduced into its pores, the structure being produced in this example, is determined to be 2%. This value is the same as in the production by low-pressure CVD described in Example 7. As described in Example 7, the reflectance of the optical glass having formed thereon the fine structure of the present invention constituted of mesoporous silica having hollow mesopores is measured to be 4% and hence, in this embodiment as well, it is confirmed that the effect of refractive index control reduces the reflectance.

EXAMPLE 9

Described in Example 9 is an example in which the introduction of titania into the mesopores as the step (7-4) in Example 7 is performed by a liquid-phase method based on sol-gel process instead of the low-pressure CVD.

A structure having multiple irregularities constituted of mesoporous silica is produced by the same steps as the steps (7-1) to (7-3) of Example 7.

(9-4) Introduction of Inorganic Material into Mesopores

In a nitrogen gas atmosphere, a solution (80 wt %) of titanium isopropoxide in n-decane is prepared and then the substrate having formed thereon the structure having multiple irregularities constituted of mesoporous silica is immersed in the solution at room temperature for 1 hour. Subsequently, the substrate having formed thereon the structure is washed with n-decane and then dried. After that, the substrate is placed in distilled water and held for 24 hours. After that, the substrate is dried at 150° C. for 24 hours. Further, titania is introduced into the pores of the mesoporous silica structure by subjecting the substrate to atmospheric baking at 400° C. for 2 hours.

When the produced structure of this example is subjected to in-depth analysis by X-ray photoelectron spectroscopy in a direction from the surface of the fine structure to a substrate interface, it is found that Ti atoms are introduced at about 64% in terms of Ti/Si atom ratio in a relatively uniform manner. The effective refractive index of the structure after the introduction of titania produced in this example is 1.56, and hence a difference from the refractive index of the optical glass substrate, i.e., 1.60 is 0.04.

(9-5) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of mesoporous silica having titania introduced into its pores, the structure being produced in this example, is determined to be 2.2%. As described in Example 7, the reflectance of the optical glass having formed thereon the fine structure of the present invention constituted of mesoporous silica having hollow mesopores is measured to be 4%, and hence a reduction in reflectance by the effect of refractive index control is confirmed in this example as well by introducing titania into the mesoporous silica structure to reduce the difference in refractive index from the substrate.

EXAMPLE 10

Described in Example 10 is an example in which an optical member having an antireflection ability is obtained by forming a fine structure on a titania mesostructure film deposited onto an optical glass substrate; and then introducing silica into the mesopores and removing the organic substance to match the refractive indices of the structure and the optical glass substrate with each other. The structure of this example corresponds to the case where in FIGS. 1A to 1C, the substrate 14 is optical glass, and reference numerals 11 and 15, and the salient portions 12 each represent mesoporous titanium oxide having silica formed in its mesopores.

(10-1) Substrate Preparation

An optical glass substrate having a refractive index of 1.7 is prepared as the substrate 14.

(10-2) Formation of Titania Mesostructure Film

A titania mesostructure film having basically the same structure as that described in Example 3 is produced by the same steps as those described in the steps (3-2-1) to (3-2-2) of Example 3.

(10-3) Plasma Etching

A structure having multiple fine salient portions basically the same as that described in Example 3 is produced by the same plasma etching step as that described in the step (3-3) of Example 3.

(10-4) Introduction of Silica into Mesopores

The substrate having produced thereon the titania mesostructure having formed thereon the structure having the multiple salient portions produced as described above is placed in an autoclave having a volume of 70 ml and then 3 ml of tetramethyl orthosilicate (TMOS) are charged into the autoclave. After that, the autoclave is sealed and then silica is introduced into the mesopores of the titania mesostructure film by performing a treatment involving exposing the substrate to the steam of TMOS at 50° C. for 2 hours. Although a block copolymer as a mold is held in the mesopores of the titania mesostructure film to be exposed to the steam of TMOS, the inventors of the present invention have found that in this state as well, silica is formed in the pores by the process described in this example. After the treatment with the steam of TMOS, the substrate having formed thereon the structure is taken out of the autoclave and then the block copolymer as a mold is removed by baking the substrate in the air at 350° C. for 4 hours.

When in-depth analysis is performed by X-ray photoelectron spectroscopy in a direction from the surface of the fine structure produced in this example to an optical glass substrate interface, it is found that Si atoms are introduced into the film at about 49% in terms of Si/Ti atom ratio.

(10-5) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of mesoporous titania having silica introduced into its pores, the structure being produced in this example, is determined to be 2%. As a comparison, the reflectance of the optical glass having formed thereon the fine structure of the present invention constituted of mesoporous titania having hollow mesopores, the fine structure being produced by the same process as that from the steps (10-1) to (10-3) of this example while the step (10-4) of introducing silica into the mesopores is omitted, and being obtained through baking in the air at 250° C. for 4 hours, is measured. The reflectance is 4% and hence it is confirmed that the effect of refractive index control reduces the reflectance.

EXAMPLE 11

Described in Example 11 is an example in which an optical member having an antireflection ability is obtained by forming a fine structure on a zirconia mesostructure film deposited onto an optical glass substrate; and then introducing silica into the mesopores and removing the organic substance to match the refractive indices of the structure and the optical glass substrate with each other. The structure of this example corresponds to the case where in FIGS. 1A to 1C, the substrate 14 is optical glass, and reference numerals 11 and 15, and the salient portions 12 represent mesoporous zirconium oxide having silica formed in its mesopores.

(11-1) Substrate Preparation

An optical glass substrate having a refractive index of 1.7 is prepared as the substrate 14.

(11-2) Formation of Zirconia Mesostructure Film

A zirconia mesostructure film having basically the same structure as that described in Example 4 is produced by the same steps as those described in the steps (4-2-1) to (4-2-2) of Example 4.

(11-3) Plasma Etching

A structure having multiple fine salient portions basically the same as that described in Example 4 is produced by the same plasma etching step as that described in the step (4-3) of Example 4.

(11-4) Introduction of Silica into Pores

The substrate having produced thereon the zirconia mesostructure having formed thereon the structure having the multiple salient portions produced as described above is placed in an autoclave having a volume of 70 ml and then 3 ml of TMOS are charged into the autoclave. After that, the autoclave is sealed and then silica is introduced into the mesopores of the zirconia mesostructure film by performing a treatment involving exposing the substrate to the steam of TMOS at 50° C. for 2 hours. Although a block copolymer as a mold is held in the mesopores of the zirconia mesostructure film to be exposed to the steam of TMOS, the inventors of the present invention have found that in this state as well, silica is formed in the pores by the process described in this example. After the treatment with the steam of TMOS, the substrate having formed thereon the structure is taken out of the autoclave and then the block copolymer as a mold is removed by baking the substrate in the air at 350° C. for 4 hours.

When in-depth analysis is performed by X-ray photoelectron spectroscopy in a direction from the surface of the fine structure produced in this example to an optical glass substrate interface, it is found that Si atoms are introduced into the film at about 49% in terms of Si/Zr atom ratio.

(11-5) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of mesoporous zirconia having silica introduced into its pores, the structure being produced in this example, is determined to be 2%. As a comparison, the reflectance of the optical glass having formed thereon the fine structure of the present invention constituted of mesoporous zirconia having hollow mesopores, the fine structure being produced by the same process as that from the steps (11-1) to (11-3) of this example while the step (11-4) of introducing silica into the mesopores is omitted, and being obtained through baking in the air at 250° C. for 4 hours, is measured. The reflectance is 4% and hence it is confirmed that the effect of refractive index control reduces the reflectance.

EXAMPLE 12

Described in Example 12 is an example in which an optical member having an antireflection ability is obtained by modifying a mesoporous silica film deposited onto an optical glass substrate with an organic compound; subjecting the resultant to plasma etching to form a structure having multiple fine salient portions having a high aspect ratio; and introducing titania into the mesopores to match the refractive indices of the structure and the optical glass substrate with each other. Although the basic structure of the structure produced by this example is the same as that described in Example 7, the aspect ratio of the structure to be formed is different.

(12-1) Substrate Preparation

An optical glass substrate having a refractive index of 1.6 is prepared as the substrate 14.

(12-2) Formation of Mesoporous Silica Thin Film

A silica mesostructure film is formed on the optical glass substrate 14 by the same process as that from the steps (1-1) to (1-2) of Example 1 and the organic substance in its pores is removed by the same process as that of the step (2-2-3) of Example 2. Thus, the mesoporous silica film 15 is obtained. The transmission electron microscope analysis of the resultant film shows that cylindrical mesopores having a uniform diameter are periodically arranged in a honeycomb manner in the mesoporous silica film produced in this example. The periodic arrangement of the mesopores in the film can be confirmed by the fact that a diffraction peak corresponding to a structural period of 6.0 nm can be observed in X-ray diffraction analysis. The thickness of the film is about 500 nm. The refractive index of the mesoporous silica film produced in this step is determined to be 1.22 by ellipsometry.

(12-3) Surface Modification with Organic Compound

Trimethylchlorosilane was dropped onto the mesoporous silica film formed on the optical glass substrate and then spin coating was performed at a number of revolutions of 2,000 rpm for 30 seconds. After that, the substrate was washed with ethanol. Comparison between infrared absorption spectra before and after the treatment showed that after the treatment, an absorption peak at 3740 cm$^{-1}$ corresponding to an isolated silanol group (Si—OH) reduced as compared with that before the treatment and an absorption peak at 2960 cm$^{-1}$ corresponding to a methyl group (—CH$_3$) was observed. In addition, the composition analysis of the mesoporous silica film in its depth direction was performed by X-ray photoelectron spectroscopy. At this time, carbon atoms that had not been observed before the treatment were observed in a range up to the vicinity of an interface with the optical glass substrate after the treatment. It was able to be confirmed from the foregoing that the surface (including an external surface) of a mesopore of the mesoporous silica film was terminated with a trimethylsilyl group by the treatment.

(12-4) Plasma Etching

The mesoporous silica film subjected to the surface treatment is subjected to plasma etching with the same ICP-type plasma etching apparatus as that used in Examples 1 to 11 under the following conditions.

Figure 15A:
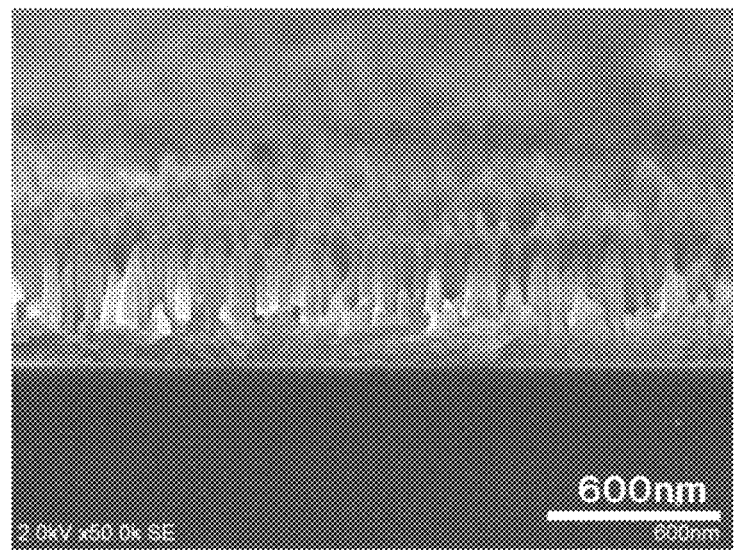
FIGS. 15A and 15B are each a scanning electron microscope photograph of a structure constituted of multiple fine and cone-shaped salient portions formed by plasma etching on a mesoporous silica film in Example 12.
Figure 15B:
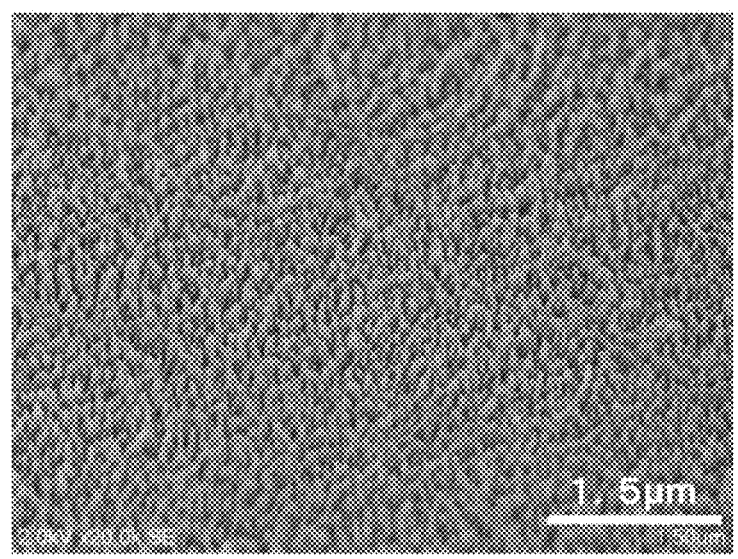

Reactive gas: C$_3$F$_8$
Gas flow rate: 20 sccm
Pressure: 3 Pa
ICP power: 500 W
Bias power: 50 W
Etching time: 90 seconds Multiple conical salient portions were formed on the surface of the mesoporous silica film after the plasma etching so as to be adjacent to each other. Thus, a fine structure having multiple fine salient portions was obtained. FIG. 15A (cross section photograph) and FIG. 15B (surface image taken at a substrate tilt angle of 75°) show scanning electron microscope photographs of the fine structure. The plasma etching provided a fine structure having, on its surface, such salient portions that the averages of the respective numerical values illustrated in the schematic view of FIG. 1B were as follows: H=320 nm, Θ=20°, p=D=70 nm, T=200 nm, H/D=4.6. Here, the density of the salient portions was estimated to be 5.2×10$^{10}$ portions/cm$^2$. The distribution of the intervals of the salient portions is a normal distribution having a σ of 30 nm and the ratio σ/p is 0.42. The foregoing showed that the aspect ratio of the salient portion to be formed was able to be drastically increased by performing the surface modification with the organic substance before subjecting the mesoporous silica film to the plasma treatment.

The composition analysis of the fine structure after the plasma etching was performed in the depth direction of the film by X-ray photoelectron spectroscopy. The analysis revealed that fluorine atoms were incorporated into a range up to the vicinity of the interface with the optical glass substrate, and their amount was about 50% on average in terms of F/Si atom ratio. It should be noted that it is confirmed from a binding energy position based on X-ray photoelectron spectroscopy that the fluorine atoms are present while being bonded to an Si atom. The foregoing shows that the etching progressed while fluorine was incorporated into the mesoporous silica film. Such structure could not be formed by plasma etching with an Ar gas.

(12-5) Introduction of Inorganic Material into Mesopores

Subsequently, titania is introduced into the mesopores of the structure formed of mesoporous silica produced in the foregoing step. The introduction of titania was performed with the same low-pressure CVD apparatus as that used in the step (7-4) of Example 7 under the same conditions as those used in the step (7-4). Seven hours after that, the substrate is taken out of the inside of the vacuum chamber and then subjected to in-depth analysis by X-ray photoelectron spectroscopy in a direction from the surface of the fine structure to a substrate interface. The analysis shows that Ti atoms are introduced in a uniform manner from the surface of the fine structure to the vicinity of the substrate interface, and that the Ti atoms are introduced at about 73% in terms of Ti/Si atom ratio. It should be noted that it can be confirmed from a binding energy position based on X-ray photoelectron spectroscopy that the Ti atoms are present as TiO$_2$. The introduction amount of titania converted into a pore filling ratio was about 60%.

The introduction amount is substantially the same as the introduction amount achieved in Example 7 and the refractive index of the structure of the present invention after the introduction of titania is about 1.6, which is substantially equal to the refractive index of the optical glass substrate used here. As described above, it is shown that according to this step, the refractive index of the structure having the multiple salient portions of the present invention constituted of mesoporous silica can be matched with the refractive index of the substrate, i.e., 1.6 through the introduction of titania.

(12-6) Reflectance Measurement

Figure 16:
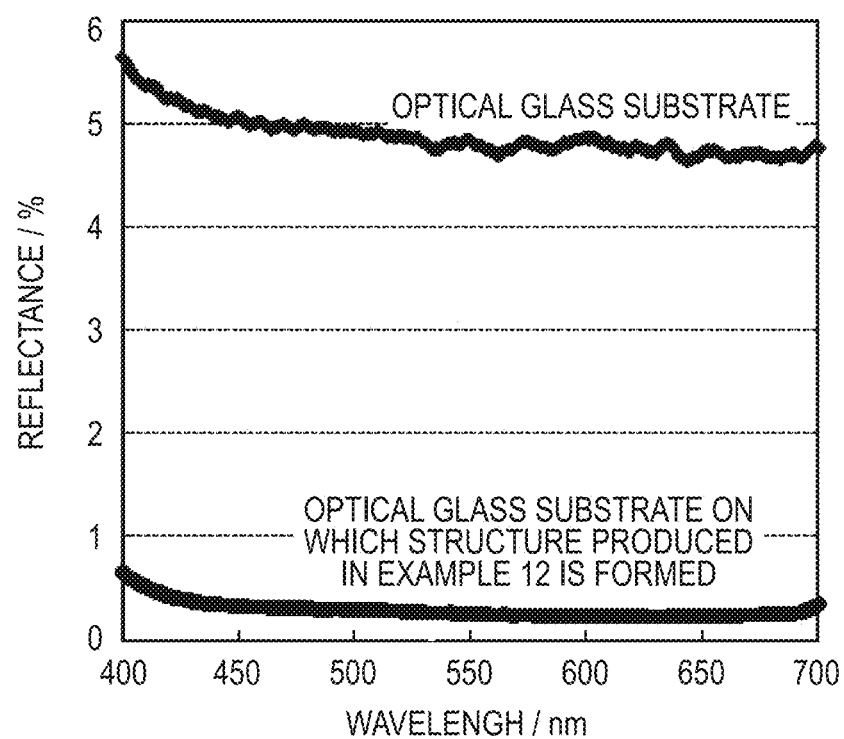
FIG. 16 is a graph showing the wavelength dependence of the reflectance of an antireflection film produced in Example 12.

Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of mesoporous silica having titania introduced into its pores, the structure being produced in this example, was determined to be 0.3%. As a comparison, the reflectance of the optical glass substrate used in this example provided with no antireflection structure was measured by the same process. The reflectance was 5% and hence it was confirmed that the antireflection structure produced in this example significantly reduced the reflectance. FIG. 16 shows the wavelength dependence of the reflectance of the optical glass substrate on which the structure produced in this example is formed and the optical glass substrate whose surface is not subjected to any coating. It was shown that the aspect ratio of the salient portion to be formed was able to be largely increased by subjecting the mesoporous silica film on the optical glass substrate to the plasma etching after performing the organic modification as described in this example, and an extremely low reflectance was able to be realized by introducing, into pores, titania with its amount controlled to match the refractive indices of the substrate and the structure.

EXAMPLE 13

Described in Example 13 is an example in which an optical member having an antireflection ability is obtained by modifying a mesoporous silica film deposited onto a quartz substrate with an organic compound; subjecting the resultant to plasma etching to form a structure having multiple fine salient portions having a high aspect ratio; and introducing silica into the mesopores to match the refractive indices of the structure and the quartz glass substrate with each other. The structure of this example corresponds to the case where in FIGS. 1A to 1C, the substrate 14 is quartz glass, and reference numerals 11 and 15, and the salient portions 12 represent mesoporous silica having silica formed in its mesopores.

(13-1) Substrate Preparation

A quartz glass substrate is prepared as the substrate 14.

(13-2) Formation of Mesoporous Silica Thin Film

A mesoporous silica film having substantially the same structure as that produced in Example 12 is produced by the same steps as the steps (12-1) to (12-2) of Example 12.

(13-3) Surface Modification with Organic Compound

The same organic modification is performed by the same step as the step (12-3) of Example 12.

(13-4) Plasma Etching

A structure substantially the same as the structure produced in Example 12 is produced with the same apparatus as that of the step (12-4) of Example 12 under the same conditions as those of the step.

(13-5) Introduction of Inorganic Material into Mesopores

The substrate having formed thereon the structure having the multiple salient portions produced in the foregoing step is placed in an autoclave having a volume of 70 ml and then 3 ml of TMOS are charged into the autoclave. After that, the autoclave is sealed and then a treatment involving exposing the substrate to the steam of TMOS at 50° C. for 2 hours is performed. Subsequent to the treatment, baking is performed in the air at 350° C. for 4 hours. Thus, a structure having silica introduced into the mesopores of mesoporous silica is formed.

(13-6) Reflectance Measurement

Reflectance measurement is performed by the same process as that of the step (1-4) of Example 1. When an average reflectance in the wavelength range of 400 nm to 700 nm is calculated, the reflectance of the quartz glass having formed thereon the structure of the present invention constituted of mesoporous silica having titania introduced into its pores, the structure being produced in this example, is determined to be 0.5%. As a comparison, the reflectance of the quartz glass substrate used in this example provided with no antireflection structure is measured by the same process. The reflectance is 5% and hence it is confirmed that the antireflection structure produced in this example significantly reduces the reflectance. It is shown that the aspect ratio of the salient portion to be formed can be largely increased by subjecting the mesoporous silica film on the quartz glass substrate to the plasma etching after performing the organic modification as described in this example, and an extremely low reflectance can be realized by introducing, into pores, silica with its amount controlled to match the refractive indices of the substrate and the structure.

EXAMPLE 14

Described in Example 14 is an example in which a structure having multiple salient portions having a large aspect ratio was produced by producing a mesoporous silica film having a large film thickness on a quartz substrate, and subjecting the resultant to the same plasma etching as that of Examples 12 and 13.

(14-1) Formation of Mesoporous Silica Film on Substrate

A silica mesostructure film is formed on a quartz glass substrate by the same process as that from the steps (1-1) to (1-2) of Example 1, and is then completely dried and solidified. After that, the step (1-2) is repeated again to provide a silica mesostructure film having a film thickness of about 1,000 nm. After that, the organic substance in its pores is removed by the same process as that of the step (2-2-3) of Example 2. Thus, a mesoporous silica film is obtained. The transmission electron microscope analysis of the resultant film shows that cylindrical mesopores having a uniform diameter are periodically arranged in a honeycomb manner in the mesoporous silica film produced in this example. The periodic arrangement of the mesopores in the film can be confirmed by the fact that a diffraction peak corresponding to a structural period of 6.0 nm can be observed in X-ray diffraction analysis.

(14-2) Surface Modification with Organic Compound

The mesoporous silica film is organically modified with trimethylchlorosilane by the same step as the step (12-3) of Example 12.

(14-3) Plasma Etching

After modification, the mesoporous silica film is subjected to plasma etching with the same ICP-type plasma etching apparatus as that used in Examples 1 to 13 under the following conditions.

Reactive gas: $C_3F_8$
Gas flow rate: 20 sccm
Pressure: 3 Pa
ICP power: 500 W
Bias power: 50 W
Etching time: 200 seconds Multiple conical salient portions are formed on the surface of the mesoporous silica film after the plasma etching so as to be adjacent to each other. Thus, a fine structure having, on its surface, such salient portions that the averages of the respective numerical values illustrated in the schematic view of FIG. 1B are as follows is obtained: H=620 nm, p=70 nm, D=60 nm, T=50 nm, H/D=10.3. Here, the density of the salient portions was estimated to be $6.0 \times 10^{10}$ portions/cm$^2$. The distribution of the intervals of the respective salient portions is a normal distribution having a σ of 15 nm and the ratio σ/p is 0.21.

In this example, it is shown that a structure having salient portions having an aspect ratio of 10 or more can be formed by increasing the initial film thickness of the mesoporous silica film and performing the plasma etching after the organic modification as described above.

EXAMPLE 15

Described in Example 15 is an example in which a structure having multiple salient portions having a large aspect ratio was produced by producing a mesoporous silica film having a large film thickness on a quartz substrate; modifying its surface with chlorotributylsilane; and subjecting the resultant to the same plasma etching as that of Examples 12 and 13.

(15-1) Formation of Mesoporous Silica Film on Substrate

A silica mesostructure film having a film thickness of about 1,000 nm is formed on a quartz substrate by the same step as the step (14-1) of Example 14. After that, the organic substance in its pores is removed by the same step. Thus, a mesoporous silica film is obtained. The mesoporous silica film produced in this example is of substantially the same structure as that of the mesoporous silica film produced in Example 14.

(15-2) Surface Modification with Organic Compound

Tributylchlorosilane is dropped onto the mesoporous silica film formed on the quartz glass substrate and then spin coating is performed at a number of revolutions of 2,000 rpm for 30 seconds. After that, the substrate is washed with ethanol. The termination of the surface (including an external surface) of a mesopore of the mesoporous silica film with a trimethylsilyl group is confirmed with an infrared absorption spectrum as in Example 12.

(15-3) Plasma Etching

After modification, the mesoporous silica film is subjected to plasma etching with the same ICP-type plasma etching apparatus as that used in Examples 1 to 14 under the following conditions.

Reactive gas: $C_3F_8$
Gas flow rate: 20 sccm
Pressure: 3 Pa
ICP power: 500 W
Bias power: 50 W
Etching time: 220 seconds Multiple conical salient portions are formed on the surface of the mesoporous silica film after the plasma etching so as to be adjacent to each other. Thus, a fine structure having, on its surface, such salient portions that the averages of the respective numerical values illustrated in the schematic view of FIG. 1B are as follows is obtained: H=550 nm, p=90 nm, D=90 nm, T=50 nm, H/D=6.1. Here, the density of the salient portions was estimated to be $6.0 \times 10^{10}$ portions/cm$^2$. The distribution of the intervals of the respective salient portions is a normal distribution having a σ of 15 nm and the ratio σ/p is 0.21.

This example shows that even when organic modification is performed with organic substance except trimethylchlorosilane is performed as described above, the aspect ratio of fine salient portion to be formed by the plasma etching of the mesoporous silica film can be increased.

EXAMPLE 16

Described in Example 16 is an example in which an optical member having an antireflection ability is obtained by laminating and depositing mesoporous silica films having different pore structures onto an optical glass substrate to form a structure having multiple fine salient portions; and then introducing titania into the mesopores to match the refractive indices of the structure and the optical glass substrate with each other. In the construction of this example, the filling ratio of titania in the mesopores reduces in a direction from the bottom portion of the salient portions to the tip thereof, and as a result, the Ti/Si ratio reduces in the direction. The construction of the structure to be produced in this example is similar to the construction of the structure produced in Example 7 but the former construction differs from the latter construction in the following: while the mesoporous silica film of a single structure is used in Example 7, the mesoporous silica films having different structures are laminated and used in this example.

The structure of this example corresponds to the case where in FIGS. 1A to 1C, the substrate 14 is optical glass, and reference numerals 11 and 15, and the salient portions 12 represent mesoporous silica in which layers having different pore structures having titania formed in their mesopores are laminated.

(16-1) Substrate Preparation

A quartz glass substrate is prepared as the substrate 14.

(16-2) Formation of Mesoporous Silica Thin Film (16-2-1) Production of First Silica Mesostructure Film A precursor solution for a first silica mesostructure film is prepared according to the procedure of the step (1-2-1) of Example 1. The composition of the solution is the following composition (molar ratio) having an ethanol concentration higher than that described in Example 1: tetraethoxysilane: 1.0, HCl: 0.0011, water: 6.1, ethanol: 29.0, block polymer: 0.0096. The amount of ethanol is increased for reducing the thickness of the first silica mesostructure film. The first silica mesostructure film is produced with the solution on the quartz glass substrate by dip coating under the same conditions as those of Example 1. The thickness of the film is determined to be 90 nm. Observation with a scanning electron microscope reveals that the first silica mesostructure film has the same structure, except the film thickness, as that of the silica mesostructure film produced in Example 1, in which cylindrical mesopores having a uniform diameter are periodically arranged in a honeycomb manner. In addition, the periodic arrangement of the mesopores in the film can be confirmed by the fact that a diffraction peak corresponding to a structural period of 8.0 nm can be observed in X-ray diffraction analysis.

(16-2-2) Production of Second Silica Mesostructure Film

At the stage at which the solidification of silica in the first silica mesostructure film produced in the process has sufficiently progressed, a second silica mesostructure film having a different structure is produced on the first silica mesostructure film. Although the production is basically the same as the step (1-2-1) of Example 1, solution composition (molar ratio) is set as follows: tetraethoxysilane: 1.0, HCl: 0.0011, water: 6.1, ethanol: 10.0, block polymer: 0.0096, ethylene glycol: 0.067. The inventors of the present invention have already found that the addition of ethylene glycol results in the loss of the periodic arrangement of mesopores in a silica mesostructure film to be formed. The second silica mesostructure film is produced with the solution on the quartz glass substrate having formed thereon the first silica mesostructure film by dip coating under the same conditions as those of Example 1. The thickness of the film is determined to be 400 nm.

(16-2-3) Transformation into Porous Body

A mesoporous silica film is obtained by removing the organic substance in the pores by the same process as that of the step (2-2-3) of Example 2.

(16-3) Plasma Etching

The mesoporous silica film of a two-layer construction produced in the foregoing step is subjected to plasma etching with the same ICP-type plasma etching apparatus as that used in Examples 1 to 11 under the following conditions.

Reactive gas: $SF_6$
Gas flow rate: 20 sccm
Pressure: 3 Pa
ICP power: 100 W
Bias power: 100 W
Etching time: 2 minutes Multiple conical salient portions were formed on the surface of the mesoporous silica film after the plasma etching so as to be adjacent to each other. Thus, a fine structure having multiple fine salient portions was obtained. The plasma etching provided a fine structure having, on its surface, such multiple salient portions that the averages of the respective numerical values illustrated in the schematic view of FIG. 1B were as follows: H=60 nm, $\Theta=30°$, p=D=50 nm, T=60 nm, H/D=1.2. Here, the density of the salient portions was estimated to be $5.0\times10^{10}$ portions/cm². The distribution of the intervals of the salient portions is a normal distribution having a $\sigma$ of 14 nm and the ratio $\sigma/p$ is 0.28. The average distance from a substrate interface to the tip of the salient portion is about 120 nm, which shows that about a half of the salient portion in the formed structure on a side close to its tip has the second mesoporous silica structure and about a half thereof on a side close to its base has the first mesoporous silica structure. The composition analysis of the fine structure after the plasma etching was performed in the depth direction of the film by X-ray photoelectron spectroscopy. The analysis revealed that fluorine atoms were incorporated into a range up to the vicinity of the interface with the optical glass substrate, and their amount was about 50% on average in terms of an Si atom ratio. It should be noted that it is confirmed from a binding energy position based on X-ray photoelectron spectroscopy that the fluorine atoms are present while being bonded to an Si atom. The foregoing shows that the etching progressed while fluorine was incorporated into the mesoporous silica film.

(16-4) Introduction of Inorganic Material into Mesopores

Subsequently, titania is introduced into the mesopores of the structure formed of mesoporous silica produced in the foregoing step. The introduction of titania was performed with the same low-pressure CVD apparatus as that used in the step (7-4) of Example 7 under the same conditions as those used in the step (7-4). Seven hours after that, the substrate is taken out of the inside of the vacuum chamber and then subjected to in-depth analysis by X-ray photoelectron spectroscopy in a direction from the surface of the fine structure to the substrate interface. The Ti/Si ratio is determined to be about 0.65 near the surface and the Ti/Si ratio is determined to be about 0.73 near the substrate, and hence it is found that the relative ratio of Ti is smaller near the surface by about 10%. The in-depth analysis is performed by repeatedly performing ion sputtering and measuring a photoelectron spectrum every time ion sputtering is performed. The difference shows that it is more difficult to introduce titania into a pore of the second mesoporous silica film in which the structural periodicity of the mesopores is disturbed, the film being formed in the half on the tip side of the salient portion, than into a pore of the first mesoporous silica film having the structural periodicity of the mesopores, the film being formed in the half on the substrate side of the salient portion. In actuality, it is confirmed by observation with a transmission electron microscope that the filling ratio of titania in the pores of the first mesoporous silica film is lower than the filling ratio in the pores of the second mesoporous silica film. The inventors of the present invention consider that the foregoing results from the fact that in the case of a pore structure free of any structural periodicity, a precursor for titanium oxide is hard to diffuse in its pores in the CVD step. The Ti/Si ratios of 0.65 and 0.73 are converted into filling ratios of titania of 55% and 62%, respectively.

As described above, it is confirmed that in the structure having the multiple fine salient portions produced in this example, the filling ratio of titania in the mesopores reduces in a direction from the bottom portion of the salient portions to the tip thereof, and as a result, the Ti/Si ratio reduces in the direction.

(16-5) Reflectance Measurement

Reflectance measurement is performed by the same process as that of the step (1-4) of Example 1. When an average reflectance in the wavelength range of 400 nm to 700 nm is calculated, the reflectance of the quartz glass having formed thereon the structure of the present invention constituted of the two mesoporous silica films having different structures, the films having titania introduced into their pores, the structure being produced in this example, is determined to be 1.8%. The reflectance is lower than the reflectance of the quartz substrate having formed thereon the structure having the same structure as that of this example, the structure being produced with mesoporous silica of a single structure in Example 2. In this example, it is confirmed that an antireflection effect can be additionally improved by reducing, in the salient portion in the structure of the present invention, the filling ratio of titania in the mesopores in a direction from the bottom portion of the salient portion to its tip.

EXAMPLE 17

Described in Example 17 is an example in which an optical member having an antireflection ability is obtained by laminating and depositing mesoporous silica films having different structural periods and different pore diameters onto an optical glass substrate to form a structure having multiple fine salient portions; and then introducing titania into the mesopores to match the refractive indices of the structure and the optical glass substrate with each other. In the construction of this example, the filling ratio of titania in the mesopores reduces in a direction from the bottom portion of the salient portions to its tip, and as a result, a Ti/Si ratio reduces in the direction. The construction of the structure to be produced in this example is similar to the construction of the structure produced in Example 16 but the former construction differs from the latter construction in the following: while the mesoporous silica films having different structures are laminated and used in Example 16, the mesoporous silica films having different structural periods and different pore diameters are laminated in this example.

(17-1) Substrate Preparation

A quartz glass substrate is prepared as the substrate 14.

(17-2) Formation of Mesoporous Silica Thin Film (17-2-1) Production of First Silica Mesostructure Film A precursor solution for a first silica mesostructure film is prepared according to the procedure of the step (1-2-1) of Example 1. Here, a surfactant Brij 56 (trade name, manufactured by Sigma-Aldrich, =polyoxyethylene-10-cetyl ether) different from that used in Example 1 is used as a mold. The precursor solution is prepared by adding a solution of the Brij 56 in 2-propanol to a solution prepared by adding 2-propanol, 0.01 M hydrochloric acid, and tetraethoxysilane, and mixing the contents for 20 minutes; and stirring the mixture for 3 hours. The composition (molar ratio) of the solution is as follows: tetraethoxysilane: 1.0, block polymer: 0.080, 2-propanol: 25, hydrochloric acid: 0.0011, water: 6.1. The first silica mesostructure film is produced with the solution on the quartz glass substrate by dip coating under the same conditions as those of Example 1. The thickness of the film is determined to be 100 nm. Observation with a scanning electron microscope reveals that the first silica mesostructure film has a structure in which cylindrical mesopores having a uniform diameter are periodically arranged in a honeycomb manner. In addition, the periodic arrangement of the mesopores in the film can be confirmed by the fact that a diffraction peak corresponding to a structural period of 5.0 nm can be observed in X-ray diffraction analysis.

(17-2-2) Production of Second Silica Mesostructure Film

At the stage at which the solidification of silica in the first silica mesostructure film produced in the process has sufficiently progressed, a second silica mesostructure film having a different structure is produced on the first silica mesostructure film. A precursor solution for a second silica mesostructure film is prepared according to the procedure of the step (1-2-1) of Example 1. The composition of the solution is also the same as that described in Example 1. The second silica mesostructure film is produced with the solution on the quartz glass substrate having formed thereon the first silica mesostructure film by dip coating under the same conditions as those of Example 1. The thickness of the film is determined to be 500 nm. Observation with a scanning electron microscope reveals that the second silica mesostructure film has the same structure as that of the silica mesostructure film produced in Example 1, in which cylindrical mesopores having a uniform diameter are periodically arranged in a honeycomb manner. In addition, the periodic arrangement of the mesopores in the film can be confirmed by the fact that a diffraction peak corresponding to a structural period of 8.0 nm can be observed in X-ray diffraction analysis.

(17-2-3) Transformation into Porous Body

A mesoporous silica film is obtained by removing the organic substance in the pores by the same process as that of the step (2-2-3) of Example 2.

(17-3) Plasma Etching

The mesoporous silica film of a two-layer construction produced in the foregoing step is subjected to plasma etching with the same ICP-type plasma etching apparatus as that used in Examples 1 to 11 under the following conditions. These conditions are the same as the conditions in Example 16.

Reactive gas: $SF_6$
Gas flow rate: 20 sccm
Pressure: 3 Pa
ICP power: 100 W
Bias power: 100 W
Etching time: 2 minutes Multiple conical salient portions were formed on the surface of the mesoporous silica film after the plasma etching so as to be adjacent to each other. Thus, a fine structure having multiple fine salient portions was obtained. The plasma etching provided a fine structure having, on its surface, such multiple salient portions that the averages of the respective numerical values illustrated in the schematic view of FIG. 1B were as follows: H=60 nm, $\Theta$=30°, p=D=50 nm, T=70 nm, H/D=1.2. Here, the density of the salient portions was estimated to be $6.5 \times 10^{10}$ portions/cm². The distribution of the intervals of the salient portions is a normal distribution having a $\sigma$ of 16 nm and the ratio $\sigma/p$ is 0.30. The average distance from a substrate interface to the tip of the salient portion is about 130 nm, which shows that about a half of the salient portion in the formed structure on a side close to its tip has the second mesoporous silica structure having a larger structural period and about a half thereof on a side close to its base has the first mesoporous silica structure having a smaller structural period. The composition analysis of the fine structure after the plasma etching was performed in the depth direction of the film by X-ray photoelectron spectroscopy. The analysis revealed that fluorine atoms were incorporated into a range up to the vicinity of the interface with the optical glass substrate, and their amount was about 50% on average in terms of Si atom ratio. It should be noted that it is confirmed from a binding energy position based on X-ray photoelectron spectroscopy that the fluorine atoms are present while being bonded to an Si atom. The foregoing shows that the etching progressed while fluorine was incorporated into the mesoporous silica film.

(17-4) Introduction of Inorganic Material into Mesopores

Subsequently, titania is introduced into the mesopores of the structure formed of mesoporous silica produced in the foregoing step. The introduction of titania was performed with the same low-pressure CVD apparatus as that used in the step (7-4) of Example 7 under the same conditions as those used in the step (7-4). Four hours after that, the substrate is taken out of the inside of the vacuum chamber and then subjected to in-depth analysis by X-ray photoelectron spectroscopy in a direction from the surface of the fine structure to the substrate interface. The Ti/Si ratio is determined to be about 0.65 near the surface and the Ti/Si ratio is determined to be about 0.73 near the substrate, and hence it is found that the relative ratio of Ti is smaller near the surface by about 10%. The in-depth analysis is performed by repeatedly performing ion sputtering and measuring a photoelectron spectrum every time ion sputtering is performed. The difference shows that the introduction amount of titania in a pore of the second mesoporous silica film in which the structural periodicity of the mesopores is large, the film being formed in the half on the tip side of the salient portion, is smaller than that in a pore of the first mesoporous silica film in which the structural periodicity of the mesopores is small, the film being formed in the half on the substrate side of the salient portion. In actuality, it is confirmed by observation with a transmission electron microscope that the filling ratio of titania in the pores of the first mesoporous silica film is lower than the filling ratio in the pores of the second mesoporous silica film. The inventors of the present invention consider that this is because of the following reason: the diameter of the mesopore of the mesoporous silica film having the smaller structural periodicity is smaller than the diameter of the mesopore of the mesoporous silica film having the larger structural periodicity, and hence when the films are placed in the steams of a precursor for titanium oxide having the same partial pressure, a larger amount of the precursor is introduced into the pores of the latter film. The Ti/Si ratios of 0.65 and 0.73 are converted into filling ratios of titania of 55% and 62%, respectively.

As described above, it is confirmed that in the structure having the multiple fine salient portions produced in this example, the filling ratio of titania in the mesopores reduces in a direction from the bottom portion of the salient portions to the tip thereof, and as a result, the Ti/Si ratio reduces in the direction.

(17-5) Reflectance Measurement

Reflectance measurement is performed by the same process as that of the step (1-4) of Example 1. When an average reflectance in the wavelength range of 400 nm to 700 nm is calculated, the reflectance of the quartz glass having formed thereon the structure of the present invention constituted of the two mesoporous silica films having different structural periods, the films having titania introduced into their pores, the structure being produced in this example, is determined to be 1.8%. The reflectance is lower than the reflectance of the quartz substrate having formed thereon the structure having the same structure as that of this example, the structure being produced with mesoporous silica of a single structure in Example 2. In this example, it is confirmed that an antireflection effect can be additionally improved by reducing, in the salient portion in the structure of the present invention, the filling ratio of titania in the mesopores in a direction from the bottom portion of the salient portion to its tip.

EXAMPLE 18

Described in Example 18 is an example in which an optical member having an antireflection ability is obtained as described below. Multiple fine irregularities are formed on a mesoporous silica film having a single structure. After that, in order that matching with the refractive index of a substrate may be achieved, titania is uniformly introduced into the mesopores with its amount controlled. After that, titania in the pores is partially removed by etching to form such a structure that the filling ratio of titania in the mesopores reduces in a direction from the bottom portion of the salient portions to the tip thereof, and as a result, the ratio Ti/Si reduces in the direction.

(18-1) Substrate Preparation

An optical glass substrate having a refractive index of 1.6 is prepared as the substrate 14.

(18-2) Formation of Mesoporous Silica Thin Film

A silica mesostructure film is formed on the optical glass substrate 14 by the same process as that from the steps (1-1) to (1-2) of Example 1 and the organic substance in its pores is removed by the same process as that of the step (2-2-3) of Example 2. Thus, the mesoporous silica film 15 is obtained. The transmission electron microscope analysis of the resultant film shows that cylindrical mesopores having a uniform diameter are periodically arranged in a honeycomb manner in the mesoporous silica film produced in this example. The periodic arrangement of the mesopores in the film can be confirmed by the fact that a diffraction peak corresponding to a structural period of 6.0 nm can be observed in X-ray diffraction analysis. The thickness of the film is about 500 nm. The refractive index of the mesoporous silica film produced in this step is determined to be 1.22 by ellipsometry.

(18-3)

A structure having multiple fine salient portions is formed by subjecting the mesoporous silica film to plasma etching by the same step as the step (7-3) of Example 7. The shape of the formed structure is substantially the same as that obtained in Example 7.

(18-4) Introduction of Inorganic Material into Mesopores

Titania is introduced into the mesopores of the structure by the same step as the step (7-4) of Example 7. The amount of titania to be introduced into the pores is substantially equal to that of Example 7. It is shown that the refractive index of the structure having the multiple salient portions of the present invention constituted of mesoporous silica can be matched with the refractive index of the substrate, i.e., 1.6 by this step.

(18-5) Formation of Distribution of Filling Ratios of Inorganic Material by Etching The filling ratio of titania on the tip side of the salient portion of the structure having the multiple fine salient portions constituted of mesoporous silica having titania introduced into its mesopores is reduced by subjecting the structure to partial removal of titania by wet etching. The etching of titania is performed by mixing ammonia water having a concentration of 20% and hydrogen peroxide water having a concentration of 20% at a volume ratio of 1:1; diluting the mixture with water so that the entirety may have a predetermined concentration to prepare an etching liquid; and immersing, in the etching liquid, the optical glass substrate having formed thereon the structure containing titania in its mesopores, the structure being produced in the step (18-4), at room temperature for 5 minutes. The etching liquid does not etch silica and the optical glass substrate, but selectively etches titania. A mesopore is shorter near the tip of the fine structure than that at its bottom portion, and hence titania is more easily eluted. Accordingly, such a structure that the filling ratio of titania reduces in a direction from the bottom portion of the fine structure to its tip portion can be formed by this step. The distribution of the filling ratios is confirmed by observation with a transmission electron microscope.

When the substrate subjected to the etching is subjected to in-depth analysis by X-ray photoelectron spectroscopy in a direction from the surface of the fine structure to an optical glass substrate interface, the Ti/Si ratio is determined to be about 0.58 near the surface and the Ti/Si ratio is determined to be about 0.73 near the substrate, and hence it is found that the relative ratio of Ti is smaller near the surface by about 20%. The in-depth analysis is performed by repeatedly performing ion sputtering and measuring a photoelectron spectrum every time ion sputtering is performed. The Ti/Si ratios of 0.73 and 0.58 are converted into filling ratios of titania of 49% and 62%, respectively.

As described above, it is confirmed that in the structure having (18-6) Reflectance measurement Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of the two mesoporous silica films having different structural periods, the films having titania introduced into their pores, the structure being produced in this example, is determined to be 1.7%. The reflectance is lower than the reflectance of the quartz substrate having a refractive index lower than that of the optical glass of this example and having formed thereon the structure having the same structure as that of this example, the structure being produced with mesoporous silica of a single structure in Example 2. In this example, it is confirmed that an antireflection effect can be additionally improved by reducing, in the salient portion in the structure of the present invention, the filling ratio of titania in the mesopores in a direction from the bottom portion of the salient portion to its tip.

EXAMPLE 19

Described in Example 19 is an example in which an optical member having an antireflection ability is obtained by forming, on a substrate having a curvature, a structure having multiple fine salient portions constituted of a mesoporous silica film having titania introduced into its mesopores, the structure being of the same construction as that of Example 7.

(19-1) Substrate Preparation

A lens whose convex surface has a radius of curvature of 60 mm and a lens whose concave surface has a radius of curvature of 25 mm are prepared as substrates. A material for each lens is the optical glass used in Example 7.

(19-2) Formation of Silica Mesostructure Film (19-2-1) Preparation of Precursor Solution for Silica Mesostructure Film The same precursor solution for a silica mesostructure as in Example 1 is produced by the same step as the step (1-2-1) of Example 1.

(19-2-2) Deposition of Silica Mesostructure Film

A silica mesostructure film of this example is formed by dropping the precursor solution onto the lenses that have been washed and then performing spin coating. The spin coating is performed for 180 seconds under the conditions of 25° C., a relative humidity of 40%, and a rotational speed of the substrate of 4,000 rpm. After the deposition, the resultant is held in a thermo-hygrostat at 25° C. and a relative humidity of 40% for 2 weeks and subsequently at 80° C. for 24 hours to form the silica mesostructure film. A mesoporous silica film is obtained by baking the film along the same step as the step (2-2-3) of Example 2 to remove the organic component in the pores. The mesoporous silica film produced in this example has substantially the same structure as that of the film produced in Example 2, though the films differ from each other in application step. In addition, the observation of the film separated from the lens with a transmission electron microscope reveals that cylindrical mesopores having a uniform diameter are periodically arranged in a honeycomb manner and the structural period of the mesopores is about 6.0 nm. It is confirmed that the mesoporous silica film that is transparent and has high uniformity is formed on the convex surface and concave surface of the lenses used in this example.

(19-3) Plasma Etching

The lens-shaped mesoporous silica film is subjected to plasma etching under the same conditions as those of the step (7-3) of Example 7. The structural parameters of the structure having the multiple salient portions formed on the surface of the film after the plasma etching are substantially the same as those of the structure produced on the flat substrate in Example 7. The analysis of fluorine in the film shows that in this case as well, the etching progressed while fluorine was incorporated into the mesoporous silica film.

(19-4) Introduction of Inorganic Material into Mesopores

Titania is introduced into the mesopores of the mesoporous silica film by the same step as that of Example 7 under the same conditions as those of the example. X-ray photoelectron spectroscopy confirms that there is no difference in introduction amount of titania between the case of the flat substrate and the case of the substrate having a curvature used in this example.

(19-5) Reflectance Measurement

Reflectance measurement is performed by the same process as that of the step (1-4) of Example 1. Reflectances in the wavelength range of 400 nm to 700 nm are measured at three different sites on both a convex lens and a concave lens. At the time of the reflectance measurement, the holding angle of each lens is adjusted so that the incident angle is 90° at each measurement site. When an average reflectance is calculated, the reflectance of both the concave lens and the convex lens each having formed thereon the structure of the present invention constituted of mesoporous silica having titania introduced into its pores, the structure being produced in this example, is determined to be about 2%. The reflectance is substantially equal to the reflectance achieved on the flat substrate in Example 7 and hence it is shown that an antireflection film using the structure of the present invention can be satisfactorily formed on a lens having a curvature.

EXAMPLE 20

Described in Example 20 is an example in which an optical member provided with an antireflection structure is obtained by directly forming a structure having multiple fine salient portions on a quartz glass substrate 2001 through plasma etching.

(20-1) Substrate Preparation

A quartz glass substrate was prepared as the substrate 14.

(20-2) Plasma Etching

The quartz glass substrate is subjected to plasma etching with the same ICP-type plasma etching apparatus as that used in Examples 1 to 19 under the following conditions.

Reactive gas: $SF_6$ gas
Gas flow rate: 20 sccm
Pressure: 10 Pa
ICP power: 100 W
Bias power: 10 W
Etching time: 70 minutes
Etching rate: 6 nm/min Here, the etching rate is determined from a reduction in film thickness of a thermal oxide film of silicon oxide formed on an Si substrate, the thermal oxide film being prepared as a reference.

Figure 17A:
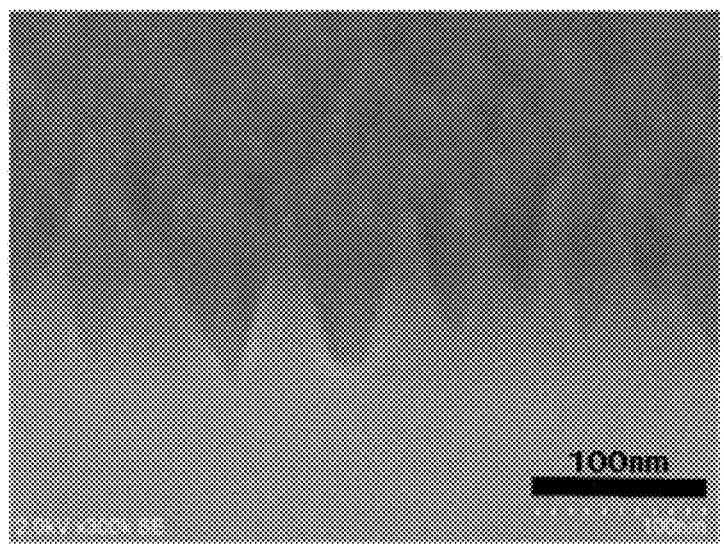
FIGS. 17A and 17B are each a scanning electron microscope photograph of a structure constituted of multiple fine and cone-shaped salient portions formed by plasma etching on a quartz glass substrate in Example 20.
Figure 17B:
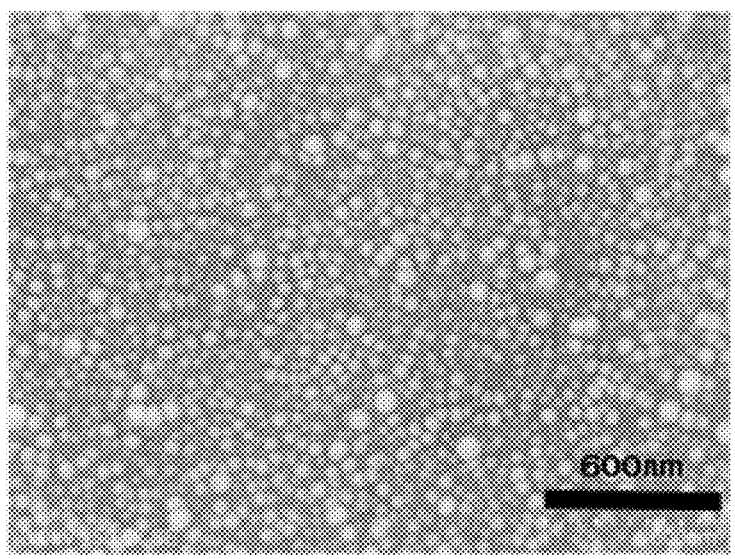

Multiple conical salient portions were formed on the surface of the quartz substrate after the plasma etching so as to be adjacent to each other. Thus, a fine structure having multiple fine salient portions of the present invention was obtained. FIGS. 17A and 17B show electron microscope photographs of the fine structure formed in this example. FIG. 17A is a photograph of a cross section thereof and FIG. 17B is a photograph of the surface thereof. The plasma etching provided such salient portions that the averages of the respective numerical values illustrated in the schematic view of FIG. 1B were as follows: H=75 nm, Θ=28°, p=D=61 nm, H/D=1.2. The density of the salient portions was estimated to be $7.2 \times 10^{10}$ portions/cm². The distribution of the intervals of the respective salient portions is a normal distribution having a σ of 22 nm and the ratio σ/p is 0.36. The multiple salient portions were formed according to random arrangement so as to cover the surface of the substrate completely.

The composition analysis of the fine structure having the multiple fine salient portions thus formed was performed in the depth direction of the film by X-ray photoelectron spectroscopy. At this time, fluorine atoms were observed up to a depth of 15 nm from the surface of the fine structure in the depth direction and the amount of the fluorine atoms in the range from the surface to the depth of 15 nm was 35% with respect to Si atoms constituting the quartz glass. It should be noted that it can be confirmed from a binding energy position based on X-ray photoelectron spectroscopy that the fluorine atoms are bonded to an Si atom. The foregoing shows that the etching progressed while fluorine was incorporated into the quartz glass as a member.

Here, as a comparison, the bias power as a condition for the plasma etching step was set to 15 W. In this case, the etching rate became 10 nm/min, fluorine was not detected in the depth direction of the film, and no salient portions were formed on the surface. However, when the bias power is set to a value lower than the bias power of this example, the same structure as that of this example can be formed, though it takes a longer time to form the structure. The inventors of the present invention have confirmed the presence or absence of the formation of the structure of the present invention by finely controlling the etching rate. As a result, the inventors have found that an etching rate of 10 nm/min is a threshold for the formation of the structure of the present invention because the formation of the structure can be confirmed under the etching condition of 9 nm/min. The foregoing has shown that when the structure of the present invention is formed by the plasma etching of dense silicon oxide that is not a mesostructure, the etching rate needs to be controlled to 10 nm/min or less.

In addition, in the case where the plasma etching is performed with an Ar gas at the same etching rate as that of this step as well, no salient portions are formed on the surface, and as a matter of course, no fluorine atom is detected in the depth direction of the film.

(20-3) Reflectance Measurement

Reflectance measurement was performed by the same process as that of the step (1-4) of Example 1. When an average reflectance in the wavelength range of 400 nm to 700 nm was calculated, the reflectance of the surface of the quartz glass having formed thereon the structure having multiple fine irregularities, the structure being produced in this example, was 2.5%. As a comparison, the reflectance of the quartz glass substrate provided with no antireflection structure was measured by the same process. The reflectance was 5% and hence it was confirmed that the antireflection structure produced in this example reduced the reflectance. The structure of the present invention having the multiple fine salient portions whose aspect ratios have been changed by changing an etching time can contribute to a reduction in reflectance when the aspect ratios are larger than 1/2, that is, when the vertical angle of the cone-shaped salient portion is an acute angle.

EXAMPLE 21

Described in Example 21 is an example in which an optical member provided with an antireflection structure is obtained by forming a dense silicon oxide thin film on an optical glass substrate and then forming a structure having multiple fine salient portions through plasma etching.

(21-1) Substrate Preparation

An optical glass substrate is prepared as the substrate 14.

(21-2) Production of Silicon Oxide Thin Film

An silicon oxide thin film is formed on the optical glass substrate by the following procedures.

(21-2-1) Preparation of Precursor Solution for Silicon Oxide

A precursor solution for silicon oxide is prepared by adding ethanol, 0.01 M hydrochloric acid, and tetraethoxysilane, followed by stirring the contents for 2 hours.

(21-2-2) Deposition of Silicon Oxide Thin Film

The top of the optical glass substrate is subjected to dip coating with the prepared precursor solution for silicon oxide by using a dip coating apparatus at a pulling rate of 0.5 mms$^{-1}$. After the deposition, the resultant is dried in the air at room temperature for 4 hours. Subsequently, a silicon oxide film having a thickness of 280 nm is formed by increasing the temperature surrounding the dried product to 400° C. and baking the dried product for 4 hours.

(21-3) Plasma Etching

The optical glass substrate having formed thereon the silicon oxide thin film is subjected to plasma etching with the same ICP-type plasma etching apparatus as that used in Examples 1 to 20 under the following conditions.

Reactive gas: $SF_6$
Gas flow rate: 20 sccm
Pressure: 10 Pa
ICP power: 100 W
Bias power: 10 W
Etching time: 45 minutes
Etching rate: 6 nm/min Obtained on the surface of the quartz substrate after the plasma etching was a structure in which multiple conical and fine salient portions were formed so as to be adjacent to each other. The averages of the respective numerical values illustrated in the schematic view of FIG. 1B were as follows: H=115 nm, Θ=25°, p=D=62 nm, H/D=1.85. The density of the salient portions was estimated to be $7\times10^{10}$ portions/cm$^2$. The distribution of the intervals of the respective salient portions is a normal distribution having a σ of 24 nm and the ratio σ/p is 0.39. The multiple salient portions were formed according to random arrangement so as to cover the surface of the substrate completely. In this case as well, whether or not the structure could be formed was closely related to the etching rate and a structure having the features could not be formed at an etching rate of 10 nm/min or more.

The composition analysis of the formed fine structure was performed in the depth direction of the film by X-ray photoelectron spectroscopy. At this time, fluorine atoms were observed up to a depth of 20 nm from the surface of the fine structure in the depth direction and the amount of the fluorine atoms in the range from the surface to the depth of 20 nm was 40% with respect to Si atoms constituting the silicon oxide thin film. It should be noted that it can be confirmed from a binding energy position based on X-ray photoelectron spectroscopy that the fluorine atoms are bonded to an Si atom. The foregoing shows that the etching progressed while fluorine was incorporated into silicon oxide.

(21-4) Reflectance Measurement

Reflectance measurement was performed by the same process as that of the step (1-4) of Example 1. When an average reflectance in the wavelength range of 400 nm to 700 nm was calculated, the reflectance of the surface of the optical glass substrate having the silicon oxide thin film having formed thereon the structure having multiple fine irregularities, the structure being produced in this example, was 1.8%. As a comparison, the reflectance of the optical glass substrate having formed thereon the silicon oxide thin film provided with no antireflection structure was measured by the same process. The reflectance was 5% and hence it was confirmed that the antireflection structure produced in this example reduced the reflectance. The structure of the present invention having the multiple fine salient portions whose aspect ratios have been changed by changing an etching time can contribute to a reduction in reflectance when the aspect ratios are larger than 1/2, that is, when the vertical angle of the cone-shaped salient portion is an acute angle.

EXAMPLE 22

Described in Example 22 is an example in which an optical member is provided with an antireflection structure by directly forming a structure having multiple fine salient portions on an optical glass substrate through plasma etching.

Plasma etching was performed on optical glass BK7 (refractive index: 1.51) and SF11 (refractive index: 1.78) by the same process and conditions as in Example 20.

The shape of each fine structure obtained by the plasma etching is such that the averages of the respective numerical values illustrated in the schematic view of FIG. 1B are as described below: in the case of BK7, H=60 nm, Θ=30°, p=D=50 nm, H/D=1.2, density of salient portion: $6.5 \times 10^{10}$ portions/cm$^2$, distribution of interval of salient portion: normal distribution of σ=18 nm, σ/p=0.36; and in the case of SF11, H=70 nm, Θ=25°, p=D=55 nm, H/D=1.27, density of salient portion: $6.0 \times 10^{10}$ portions/cm$^2$, distribution of interval of salient portion: normal distribution of σ=20 nm, σ/p=0.36.

The composition analysis of the formed fine structures was performed in the depth direction of the film by X-ray photoelectron spectroscopy. At this time, in both cases, fluorine atoms were observed up to a depth of 10 nm from the surface of the fine structure in the depth direction, which shows that the etching progressed while fluorine was incorporated into the optical glass material.

In the optical glass substrates each having formed thereon the structure of this example, the following clear antireflection effect is obtained: the reflectance of the optical glass substrate is reduced to 1/2 or less.

EXAMPLE 23

Described in Example 23 is an example in which an antireflection structure is provided by directly forming a structure having multiple fine salient portions on substrates of various oxide (zirconium oxide, tantalum oxide, titanium oxide, and hafnium oxide) through plasma etching. The various oxide substrates (zirconium oxide, tantalum oxide, titanium oxide, and hafnium oxide) was subjected to the plasma etching by the same process as that of Examples 20 and 21 under the same conditions as those of the example.

The shape of each fine structure after the plasma etching is such that the averages of the respective numerical values illustrated in the schematic view of FIG. 1B are as described below.

Zirconium oxide: H=65 nm, Θ=30°, p=D=55 nm, H/D=1.18, density of salient portion: $6.5 \times 10^{10}$ portions/cm$^2$, distribution of interval of salient portion: normal distribution of σ=18 nm, σ/p=0.36.

Tantalum oxide: H=70 nm, Θ=25°, p=D=55 nm, H/D=1.27, density of salient portion: $6.5 \times 10^{10}$ portions/cm$^2$, distribution of interval of salient portion: normal distribution of σ=15 nm, σ/p=0.27.

Titanium oxide: H=110 nm, Θ=20°, p=D=60 nm, H/D=1.83, density of salient portion: $7.2 \times 10^{10}$ portions/cm$^2$, distribution of interval of salient portion: normal distribution of σ=15 nm, σ/p=0.25.

Hafnium oxide: H=80 nm, Θ=25°, p=D=60 nm, H/D=1.33, density of salient portion: $6.1 \times 10^{10}$ portions/cm$^2$, distribution of interval of salient portion: normal distribution of σ=14 nm, σ/p=0.23.

The composition analysis of the formed fine structures was performed in the depth direction of the film by X-ray photoelectron spectroscopy. At this time, in the materials, fluorine atoms were observed up to a depth of 10 nm from the surface of the fine structure in the depth direction, which shows that the etching progressed while fluorine was incorporated into the constituent material for the substrate.

In the optical glass substrates each having formed thereon the structure of this example, the following clear antireflection effect is obtained: the reflectance of the optical glass substrate is reduced to 1/2 or less.

EXAMPLE 24

Described in Example 24 is the following example. A laminated film is produced by forming a silica mesostructure thin film on a quartz glass substrate and then forming, on the thin film, a dense silicon oxide film with an etching rate smaller than that of the silica mesostructure. First, a structure having multiple fine salient portions is formed on the silicon oxide thin film as a surface by subjecting the silicon oxide thin film to first plasma etching. Subsequently, a structure having multiple fine salient portions having a large aspect ratio is formed on the silica mesostructure film as a substrate by subjecting the silica mesostructure film to second plasma etching through the structure formed on the silicon oxide thin film.

This example is described with reference to FIG. 11.

(24-1) Substrate Preparation

A quartz glass substrate is prepared as the substrate 1101.

(24-2) Formation of Silica Mesostructure Film

A silica mesostructure film 1102 is formed by the same step as the step (1-2) of Example 1. The structure of the resultant film is the same as that described in Example 1.

(24-3) Production of Silicon Oxide Thin Film

On the optical glass substrate, an silicon oxide thin film is formed by the following procedure.

(24-3-1) Preparation of Precursor Solution for Silicon Oxide

A precursor solution for silicon oxide is prepared by adding ethanol, 0.01 M hydrochloric acid, and tetraethoxysilane, followed by stirring the contents for 2 hours.

(24-3-2) Deposition of Silicon Oxide Thin Film

With the prepared precursor solution for silicon oxide, dip coating is performed at a pulling rate of 0.5 mms$^{-1}$ onto the quartz glass substrate by using a dip coating apparatus. After the deposition, the resultant is held in a thermo-hygrostat at 25° C. and a relative humidity of 40% for 2 weeks and subsequently at 80° C. for 48 hours to form an silicon oxide thin film 1103 having a thickness of 350 nm.

(24-4) First Plasma Etching

The silicon oxide thin film 1103 is subjected to first plasma etching with the same ICP-type plasma etching apparatus as that used in Examples 1 to 23 under the following conditions.

Reactive gas: $SF_6$
Gas flow rate: 20 sccm
Pressure: 10 Pa
ICP power: 100 W
Bias power: 10 W
Etching time: 45 minutes
Etching rate: 6 nm/min Obtained on the silicon oxide thin film 1103 after the first plasma etching is a fine structure in which multiple conical salient portions are formed so as to be adjacent to each other. The averages of the respective numerical values illustrated in the schematic view of FIG. 1B are as follows: H=65 nm, Θ=25°, p=D=55 nm, H/D=1.18. The density of the salient portions is estimated to be $7 \times 10^{10}$ portions/cm$^2$. The distribution of the intervals of the respective salient portions is a normal distribution having a σ of 24 nm and the ratio σ/p is 0.39. The multiple salient portions are formed according to random arrangement so as to cover the surface of the silicon oxide thin film completely. The structure is substantially the same as that formed in Example 21. As described in Example 21, the first plasma etching needs to be performed so that the etching rate may be 10 nm/min or less.

The composition analysis of the formed structure 1104 having the multiple fine salient portions is performed in the depth direction of the film by X-ray photoelectron spectroscopy. At this time, fluorine atoms are observed up to a depth of 20 nm from the surface of the fine structure in the depth direction and the amount of the fluorine atoms in the range from the surface to the depth of 20 nm is determined to be 40% with respect to Si atoms constituting the silicon oxide thin film. It should be noted that it can be confirmed from a binding energy position based on X-ray photoelectron spectroscopy that the fluorine atoms are bonded to an Si atom. The foregoing shows that the first plasma etching progressed while fluorine was incorporated into silicon oxide thin film 1103.

(24-5) Second Plasma Etching

Next, the silica mesostructure film is subjected to second plasma etching with the same apparatus through the fine structure 1104 formed on the silicon oxide thin film. Conditions for the second plasma etching are the same as the conditions for the first plasma etching except that the bias power is changed from 10 W to 20 W and the pressure is changed from 10 Pa to 3 Pa, and the etching time is set to 10 minutes. Under the conditions for the second plasma etching, the etching rate of the silicon oxide thin film is smaller than the etching rate of the silica mesostructure film. The foregoing is confirmed by measuring an etching rate under the conditions for the second plasma etching with the silica mesostructure film and the silicon oxide thin film deposited alone onto another reference substrate as a reference sample. Under the conditions for the second plasma etching in this example, the etching rate of the silica mesostructure thin film is 30 nm. In contrast, the etching rate of the silicon oxide film is 15 nm. Accordingly, it is confirmed that the silicon oxide thin film has a slower etching rate.

After the second plasma etching, the silicon oxide thin film is completely removed and multiple conical salient portions are formed on the exposed silica mesostructure film so as to be adjacent to each other. Thus, the fine structure 1106 is obtained. The averages of the respective numerical values illustrated in the schematic view of FIG. 1B are as follows: H=230 nm, Θ=13°, p=D=62 nm, H/D=3.7. The density of the salient portions is estimated to be $7.0 \times 10^{10}$ portions/cm$^2$. The distribution of the intervals of the respective salient portions is a normal distribution having a σ of 24 nm and the ratio σ/p is 0.39. It is confirmed that the multiple salient portions are formed according to random arrangement so as to cover the surface of the silica mesostructure film completely.

(24-6) Transformation into Porous Body

A mesoporous silica film is obtained by removing the organic substance in the pores by the same process as that of the step (2-2-3) of Example 2.

(24-7)

Reflectance measurement is performed by the same process as that of the step (1-4) of Example 1. The reflectance of the quartz glass having formed on its surface the structure of the present invention produced in this example is 1.4%. The reflectance is significantly reduced as compared with the reflectance of the quartz substrate on which no structure has been formed, i.e., 5.0%. It should be noted that even the reflectance of such a structure before transformation into a porous body that the organic substance remains in the mesopores is 2.8%, which is lower than the reflectance of the quartz substrate. The foregoing shows that the structure of the present invention constituted of mesoporous silica produced in this example functions as an antireflection film.

EXAMPLE 25

Described in Example 25 is the following example. A laminated film is produced by forming a titania mesostructure film on an optical glass substrate and then forming, on the film, a dense silicon oxide thin film having an etching rate smaller than that of the titania mesostructure. First, a structure having multiple fine salient portions is formed on the silicon oxide thin film as a surface by subjecting the silicon oxide thin film to first plasma etching. Subsequently, a structure having multiple fine salient portions having a large aspect ratio is formed on the titania mesostructure film as a substrate by subjecting the titania mesostructure film to second plasma etching through the structure formed on the silicon oxide thin film.

This example is also described with reference to FIG. 11.

(25-1) Substrate Preparation

An optical glass substrate having a refractive index of 1.6 is prepared as the substrate 1101.

(25-2) Formation of Titania Mesostructure Film

A titania mesostructure film 1102 is formed by the same step as the step (3-2) of Example 3. The structure of the resultant film is the same as that described in Example 3.

(25-3) Production of Silicon Oxide Thin Film

A silicon oxide thin film 1102 having a film thickness of 350 nm, the same film thickness as that produced in Example 24 is formed by the same step as the step (24-3) of Example 24.

(25-4) First Plasma Etching

First plasma etching is performed on the silicon oxide thin film 1103 with the same apparatus and conditions as those in the step (24-4) of Example 24. The structure of the structure formed on the silicon oxide thin film is the same as that produced in Example 24.

(25-5) Second Plasma Etching

Next, the titania mesostructure film is subjected to second plasma etching with the same apparatus through the fine structure 1104 formed on the silicon oxide thin film. Conditions for the second plasma etching are the same as the conditions described in the step (24-5) of Example 24. The etching time is also set to the same value as that of Example 24, i.e., 10 minutes. Under the conditions for the second plasma etching, the etching rate of the titania mesostructure film is 30 nm. In contrast, the etching rate of the silicon oxide thin film is 15 nm. Accordingly, it is confirmed that the silicon oxide thin film has a slower etching rate.

After the second plasma etching, the silicon oxide thin film is completely removed and multiple conical salient portions are formed on the exposed titania mesostructure film so as to be adjacent to each other. Thus, the fine structure 1106 is obtained. The averages of the respective numerical values illustrated in the schematic view of FIG.

1B are as follows: H=220 nm, Θ=13°, p=D=60 nm, H/D=3.7. The density of the salient portions is estimated to be $7.2 \times 10^{10}$ portions/cm$^2$. The distribution of the intervals of the respective salient portions is a normal distribution having a σ of 15 nm and the ratio σ/p is 0.25. It is confirmed that the multiple salient portions are formed according to random arrangement so as to cover the surface of the titania mesostructure film completely.

The reflectance of the optical glass substrate having formed thereon the structure constituted of the titania mesostructure having the multiple fine salient portions produced in this example is 2.6%. Accordingly, it is confirmed that low reflection equal to or less than one half of the reflectance of the optical glass not subjected to any coating can be realized.

EXAMPLE 26

Described in Example 26 is the following example. A laminated film is produced by forming a zirconia mesostructure film on an optical glass substrate and then forming, on the film, a dense zirconium oxide thin film with an etching rate smaller than that of the zirconia mesostructure. First, a structure having multiple fine salient portions is formed on the zirconium oxide thin film as a surface by subjecting the zirconium oxide thin film to first plasma etching. Subsequently, a structure having multiple fine salient portions having a large aspect ratio is formed on the zirconia mesostructure film as a substrate by subjecting the zirconia mesostructure film to second plasma etching through the structure formed on the zirconium oxide thin film.

This example is also described with reference to FIG. 11.

(26-1) Substrate Preparation

An optical glass substrate having a refractive index of 1.6 is prepared as the substrate 1101.

(26-2) Formation of Zirconia Mesostructure Film

A zirconia mesostructure film 1102 is formed by the same step as the step (4-2) of Example 4. The structure of the resultant film is the same as that described in Example 4.

(26-3) Production of Zirconium Oxide Thin Film

A zirconium oxide thin film 1103 having a film thickness of 350 nm is formed by magnetron sputtering.

(26-4) First Plasma Etching

First plasma etching is performed on the zirconium oxide thin film 1103 with the same apparatus and conditions as those in the step (24-4) of Example 24.

Multiple conical salient portions are formed on the zirconium oxide thin film 1103 after the first plasma etching so as to be adjacent to each other. Thus, a fine structure is obtained. The averages of the respective numerical values illustrated in the schematic view of FIG. 1B are as follows: H=60 nm, Θ=25°, p=D=55 nm, H/D=1.09. The density of the salient portions is estimated to be $6.5 \times 10^{10}$ portions/cm$^2$. The distribution of the intervals of the respective salient portions is a normal distribution having a σ of 18 nm and the ratio σ/p is 0.36. The multiple salient portions are formed according to random arrangement so as to cover the surface of the zirconium oxide thin film completely. As described in Example 21, the first plasma etching needs to be performed so that the etching rate is 10 nm/min or less.

The composition analysis of the formed structure 1104 having the multiple fine salient portions is performed in the depth direction of the film by X-ray photoelectron spectroscopy. After that, fluorine atoms are observed up to a depth of 20 nm from the surface of the fine structure in the depth direction and the amount of the fluorine atoms in the range from the surface to the depth of 20 nm is determined to be 35% with respect to Zr atoms constituting the zirconium oxide thin film. It should be noted that it can be confirmed from a binding energy position based on X-ray photoelectron spectroscopy that the fluorine atoms are bonded to a Zr atom. The foregoing shows that the first plasma etching progressed while fluorine was incorporated into the zirconium oxide thin film 1103.

(26-5) Second Plasma Etching

Next, the zirconia mesostructure film is subjected to second plasma etching with the same apparatus through the fine structure 1104 formed on the zirconium oxide thin film. Conditions for the second plasma etching are the same as the conditions described in the step (24-5) of Example 24. The etching time is set to 15 minutes. Under the conditions for the second plasma etching in this example, the etching rate of the zirconia mesostructure film is 25 nm. In contrast, the etching rate of the zirconium oxide thin film is 10 nm. Accordingly, it is confirmed that the zirconium oxide thin film has a slower etching rate.

After the second plasma etching, the zirconium oxide thin film is completely removed and multiple conical salient portions are formed on the exposed zirconia mesostructure film so as to be adjacent to each other. Thus, the fine structure 1106 is obtained. The averages of the respective numerical values illustrated in the schematic view of FIG. 1B are as follows: H=170 nm, Θ=13°, p=D=55 nm, H/D=3.1. The density of the salient portions is estimated to be $6.5 \times 10^{10}$ portions/cm$^2$. The distribution of the intervals of the respective salient portions is a normal distribution having a σ of 18 nm and the ratio σ/p is 0.36. It is confirmed that the multiple salient portions are formed according to random arrangement so as to cover the surface of the zirconia mesostructure film completely.

The reflectance of the optical glass substrate having formed thereon the structure constituted of the zirconia mesostructure having the multiple fine salient portions produced in this example is 2.5%. Accordingly, it is confirmed that low reflection equal to or less than one half of the reflectance of the optical glass not subjected to any coating can be realized.

EXAMPLE 27

Described in Example 27 is an example in which an optical member having an antireflection ability is obtained as described below. When the silica mesostructure film 1002 formed on a substrate is subjected to plasma etching, the etching is advanced while the contamination 1003 containing aluminum resulting from a member of an etching chamber is deposited in an island shape to provide a structure having the multiple pillar-shaped salient portions 1004 having such a shape that the area of a cross section when the salient portions are cut by a plane perpendicular to a direction from the bottom portion to the tip thereof reduces along the direction. After the structure has been transformed into a porous body, titania is introduced into its mesopores to match the refractive indices of the structure and the optical glass substrate with each other. This example is described with reference to FIG. 10.

(27-1) Substrate Preparation

An optical glass substrate having a refractive index of 1.6 is prepared as the substrate 1001.

(27-2) Formation of Silica Mesostructure Film

The silica mesostructure film 1002 was formed on the optical glass substrate 1001 by the same process as that from the steps (1-1) to (1-2) of Example 1. The resultant film has substantially the same structure as that produced in Example 1.

(27-3) Plasma Etching

Figure 18A:
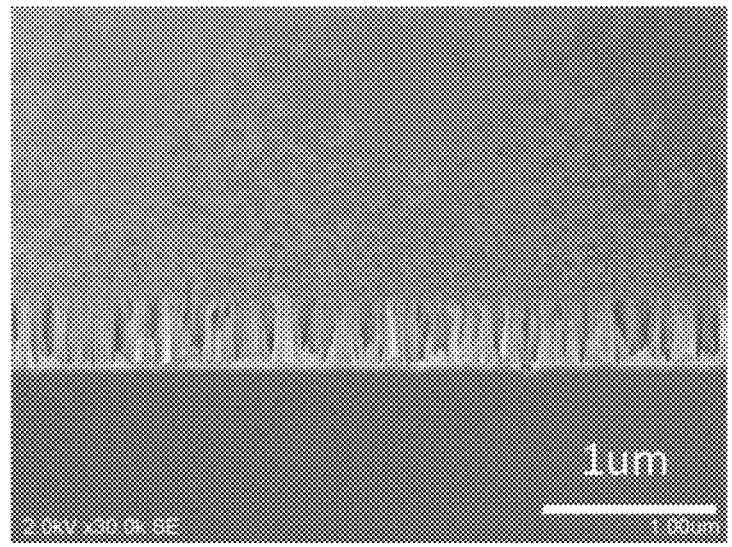
FIGS. 18A and 18B are each a scanning electron microscope photograph of a structure constituted of multiple fine and cone-shaped salient portions formed by performing plasma etching while depositing a contamination resulting from a material constituting an etching apparatus in an island shape onto a mesoporous silica film in Example 27.
Figure 18B:
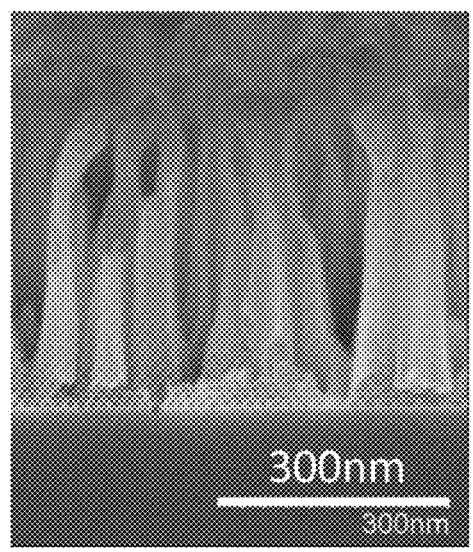

The silica mesostructure film 1002 was subjected to plasma etching with the same ICP-type plasma etching apparatus as that used in Examples 1 to 26 under the following conditions.
Reactive gas: $SF_6$
Gas flow rate: 20 sccm
Pressure: 0.3 Pa
ICP power: 100 W
Bias power: 20 W
Etching time: 24 minutes Obtained on the surface of the silica mesostructure film after the plasma etching was a fine structure 1004 in which the multiple pillar-shaped salient portions having a uniform height were formed so as to be adjacent to each other. The pillar-shaped salient portions had such a shape that the area of a cross section when the salient portion was cut by a plane perpendicular to a direction from the bottom portion to the tip thereof reduced along the direction. FIGS. 18A and 18B (bird's-eye views) show scanning electron microscope photographs of the fine structure having the multiple pillar salient portions produced in this example. FIG. 18B is a high-magnification image of FIG. 18A. The averages of the respective numerical values illustrated in the schematic view of FIG. 1B were determined as follows: H=450 nm, p=90 nm, D=90 nm, T=50 nm, H/D=5.0. The density of the salient portions was estimated to be $5.2 \times 10^{10}$ portions/cm². The distribution of the intervals of the pillar-shaped structures was a normal distribution having a σ of 30 nm and the ratio σ/p was 0.42.

The composition analysis of a fine structure 1004 after the plasma etching was performed by X-ray photoelectron spectroscopy. At this time, in addition to Si and O each serving as composition constituting the fine structure, and an F atom serving as the composition of the etching gas, Al was detected at an element ratio of 5%. Al is an element in a constituent material for the inside of the etching apparatus and scatters as a contamination toward the surface of the silica mesostructure film during the plasma etching to be deposited in an island shape. Al forms $AlF_2$ having a low vapor pressure together with the fluorine-based gas to inhibit the etching of silica strongly. As a result, such structure having multiple pillar-shaped and fine salient portions having a uniform height as described above is formed.

(27-4) Transformation into Porous Body

As in the step (2-2-3) of Example 2, the organic component held as a mold in the pores of the formed mesostructure film was removed by baking the film in a kiln under an air atmosphere at 400° C. for 4 hours. Thus, the mesoporous silica film was obtained.

(27-5) Introduction of Inorganic Material into Mesopores

Titania is introduced into the mesopores of the structure formed of the mesoporous silica film having the multiple pillar-shaped salient portions produced in the foregoing step by the same low-pressure CVD process as that of the step (7-4) of Example 7. Conditions for the CVD were the same as those described in the step (7-4) of Example 7 and the time period was set to 5 hours. Analysis by X-ray photoelectron spectroscopy revealed that in the case of the structure having the multiple pillar-shaped salient portions of this example as well, Ti atoms were introduced by the CVD under the conditions so that the Ti/Si atom ratio became uniform in the range from the surface of the fine structure to the vicinity of a substrate interface, and the Ti atoms were found to be introduced at about 45% in terms of Ti/Si atom ratio. The ratio corresponds to a mesopore-filling ratio of 60%. The condition is the condition under which the refractive index of the mesoporous silica film after the introduction of titania becomes 1.6. It can be confirmed from a binding energy position based on X-ray photoelectron spectroscopy that the Ti atoms are present as $TiO_2$. The apparent refractive index of the resultant structure reduces along the direction from the bottom portion of each pillar-shaped salient portion to its tip. The reduction results from such a form of the pillar-shaped salient portion that the area of a cross section when the salient portion is cut by a plane perpendicular to the direction from its bottom portion to its tip reduced along the direction.

(27-6) Reflectance Measurement

Reflectance measurement was performed by the same process as that of the step (1-4) of Example 1. When an average reflectance in the wavelength range of 400 nm to 700 nm was calculated, the reflectance of the optical glass having formed thereon the structure having multiple pillar-shaped salient portions constituted of mesoporous silica having titania introduced into its pores, the structure being produced in this example, was 0.5%. As a comparison, the reflectance of the optical glass substrate provided with no antireflection structure was measured by the same process. The reflectance was 5% and hence it was confirmed that the reflectance was reduced by the formation of the structure having the multiple fine salient portions, the structure being produced in this example and having a controlled refractive index.

EXAMPLE 28

Described in Example 28 is an example in which an optical member having an antireflection ability is obtained by forming, on a substrate having a curvature, a structure having multiple pillar-shaped and fine salient portions constituted of a mesoporous silica film having titania introduced into its mesopores, the structure being of the same construction as that of Example 27.

(28-1) Substrate Preparation

A lens whose convex surface has a radius of curvature of 60 mm and a lens whose concave surface has a radius of curvature of 25 mm are prepared as substrates. A material for each lens is the optical glass used in Example 7.

(28-2) Formation of Silica Mesostructure Film (28-2-1) Preparation of Precursor Solution for Silica Mesostructure Film The same precursor solution for the silica mesostructure as that in Example 1 is produced by the same step as the step (1-2-1) of Example 1.

(28-2-2) Deposition of Silica Mesostructure Film

The same silica mesostructure film as that produced in Example 19 is deposited on the substrate having a convex surface and the substrate having a concave surface by the same step as the step (19-2-2) of Example 19.

(28-3) Plasma Etching

The silica mesostructure film formed on the convex surface substrate and the concave surface substrate is subjected to plasma etching with the same apparatus as that of the step (27-3) of Example 27 under the same conditions as those of the step for the same time period as that of the step. Observation with an electron microscope confirms that a structure constituted of multiple pillar-shaped fine salient portions, the structure being of substantially the same structure as that of the structure formed on the silica mesostructure film on the flat substrate in Example 27, is formed on the silica mesostructure film formed on each substrate having a curvature as well. In addition, as in Example 27, Al in a constituent material for the inside of the etching apparatus is detected on the surface of the structure, and it is confirmed that the pillar-shaped fine salient portions are formed via the mechanism described in Example 27.

(28-4) Transformation into Porous Body

The formed mesostructure film is transformed into a mesoporous silica film by baking the film in a kiln under an air atmosphere at 400° C. for 4 hours to remove an organic component held as a mold in its pores in the same manner as in the step (2-2-3) of Example 2.

(28-5) Introduction of Inorganic Material into Mesopores

Titania is introduced into the mesopores of the structure formed of the mesoporous silica film having the multiple pillar-shaped salient portions produced in the foregoing step by the same low-pressure CVD process as that of the step (7-4) of Example 7. As a result of the analysis of the film of the structure of the present invention after the introduction of titania by X-ray photoelectron spectroscopy, the introduction of titania into the mesopores substantially the same as that of Example 28 is confirmed in this example as well.

(28-6) Reflectance Measurement

Reflectance measurement is performed by the same process as that adopted for each substrate having a curvature in the step (19-5) of Example 19. The reflectance of both the concave lens and the convex lens each having formed thereon the structure having the multiple pillar-shaped salient portions constituted of mesoporous silica having titania introduced into its pores, the structure being produced in this example, is determined to be about 0.5%. The foregoing confirms that the reflectance of each substrate having a curvature is reduced by the formation of the structure having the multiple fine salient portions, the structure being produced in this example and having a controlled refractive index.

EXAMPLE 29

Described in Example 29 is an example in which an optical member having an antireflection ability is obtained as described below. When the titania mesostructure film 1002 formed on a substrate is subjected to plasma etching, the etching is advanced while the contamination 1003 containing aluminum resulting from a member of an etching chamber is deposited in an island shape to provide a structure having the multiple pillar-shaped salient portions 1004 having such a shape that the area of a cross section when the salient portions are cut in a direction from the bottom portion to the tip thereof reduces along the direction. After silica has been introduced into mesopores, an organic component is removed to match the refractive indices of the structure and the optical glass substrate with each other.

(29-1) Substrate Preparation

An optical glass substrate having a refractive index of 1.7 is prepared as the substrate 1001.

(29-2) Formation of Titania Mesostructure Film

A titania mesostructure film having basically the same structure as that described in Example 3 is produced by the same steps as those described in the steps (3-2-1) to (3-2-2) of Example 3.

(29-3) Plasma Etching

A structure constituted of multiple pillar-shaped fine salient portions is formed on the titania mesostructure film by performing plasma etching with the same apparatus as that of the step (27-3) of Example 27 under the same conditions as those of the step.

Obtained on the surface of the titania mesostructure film after the plasma etching is a fine structure 1004 in which the multiple pillar-shaped salient portions having a uniform height are formed so as to be adjacent to each other. The pillar-shaped salient portions each have such a shape that the area of a cross section when the salient portions are cut by a plane perpendicular to a direction from the bottom portion to the tip thereof reduces along the direction. The averages of the respective numerical values illustrated in the schematic view of FIG. 1B are determined by the analysis of the resultant structure as follows: H=500 nm, p=90 nm, D=90 nm, T=50 nm, H/D=5.6. The density of the salient portions is estimated to be $5.2 \times 10^{10}$ portions/cm$^2$. The distribution of the intervals of the pillar-shaped structures is a normal distribution having a σ of 30 nm and the ratio σ/p is 0.42.

The X-ray photoelectron spectroscopy of the surface of the titania mesostructure film after the formation of the pillar-shaped fine salient portions detected Al on the surface of the film at an element ratio of 5% in addition to Ti, O, and C each serving as composition constituting the mesostructure, and an F atom serving as the composition of the etching gas. Al is an element in a constituent material for the inside of the etching apparatus and scatters as a contamination toward the surface of the titania mesostructure film during the plasma etching to be deposited in an island shape.

(29-4) Introduction of Silica into Mesopores

The substrate having produced thereon the titania mesostructure having formed thereon the structure having the multiple pillar-shaped fine salient portions, the titania mesostructure being produced as described above, is exposed to the steam of TMOS. Thus, silica is introduced into its mesopores. Subsequently, the organic component is removed. The step is the same as the step (10-4) of Example 10. In-depth analysis by X-ray photoelectron spectroscopy shows that in the titania mesostructure film having formed thereon the fine pillar-shaped salient portions after the introduction of silica, Si atoms are uniformly introduced at a Ti atom ratio of about 49%.

(29-5) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure having multiple pillar-shaped salient portions constituted of mesoporous titania having silica introduced into its pores, the structure being produced in this example, is 0.4%. The foregoing confirms that the reflectance of the substrate is reduced by the formation of the structure having the multiple fine salient portions, the structure being produced in this example and having a controlled refractive index.

EXAMPLE 30

Described in Example 30 is an example in which an optical member having an antireflection ability is obtained as described below. When the zirconia mesostructure film 1002 formed on a substrate is subjected to plasma etching, the etching is advanced while the contamination 1003 containing aluminum resulting from a member of an etching chamber is deposited in an island shape to provide a structure having the multiple pillar-shaped salient portions 1004 having such a shape that the area of a cross section when the salient portions are cut in a direction from the bottom portion to the tip thereof reduces along the direction. After silica has been introduced into mesopores, an organic component is removed to match the refractive indices of the structure and the optical glass substrate with each other.

(30-1) Substrate Preparation

An optical glass substrate having a refractive index of 1.7 is prepared as the substrate 1001.

(30-2) Formation of Zirconia Mesostructure Film

A zirconia mesostructure film having basically the same structure as that described in Example 4 is produced by the same steps as those described in the steps (4-2-1) to (4-2-2) of Example 4.

(30-3) Plasma Etching

A structure constituted of multiple pillar-shaped fine salient portions is formed on the zirconia mesostructure film by performing plasma etching with the same apparatus as that of the step (27-3) of Example 27 under the same conditions as those of the step. Only the etching time was changed to 18 minutes.

Obtained on the surface of the zirconia mesostructure film after the plasma etching is a fine structure 1004 in which the multiple pillar-shaped salient portions having a uniform height are formed so as to be adjacent to each other. The pillar-shaped salient portions have such a shape that the area of a cross section when the salient portions were cut by a plane perpendicular to a direction from the bottom portion to the tip thereof reduces along the direction. The averages of the respective numerical values illustrated in the schematic view of FIG. 1B are determined by the analysis of the resultant structure as follows: H=400 nm, p=90 nm, D=90 nm, T=50 nm, H/D=4.4. The density of the salient portions is estimated to be $5.2 \times 10^{10}$ portions/cm$^2$. The distribution of the intervals of the pillar-shaped structures is a normal distribution having a σ of 30 nm and the ratio σ/p is 0.42.

The X-ray photoelectron spectroscopy of the surface of the zirconia mesostructure film after the formation of the pillar-shaped fine salient portions detected Al on the surface of the film at an element ratio of 5% in addition to Zr, O, and C each serving as composition constituting the mesostructure, and an F atom serving as the composition of the etching gas. Al is an element in a constituent material for the inside of the etching apparatus and scatters as a contamination toward the surface of the zirconia mesostructure film during the plasma etching to be deposited in an island shape.

(30-4) Introduction of Silica into Mesopores

The substrate having produced thereon the zirconia mesostructure having formed thereon the structure having the multiple pillar-shaped fine salient portions, the titania mesostructure being produced as described above, is exposed to the steam of TMOS. Thus, silica is introduced into its mesopores. Subsequently, the organic component is removed. The step is the same as the step (11-4) of Example 11. In-depth analysis by X-ray photoelectron spectroscopy shows that in the zirconia mesostructure film having formed thereon the fine pillar-shaped salient portions after the introduction of silica, Si atoms are uniformly introduced at a Zr atom ratio of about 49%.

(30-5) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure having multiple pillar-shaped salient portions constituted of mesoporous zirconia having silica introduced into its pores, the structure being produced in this example, is 0.7%. The foregoing confirms that the reflectance of the substrate is reduced by the formation of the structure having the multiple fine salient portions, the structure being produced in this example and having a controlled refractive index.

EXAMPLE 31

Described in Example 31 is an example in which a water-repellent film is obtained by modifying an external surface and mesopore surface of the structure of the present invention having the multiple conical fine salient portions constituted of mesoporous silica, the structure being produced in Example 2, with a hydrophobic trimethylsilyl group.

(31-1) Formation of Structure Having Multiple Conical Fine Salient Portions on Mesoporous Silica Film A structure having multiple conical fine salient portions substantially the same as that produced in Example 2 was formed on a mesoporous silica film according to the procedure described in the steps (2-1) to (2-3) of Example 2. The numerical values illustrated in the schematic view of FIG. 1B, and the density and distribution of the salient portions characterizing the structure were substantially the same as the values described in Example 2.

(31-2) Surface Modification with Functional Group Containing Hydrophobic Organic Group A substrate having formed thereon the mesoporous silica film having the structure having the multiple conical fine salient portions was placed in a sealable desiccator and then 200 μL of hexamethyldisilazane were charged into the desiccator. After the desiccator had been sealed, the contents were left at rest for 24 hours at room temperature. Hexamethyldisilazane is a silane coupling agent capable of reacting with a silanol group present in the mesoporous silica film to bond a hydrophobic trimethylsilyl group to its surface through a covalent bond. The progress of the reaction is confirmed by the fact that the absorption of an O—H bond derived from a silanol group reduces in an infrared absorption spectrum after the modifying step.

(31-3) Evaluation for Water Repellency

Figure 20A:
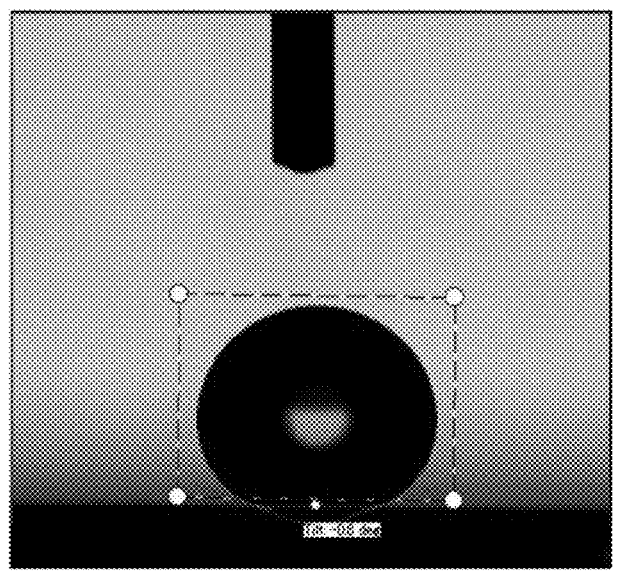
FIGS. 20A and 20B are each a photograph used for determining the contact angle of water on a water-repellent film produced in Example 31.

The substrate having formed thereon the structure water-repellent material film of the present invention constituted of mesoporous silica subjected to the surface modification with the hydrophobic group, the film being produced in the foregoing step, was evaluated for its contact angle upon dropping of a water droplet onto its surface with a contact angle meter. FIG. 20A shows the result. At this time, the contact angle was 160° and hence it was confirmed that the surface of the film showed extremely high water repellency.

Figure 20B:
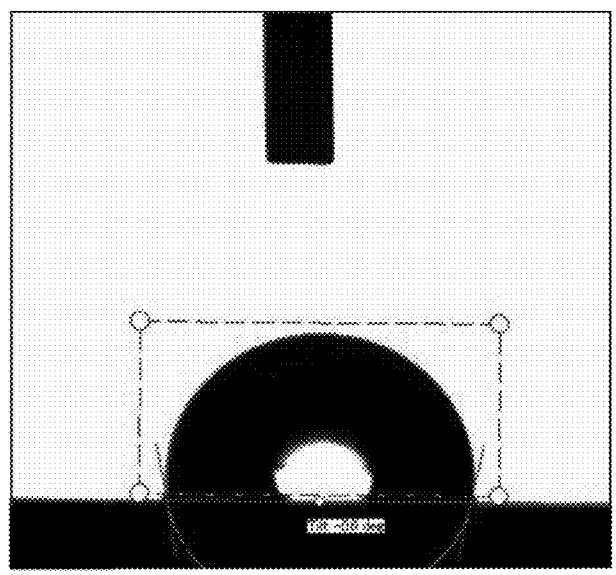

For comparison, a film obtained by subjecting a mesoporous silica film on which the structure of the present invention having the multiple conical fine salient portions had not been formed to the same modification with hexamethyldisilazane was measured for the contact angle of a water droplet by the same approach. As a result, as shown in FIG. 20B, the contact angle was 100° and hence it was confirmed that the extremely high water repellency was expressed when the structure of the present invention was formed.

EXAMPLE 32

Described in Example 32 is an example in which a water-repellent film is obtained by modifying an external surface and mesopore surface of the structure of the present invention having the multiple conical fine salient portions constituted of mesoporous silica, the structure being produced in Example 2, with a hydrophobic 3,3,3-trifluoropropyldimethylsilyl group.

(32-1) Formation of Structure Having Multiple Conical Fine Salient Portions on Mesoporous Silica Film The same structure having multiple conical fine salient portions as that of Example 31 is formed on a mesoporous silica film by the same step as the step (31-1) of Example 31.

(32-2) Surface Modification with Functional Group Containing Hydrophobic Organic Group The surface of the mesoporous silica film is modified by the same approach as that of Example 31. In this example, the hydrophobic treatment of the surface is performed with 200 μL of 3,3,3-trifluoropropyldimethylchlorosilane.

It is confirmed that the silane coupling agent is bonded to the O—H site of a silanol group through a covalent bond because the absorption of an O—H bond derived from a silanol group reduces in an infrared absorption spectrum after the modifying step.

(32-3) Evaluation for Water Repellency

The substrate having formed thereon the structure water-repellent material film of the present invention constituted of mesoporous silica subjected to the surface modification with the hydrophobic group, the film being produced in the foregoing step, is evaluated for its contact angle upon dropping of a water droplet onto its surface with a contact angle meter. The contact angle of water on the substrate having formed thereon the structure produced in this example is 165° and hence it is confirmed that the surface of the film shows extremely high water repellency.

EXAMPLE 33

Described in Example 33 is an example in which a water-repellent film is obtained by: producing a structure of the present invention having multiple irregular shapes different from each other in period and size; and modifying an external surface and mesopore surface of the structure with a hydrophobic trimethylsilyl group.

(33-1) Production of Silica Mesostructure Film

A silica mesostructure film having substantially the same structure as that of Example 1 is produced on a quartz substrate by the same steps as the steps (1-1) to (1-2-2) of Example 1.

(33-2) Formation of First Irregular Shape

The following step is described with reference to FIGS. 21A to 21D. As illustrated in FIG. 21B, a single layer film filled with silica microspheres 2103 each having a diameter of 2 μm is formed on the surface of a silica mesostructure film 2101 produced on a quartz substrate 2102 in the foregoing step. Next, a dry etching treatment with an Ar gas is performed by using the single layer film as a mask. As a result, such a silica mesostructure film 2104 having a conical first irregular structure on its surface as illustrated in FIG. 21C is obtained. At this time, the p' and H' illustrated in FIG. 19A are 2 μm and 500 nm, respectively. The dry etching step is performed with such an etching gas that the following fine structure is not formed.

(33-3) Transformation into Porous Body

The organic component used as a mold in the silica mesostructure film having formed thereon the first irregular structure was removed by baking the film in a kiln under an air atmosphere at 400° C. for 4 hours. Thus, the mesoporous silica film was obtained.

(33-4) Plasma Etching

A structure formed of multiple conical fine salient portions, the structure being substantially the same as that formed on the mesoporous silica film on the flat substrate in Example 2, is formed by performing plasma etching with the same apparatus as that of the step (2-3) of Example 2 under the same conditions as those of the step. The numerical values illustrated in the schematic view of FIG. 1B, and the density and distribution of the salient portions characterizing the structure are substantially the same as the values described in Example 2. Both the period and difference of elevation of the irregularities of the fine structure are smaller than those of the first irregular structure. FIG. 21D schematically illustrates the structure to be formed.

(33-5) Surface Modification with Functional Group Containing Hydrophobic Organic Group The surface of mesoporous silica is modified with a hydrophobic trimethylsilyl group by causing mesoporous silica and hexamethyldisilazane to react with each other by the same step as the step (31-2) of Example 31.

(33-6) Evaluation for Water Repellency

The substrate having formed thereon the structure water-repellent material film of the present invention having multiple irregular shapes constituted of mesoporous silica subjected to the surface modification with the hydrophobic group, the film being produced in the foregoing step, is evaluated for its contact angle upon dropping of a water droplet onto its surface with a contact angle meter. The contact angle of water on the substrate having formed thereon the structure produced in this example is 170° and hence it is confirmed that the surface of the film shows extremely high water repellency.

EXAMPLE 34

Described in Example 34 is an example in which an optical member having an antireflection ability is obtained by forming a structure having multiple fine salient portions on a mesoporous silica film deposited onto an optical glass substrate, and then introducing titania into the mesopores to match the refractive indices of the structure and the optical glass substrate with each other in the same manner as that described in Example 7. A difference from Example 7 lies in the pore structure of a mesoporous structure. The mesoporous silica film to be described in this example has a structure in which cage (elliptical sphere)-shaped pores are three-dimensionally linked.

(34-1) Substrate Preparation

An optical glass substrate having a refractive index of 1.6 is prepared as the substrate.

(34-2) Formation of Mesoporous Silica Film (34-2-1) Preparation of Precursor Solution for Silica Mesostructure Film A precursor solution for a mesostructure is prepared by adding an ethanol solution of a block polymer to a solution described below and stirring the mixture for 3 hours. The solution is obtained by adding ethanol, 0.01 M hydrochloric acid, and tetraethoxysilane and mixing the contents for 20 minutes. The block polymer used is EO(20)PO(70)EO(20). Methanol, propanol, 1,4-dioxane, tetrahydrofuran, or acetonitrile can be used instead of ethanol. The mixing ratio (molar ratio) "tetraethoxysilane:HCl:water:ethanol:block polymer" is set to 1.0:0.0011:6.1:8.7:0.0048. The solution is appropriately diluted before use, for the purpose of adjusting a film thickness.

(34-2-2) Deposition of Silica Mesostructure Film

A silica mesostructure film is deposited onto the optical glass substrate by the same dip coating as that described in the step (1-2-2) of Example 1.

(34-2-3) Transformation into Porous Body

A mesoporous silica film is obtained by performing baking under the same conditions as those of the step (2-2-3) of Example 2 to remove the organic component. The observation of a cross section of the mesoporous silica film with a scanning electron microscope shows that elliptical sphere-shaped mesopores having a uniform diameter are periodically arranged in the film produced in this example while adopting a hexagonal close-packed structure. The periodic arrangement of the mesopores in the film can be confirmed by the fact that a diffraction peak corresponding to a structural period of 7.4 nm can be observed in X-ray diffraction analysis.

(34-3) Plasma Etching

The mesoporous silica film produced in the foregoing step is subjected to plasma etching under the same conditions as those of the step (7-3) of Example 7. The etching time is also the same as that of Example 7.

The multiple conical salient portions are formed on the surface of the mesoporous silica film after the plasma etching so as to be adjacent to each other. Thus, the fine structure having, on its surface, such salient portions that the averages of the respective numerical values illustrated in the schematic view of FIG. 1B are as follows is obtained: H=70 nm, $\Theta$=30°, p=50 nm, T=80 nm, H/D=1.4. FIGS. 13A and 13B each show a scanning electron microscope photograph of the formed fine structure. FIG. 13A is a photograph of a cross section thereof and FIG. 13B is a photograph of the surface thereof. The density of the salient portions is estimated to be $7.2\times10^{10}$ portions/cm². The distribution of the intervals of the salient portions is a normal distribution having a $\sigma$ of 16 nm and the ratio $\sigma$/p is 0.30.

The composition analysis of the fine structure after the plasma etching is performed in the depth direction of the film by X-ray photoelectron spectroscopy. The analysis reveals that fluorine atoms are incorporated into a range up to the vicinity of the interface with the optical glass substrate, and their amount is 50% on average in terms of Si atom ratio. It should be noted that it is confirmed from a binding energy position based on X-ray photoelectron spectroscopy that the fluorine atoms are present while being bonded to an Si atom. The foregoing shows that the etching progressed while fluorine was incorporated into the mesoporous silica film.

(34-4) Introduction of Inorganic Material into Mesopores

Titania is introduced into the mesopores of the mesoporous silica film, on which the multiple conical fine salient portions have been formed by the foregoing step, by the same low-pressure CVD process as that of the step (7-4) of Example 7. This step differs from Example 7 only in the following two points: the pressure of titanium isopropoxide is reduced to 2 Pa and the CVD time is prolonged to 10 hours. This is because the diffusion of titanium isopropoxide into the mesopores of the mesoporous silica film having the cage-shaped pores of this example is reduced as compared with a cylindrical mesopore.

(34-5) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of mesoporous silica having titania introduced into its pores, the structure being produced in this example, is determined to be 2%. It is confirmed that the reflectance is reduced by the formation of the fine structure of the present invention on the mesoporous silica film and the effect of refractive index control based on the introduction of titania into the mesopores.

EXAMPLE 35

Described in Example 35 is an example in which an optical member having an antireflection ability is obtained by forming a fine structure on a titania mesostructure film deposited onto an optical glass substrate, introducing silica into the mesopores, and then removing the organic substance to match the refractive indices of the structure and the optical glass substrate with each other in the same manner as that described in Example 10. A difference from Example 10 lies in the pore structure of a mesoporous structure. The titania mesostructure film to be described in this example has a structure in which cage (elliptical sphere)-shaped pores are three-dimensionally linked, the structure being produced by using the block copolymer EO(20)PO(70)EO(20) as a structure-directing agent and titanium isopropoxide (TTIP) as a titania source.

(35-1) Substrate Preparation

An optical glass substrate having a refractive index of 1.6 is prepared as the substrate.

(35-2) Formation of Titania Mesostructure Film (35-2-1) Preparation of Precursor Solution for Titania Mesostructure Film A precursor solution is obtained by blending titanium tetraisopropoxide (TTIP), a block copolymer, hydrochloric acid, ethanol, and water so that the molar ratio "TTIP:hydrochloric acid:water:block copolymer:ethanol" is 1.0:1.9:7.2:0.010:17.6, followed by stirring the solution until the solution become completely transparent.

(35-2-2) Production of Titania Mesostructure Film

The titania mesostructure film of this example is formed on the optical glass substrate by a spin coating process under the same conditions as those of the step (3-2-2) of Example 3. The film thickness of the formed titania mesostructure is about 450 nm.

(35-3) Plasma Etching

The mesostructure titania thin film formed on the optical glass substrate is subjected to plasma etching with the same apparatus as that of the step (3-3) of Example 3 under the same conditions as those of the step. Observation with a scanning electron microscope reveals that multiple conical salient portions are formed on the surface of the titania mesostructure film after the plasma etching so as to be adjacent to each other. Thus, a fine structure having, on its surface, such salient portions that the averages of the respective numerical values illustrated in the schematic view of FIG. 1B were as follows was obtained: H=90 nm, $\Theta$=25°, p=D=60 nm, T=200 nm, H/D=1.5. Here, the density of the salient portions was estimated to be $7.0\times10^{10}$ portions/cm². The distribution of the intervals of the respective salient portions is a normal distribution having a $\sigma$ of 15 nm and the ratio $\sigma$/p is 0.25.

The composition analysis of the fine structure after the plasma etching was performed in the depth direction of the film by X-ray photoelectron spectroscopy. The analysis revealed that fluorine atoms were incorporated into the fine structure, and their amount was 25% in terms of Ti atom ratio. The foregoing shows that the etching progressed while fluorine was incorporated into the mesostructure titania film.

(35-4) Transformation into Porous Body

The titania mesostructure film having the structure formed on its surface by the foregoing step is subjected to a heat treatment under a nitrogen atmosphere at 300° C. to provide a mesoporous titanium oxide film. The infrared absorption spectrometry of the film after the heat treatment shows that the organic substance has been removed from the mesopores. The evaluation of the mesoporous titanium oxide film by X-ray diffraction analysis shows that a clear diffraction peak is observed at an angular position corresponding to a structural period of 6.5 nm and the produced mesoporous titania film has regularly arranged pore structures. In addition, the evaluation of the film with a transmission electron microscope shows that the film has a structure in which elliptical sphere-shaped pores distorted in a film thickness direction are arranged in a hexagonal close-packed manner.

(35-5) Introduction of Silica into Mesopores

The substrate having produced thereon the titania mesostructure having formed thereon the structure having the multiple salient portions produced as described above is placed in an autoclave having a volume of 70 ml and then 3 ml of tetramethyl orthosilicate (TMOS) are charged into the autoclave. After that, the autoclave is sealed and then silica is introduced into the mesopores of the titania mesostructure film by performing a treatment involving exposing the substrate to the steam of TMOS at 50° C. for 2 hours.

Performing in-depth analysis by X-ray photoelectron spectroscopy in a direction from the surface of the fine structure produced in this example to an optical glass substrate interface shows that Si atoms are introduced into the film in a relatively uniform manner at a Ti atom ratio of about 35%.

(35-6) Reflectance Measurement

Reflectance measurement is performed by the same process as that of the step (1-4) of Example 1. When an average reflectance in the wavelength range of 400 nm to 700 nm is calculated, the reflectance of the optical glass having formed thereon the structure of the present invention constituted of mesoporous titania having silica introduced into its pores, the structure being produced in this example, is determined to be 2%. It is confirmed that the reflectance is reduced by the formation of the fine structure of the present invention on the mesoporous titania film and the effect of refractive index control based on the introduction of silica into the mesopores.

EXAMPLE 36

Described in Example 36 is the following example. A mesoporous titanium oxide film is produced on a silicon substrate having conductivity by using the block copolymer EO(20)PO(70)EO(20) as a structure-directing agent and TTIP as a titania source. A structure having multiple conical salient portions is produced on the surface of the film by subjecting the film to reactive etching with $SF_6$ as an etching gas and the resultant is used as a substrate for mass spectrometry.

(36-1) Substrate Preparation

A (100) single-crystal substrate of low-resistance and n-type silicon is prepared.

(36-2) Synthesis of Mesoporous Titanium Oxide Film

A titania mesostructure film having substantially the same structure and substantially the same film thickness as those of the film produced in Example 35 is produced on the low-resistance silicon substrate by the same steps as the steps (35-2-1) to (35-2-2) of Example 35.

(36-3) Plasma Etching

The mesostructure titania thin film formed on the silicon substrate is subjected to plasma etching under the same conditions as those of the step (35-3) of Example 35. The shape of the surface of the film after the plasma etching is substantially the same as that of the structure having the multiple fine cone-shaped salient portions formed in Example 35.

(36-4) Transformation into Porous Body

The titania mesostructure film having the structure formed on its surface by the foregoing step is subjected to a heat treatment under a nitrogen atmosphere at 350° C. to provide a mesoporous titanium oxide film. The infrared absorption spectrometry of the film after the heat treatment shows that the organic substance has been removed from the mesopores. The evaluation of the mesoporous titanium oxide film by X-ray diffraction analysis shows that a clear diffraction peak is observed at an angular position corresponding to a structural period of 6.1 nm and the produced mesoporous titania film has regularly arranged pore structures. In addition, the evaluation of the film with a transmission electron microscope shows that the film has a structure in which elliptical sphere-shaped pores distorted in a film thickness direction are arranged in a hexagonal close-packed manner.

(36-5) Mass Spectrometry with Produced Mesoporous Titanium Oxide Film

The mass spectrometry of a trace amount of a sample is performed by using the mesoporous titanium oxide film having formed on its surface the structure having the multiple fine conical salient portions, the film being produced as described above, as a substrate for mass spectrometry. $N_2$ laser (having a wavelength of 337 nm) is used as excitation light and one spectrum is obtained by integrating results obtained by irradiation with 20 pulses of the laser. In addition, comparison between the results of the mass spectrometry of substrates is performed based on results obtained by measuring 10 similar spectra.

A 1-µM aqueous solution of atenolol to be used in the treatment of a cardiac disease is prepared, and then 1 µl thereof is dropped onto the substrate and dried. The mesoporous titanium oxide film having formed thereon the structure having the fine salient portions, the film being produced according to the foregoing procedure, is used as the substrate. For comparison, a mesoporous titanium oxide film not subjected to the formation of fine salient portions by the plasma etching, the film being produced according to the same protocol, is subjected to the same measurement.

Irrespective of which one of the substrates is used, a peak resulting from protonated atenolol is observed at a ratio m/z of 267.3 in a spectrum. The S/N ratio of the spectrum is 362±92 in the case where the mesoporous titanium oxide film of the present invention having formed on its surface the structure having the multiple fine conical salient portions is used while the S/N ratio is 117±44 in the case of the mesoporous titanium oxide film having a flat surface on which no fine salient portions have been formed. The formation of the fine structure on the surface largely increases the S/N ratio of a mass spectrometry spectrum to be obtained. The foregoing results from a reduction in reflectance of the mesoporous titanium oxide film of the present invention by the formation of the structure having the fine conical salient portions on the surface of the film.

The mesoporous titanium oxide film of the present invention having formed on its surface the structure having the multiple fine conical salient portions was left to stand in air having a low humidity (20% RH) for 1 week. After that, similar sample measurement was performed. As a result, the S/N ratios of the resultant spectra hardly reduced. Accordingly, it is confirmed that the substrate for mass spectrometry of the present invention is superior in stability to porous silicon.

EXAMPLE 37

Described in Example 37 is the following example. A mesoporous titanium oxide film is produced on a silicon substrate having conductivity by using a block copolymer EO(106)PO(70)EO(106) as a structure-directing agent and TTIP as a titania source. A structure having multiple conical salient portions is produced on the surface of the film by subjecting the film to reactive etching with $SF_6$ as an etching gas and the resultant is used as a substrate for mass spectrometry.

(37-1) Substrate Preparation

A (100) single-crystal substrate of low-resistance and n-type silicon is prepared.

(37-2) Synthesis of Mesoporous Titanium Oxide Film (37-2-1) Preparation of Precursor Solution for Titania Mesostructure Film A precursor solution is obtained by mixing TTIP, a block copolymer, hydrochloric acid, ethanol, and water so that the molar ratio "TTIP:hydrochloric acid:water:block copolymer:ethanol" is 1.0:1.9:7.2:0.010:17.6, followed by stirring the solution until the solution become completely transparent.

(37-2-2) Production of Titania Mesostructure Film

A titania mesostructure film is formed on the low-resistance silicon substrate by a spin coating process under the same conditions as those of the step (3-2-2) of Example 3. The film thickness of the formed titania mesostructure is about 500 nm.

(37-3)

The mesostructure titania thin film formed on the low-resistance silicon substrate is subjected to plasma etching with the same apparatus as that of the step (3-3) of Example 3 under the same conditions as those of the step. Observation with a scanning electron microscope reveals that multiple conical salient portions are formed on the surface of the titania mesostructure film after the plasma etching so as to be adjacent to each other. Thus, a fine structure having, on its surface, such salient portions that the averages of the respective numerical values illustrated in the schematic view of FIG. 1B were as follows was obtained: H=100 nm, Θ=25°, p=D=60 nm, T=200 nm, H/D=1.67. Here, the density of the salient portions was estimated to be $7.4 \times 10^{10}$ portions/cm$^2$. The distribution of the intervals of the respective salient portions is a normal distribution having a σ of 14 nm and the ratio σ/p is 0.23.

The composition analysis of the fine structure after the plasma etching was performed in the depth direction of the film by X-ray photoelectron spectroscopy. The analysis revealed that fluorine atoms were incorporated into the fine structure, and their amount was 25% in terms of Ti atom ratio. The foregoing shows that the etching progressed while fluorine was incorporated into the mesoporous titania film.

(37-4) Transformation into Porous Body

The titania mesostructure film having the structure formed on its surface by the foregoing step is subjected to a heat treatment under a nitrogen atmosphere at 450° C. to provide a mesoporous titanium oxide film. The infrared absorption spectrometry of the film after the heat treatment shows that the organic substance has been removed from the mesopores. The evaluation of the mesoporous titanium oxide film by X-ray diffraction analysis shows that a clear diffraction peak is observed at an angular position corresponding to a structural period of 5.2 nm and the produced mesoporous titania film has regularly arranged pore structures. In addition, the evaluation of the film with a transmission electron microscope shows that the film has a structure in which elliptical sphere-shaped pores distorted in a film thickness direction are arranged in a hexagonal close-packed manner. Further, the evaluation of the film after the heat treatment by X-ray diffraction analysis with a parallel optical system shows that part of a pore wall crystallizes to form fine crystals of anatase because a broad diffraction peak is observed at the peak position of the crystal of anatase.

(37-5) Mass Spectrometry with Produced Mesoporous Titanium Oxide Film

The mass spectrometry of a minute sample is performed by using the mesoporous titanium oxide film having formed on its surface the structure having the multiple fine conical salient portions, the film being produced as described above, as a substrate for mass spectrometry according to the same protocol as that of Example 1.

A citrate buffer solution containing bradykinin, which is a peptide having a hypotensive action and formed of 9 amino acids, at a concentration of 5 μM is prepared, and then 1 μl thereof is dropped onto the substrate and dried. The mesoporous titanium oxide film having formed thereon the structure having the fine salient portions, the film being produced according to the foregoing procedure in this example, is used as the substrate. For comparison, a mesoporous titanium oxide film not subjected to the formation of fine salient portions by the plasma etching, the film being produced according to the same protocol, is subjected to the same measurement.

Irrespective of which one of the substrates is used, a peak resulting from protonated bradykinin is observed at a ratio m/z of 1,060.2 in a spectrum. The S/N ratio of the spectrum is 862±272 in the case where the mesoporous titanium oxide film of the present invention having formed on its surface the structure having the multiple fine conical salient portions is used while the S/N ratio is 390±181 in the case of the mesoporous titanium oxide film having a flat surface on which no fine salient portions have been formed. The formation of the fine structure on the surface largely increases the S/N ratio of a mass spectrometry spectrum to be obtained. The foregoing results from a reduction in reflectance of the mesoporous titanium oxide film of the present invention by the formation of the multiple fine conical salient portions on the surface of the film.

The mesoporous titanium oxide film of the present invention having formed on its surface the structure having the multiple fine conical salient portions was left to stand in air having a low humidity (20% RH) for 1 week. After that, similar sample measurement was performed. As a result, the S/N ratios of the resultant spectra hardly reduced. Accordingly, it is confirmed that the substrate for mass spectrometry of the present invention is superior in stability to porous silicon.

EXAMPLE 38

Described in Example 38 is an example in which a fine structure is formed on a uniaxially oriented mesoporous titania structure film deposited onto a quartz glass substrate.

(38-1) Substrate Preparation

A quartz glass substrate whose surface has been subjected to solvent washing and UV/ozone washing is prepared, and a polymer film formed of a polyimide represented by the chemical formula (I) is formed on the substrate. The polymer film is subjected to a rubbing treatment to provide a polyimide oriented film.

Chemical formula (1)

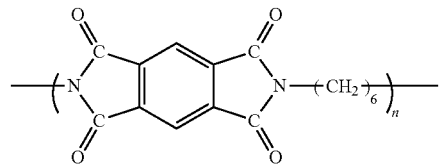

(38-2) Deposition of Titania Mesostructure Film
(38-2-1) A Sol Reaction Liquid is Produced by Mixing tetraisopropyl titanate, a surfactant, 1-butanol, hydrochloric acid, and water. Brij56 (trade name, manufactured by Sigma-Aldrich) is used as the surfactant, the mixing ratio (molar ratio) "tetraisopropyl titanate:surfactant:1-butanol: hydrochloric acid:water" is set to 1.0:0.15:29:1.5:5.5, and the reaction time is set to 3 hours.
(38-2-2) The sol reaction liquid produced in the step (38-2-1) is applied onto the polyimide oriented film obtained in the step (38-1) by a dip coating process to provide a uniaxially oriented titania mesostructure film. The wall portion of the uniaxially oriented titania mesostructure film is reinforced by the steam treatment of tetraethoxysilane.
(38-3) Transformation into Porous Body
A uniaxially oriented mesoporous titania film is obtained by performing baking with a muffle furnace at 400° C. for 4 hours to bake and remove the surfactant and the polyimide oriented film.

As a result of measurement with an X-ray diffraction apparatus, it is revealed that the mesoporous titania film has a structural period d value in its film thickness direction of 4 nm and cylindrical mesopores are oriented in a direction perpendicular to the rubbing direction. The $\Delta n$ of the film is 0.1.
(38-4) Plasma Etching
The uniaxially oriented mesoporous titania film is subjected to plasma etching with an ICP-type plasma etching apparatus and $C_3F_8$ as a reactive gas.

As a result, the following salient portions are formed on the surface of the uniaxially oriented mesoporous titania film: the average of the heights H is about 100 nm, the average interval p between the tips of the salient portions is 60 nm, the cross-sectional shape of the portions is substantially triangular, and the portions have an apex angle of about 40°. In addition, the distribution of the p is a normal distribution having a $\sigma$ of 14 nm and the ratio $\sigma/p$ is 0.23.

At this time, the entire phase plate has a film thickness T of about 550 nm and a retardation for a wavelength of 400 nm of 50 nm. The plate functions as a ⅛ wavelength plate for incident light having a wavelength of 400 nm. In addition, the plate has a reflectance in a perpendicular direction of about 0.4% and hence provides a high antireflection effect.

EXAMPLE 39

Described in Example 39 is an example in which a fine structure is formed on a uniaxially oriented mesoporous titania structure film deposited onto a quartz glass substrate.

A uniaxially oriented mesoporous titania structure film is obtained according to the same procedure as that of the steps (38-1) to (38-3) of Example 38.

The uniaxially oriented mesoporous titania film is subjected to plasma etching with an ICP-type plasma etching apparatus and $C_3F_8$ as a reactive gas. At this time, a long etching time is adopted as a condition so that the height H is higher than that of Example 38. As a result, the following salient portions are formed on the surface of the uniaxially oriented mesoporous titania film: the average of the heights H is about 200 nm, the average interval p between the tips of the salient portions is 70 nm, the cross-sectional shape of the portions is substantially triangular, and the portions have an apex angle of about 20°. In addition, the distribution of the p is a normal distribution having a $\sigma$ of 20 nm and the ratio $\sigma/p$ is 0.29.

At this time, the entire phase plate has a film thickness T of about 1,100 nm and a retardation for a wavelength of 400 nm of 100 nm. The plate functions as a ¼ wavelength plate for incident light having a wavelength of 400 nm. In addition, the plate has a reflectance in a perpendicular direction of about 0.2% and hence provides a high antireflection effect.

EXAMPLE 40

Described in Example 40 is an example in which a fine structure is formed on a uniaxially oriented mesoporous tin oxide structure film deposited onto a quartz glass substrate.
(40-1) Preparation of Substrate
A polyimide oriented film is obtained according to the same approach as that of the step (38-1) of Example 38.
(40-2) Deposition of Tin Oxide Mesostructure Film
(40-2-1)
A sol reaction liquid is produced by mixing tin chloride, a surfactant, ethanol, and water. Brij76 (trade name, manufactured by Sigma-Aldrich) is used as the surfactant, the mixing ratio (molar ratio) "tin chloride:surfactant:ethanol: water" is set to 3.6:1.0:127:20, and the reaction time is set to 30 minutes.
(40-2-2) The sol reaction liquid produced in the step (40-2-1) is applied onto the polyimide oriented film obtained in the step (40-1) by a dip coating process to provide a uniaxially oriented tin oxide mesostructure film. The wall portion of the uniaxially oriented tin oxide mesostructure film is reinforced by the steam treatment of tetraethoxysilane.
(40-3) Transformation into Porous Body
A uniaxially oriented mesoporous tin oxide film is obtained by performing baking with a muffle furnace at 400° C. for 4 hours to bake and remove the surfactant and the polyimide oriented film.

As a result of measurement with an X-ray diffraction apparatus, it is revealed that the mesoporous tin oxide film has a structural period d in its film thickness direction of 4 nm and cylindrical mesopores are oriented in a direction perpendicular to the rubbing direction. The $\Delta n$ of the film is 0.075.
(40-4) Plasma Etching
The uniaxially oriented mesoporous tin oxide film is subjected to plasma etching with an ICP-type plasma etching apparatus and $C_3F_8$ as a reactive gas.

As a result, the following salient portions are formed on the surface of the uniaxially oriented mesoporous tin oxide film: the average of the heights H is about 200 nm, the average interval p between the tips of the salient portions is 70 nm, the cross-sectional shape of the portions is substantially triangular, and the portions have an apex angle of about 20°. In addition, the distribution of the p is a normal distribution having a $\sigma$ of 22 nm and the ratio $\sigma/p$ is 0.31.

At this time, the entire phase plate has a film thickness T of about 770 nm and a retardation for a wavelength of 400 nm of 50 nm. The plate functions as a ⅛ wavelength plate for incident light having a wavelength of 400 nm. In addition, the plate has a reflectance in a perpendicular direction of about 0.1% and hence provides a high antireflection effect.

EXAMPLE 41

Described in Example 41 is an example in which a fine structure is formed on a uniaxially oriented mesoporous silica structure film deposited onto a quartz glass substrate.

(41-1) Preparation of Substrate

A polyimide oriented film is obtained according to the same approach as that of the step (38-1) of Example 38.

(41-2) Deposition of Silica Mesostructure Film (41-2-1)

A sol reaction liquid is produced by mixing tetraethoxysilane, a surfactant, 2-propanol, hydrochloric acid, and water. Brij56 (trade name, manufactured by Sigma-Aldrich) is used as the surfactant. The mixing ratio (molar ratio) "tetraethoxysilane:a surfactant:2-propanol:hydrochloric acid:water" is set to 1.0:0.080:17:0.0040:5.0, and the reaction time is set to 3 hours.

(41-2-2) The sol reaction liquid produced in the step (41-2-1) is applied onto the polyimide oriented film obtained in the step (41-1) by a dip coating process to provide a uniaxially oriented silica mesostructure thin film.

(41-3) Transformation into Porous Body

In the presence of trimethylchlorosilane, the uniaxially oriented mesostructure film obtained in the step (41-2) is held in an airtight container at 80° C. for 14 hours. After that, the substrate is immersed in ethanol to be sealed, and is then subjected to an extraction treatment at 80° C. for 8 hours. After that, the substrate is taken out and then its surface is washed with ethanol again. Thus, a uniaxially oriented mesoporous silica film is obtained.

As a result of measurement with an X-ray diffraction apparatus, it is revealed that the mesoporous silica film has a structural period d in its film thickness direction of 6 nm and cylindrical mesopores are oriented in a direction perpendicular to the rubbing direction. The Δn of the film is 0.031.

(41-4) Plasma Etching

The uniaxially oriented mesoporous silica film is subjected to plasma etching with an ICP-type plasma etching apparatus and $C_3F_8$ as a reactive gas. As a result, the following salient portions are formed on the surface of the uniaxially oriented mesoporous silica film: the average of the heights H is about 200 nm, the average interval p between the tips of the salient portions is 100 nm, the cross-sectional shape of the portions is substantially triangular, and the portions have an apex angle of about 30°. In addition, the distribution of the p is a normal distribution having a σ of 20 nm and the ratio σ/p is 0.2.

At this time, the entire phase plate has a film thickness T of about 1700 nm and a retardation for a wavelength of 400 nm of 50 nm. The plate functions as a ⅛ wavelength plate for incident light having a wavelength of 400 nm. In addition, the plate has a reflectance in a perpendicular direction of about 0.6% and hence provides a high antireflection effect.

EXAMPLE 42

A structure having multiple fine salient portions is formed on a mesoporous silica film deposited onto a quartz glass substrate by the same approach as that of Example 2. At this time, an adsorption and desorption isotherm using a nitrogen gas shows the type IV behavior. In addition, a mesoporous silica film having the same composition and in a state where no salient portions have been formed is optically evaluated by ellipsometry. As a result, its porosity is estimated to be 40%. Accordingly, in a structure formed of mesoporous silica in a state where salient portions have been formed as well, the porosity in the salient portions is estimated to be about 40%.

A protective layer formed of silicon oxide is formed on the structure having the multiple fine salient portions by a plasma-assisted atomic layer lamination process. Specifically, the structure is placed in a reaction vessel evacuated to a vacuum. After that, the steam of tetraethoxysilane is introduced into the reaction vessel to establish a state where tetraethoxysilane adsorbs to the surface of the salient portion. Next, the inside of the reaction vessel is purged with an argon gas. After that, a radiofrequency current is allowed to flow through a coil in the reaction vessel in a state where an oxygen gas is introduced into the reaction vessel. Thus, the plasma of oxygen and argon is produced. A radical component produced as a result of the foregoing reacts with tetraethoxysilane adsorbing to the surface of the salient portion to finally form an extremely thin film layer formed of silicon oxide on the surface of the salient portion. The series of processes is repeated 150 times to provide a structure having, on its surface, a protective layer formed of silicon oxide and having a thickness of 5 nm.

An adsorption and desorption isotherm using a nitrogen gas for the structure having the protective layer formed of silicon oxide on the surface of each salient portion shows the type II behavior. The foregoing shows that the pores in the salient portion are blocked with the protective layer on the surface of the salient portion in a substantially complete manner. In addition, the porosity of the layer formed of silicon oxide forming the protective layer is estimated to be substantially 0%.

EXAMPLE 43

A structure is formed by the same approach as that of Example 7 involving forming multiple fine salient portions on a mesoporous silica film deposited onto a quartz glass substrate and then introducing titania into pores. At this time, an adsorption and desorption isotherm using a nitrogen gas shows the type IV behavior, though hysteresis at the time of adsorption and desorption becomes small as compared with that before the filling.

Next, the substrate having the structure on its surface is immersed in a 0.5-wt % aqueous solution of aluminum phosphate [$Al(H_2PO_4)_3$] and then pulled at a pulling rate of 3 mm/s. After that, a protective layer formed of aluminum phosphate is formed on the surface of the salient portion by subjecting the substrate to a heat treatment with a drier at 60° C. for 1 hour. At this time, the thickness of the protective layer formed of aluminum phosphate is about 5 nm. An adsorption and desorption isotherm using a nitrogen gas for the structure having the protective layer formed of aluminum phosphate on the surface of the salient portion shows the type II behavior. The foregoing shows that the pores in each salient portion are blocked with the protective layer on the surface of the salient portion in a substantially complete manner.

EXAMPLE 44

A structure is formed by the same approach as that of Example 7 involving forming multiple fine salient portions on a mesoporous silica film deposited onto a quartz glass substrate and then introducing titania into pores. At this time, an adsorption and desorption isotherm using a nitrogen gas shows type IV behavior, though hysteresis at the time of adsorption and desorption becomes small as compared with that before the filling.

Additionally repeating the same process as the introduction of titania three times for the structure provides a structure in which the insides of the pores are filled with titania and the surface of the salient portion is covered with a protective layer formed of titania and having a thickness of 5 nm. An adsorption and desorption isotherm using a nitrogen gas for the structure having the protective layer formed of titania on the surface of the salient portion shows the type II behavior. The foregoing shows that mesopores in the salient portion are blocked with the protective layer on the surface of the salient portion in a substantially complete manner. In addition, the porosity of the layer formed of titania forming the protective layer is estimated to be substantially 0%.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-150232, filed Jul. 4, 2012, and 2013-105491, filed May 17, 2013 which are hereby incorporated by reference herein in their entirety.

The invention claimed is:

1. An optical member, comprising:
a substrate; and
an antireflection film disposed on a surface of the substrate,
wherein the antireflection film comprises conical portions on a surface thereof,
wherein the conical portions comprise a mesostructure including mesopores,
wherein an inorganic material having a refractive index different from that of a material of a wall portion forming the mesopores is present inside the mesopores,
wherein a difference in refractive index between the antireflection film including the inorganic material and the substrate is smaller than a difference in refractive index between the antireflection film not including the inorganic material and the substrate, and
wherein $0.1<\sigma/p<0.5$, where p is an average interval between tips of the conical portions adjacent to each other and $\sigma$ is a standard deviation of a distribution of intervals between the tips.

2. The optical member according to claim 1, wherein a ratio H/D is 1/2 or more, where D is a length of a bottom line of the conical portions and H is a height of the conical portions.

3. The optical member according to claim 1, wherein the conical portions have a height of 50 nm or more.

4. The optical member according to claim 1, wherein p is 400 nm or less.

5. The optical member according to claim 1, wherein the inorganic material comprises titanium oxide.

6. The optical member according to claim 1, wherein the mesopores are periodically arranged, and
wherein the mesostructure shows a diffraction peak corresponding to a structural period of 1.0 nm or more in X-ray diffraction analysis.

7. The optical member according to claim 1, wherein the wall portion forming the mesopores is formed with silicon oxide.

8. An optical member, comprising:
a substrate; and
an antireflection film disposed on a surface of the substrate,
wherein the antireflection film comprises salient portions on a surface thereof,
wherein the salient portions have such a shape that an area of a cross section when the salient portions are cut by a plane perpendicular to a direction from a bottom of the salient portions to a tip thereof reduces along the direction,
wherein the salient portions comprise a mesostructure including mesopores,
wherein a metal element is present at the tip of the salient portions,
wherein a ratio H/D is 2.0 or more, where D is a length of a bottom line of the salient portions and H is a height of the salient portions,
wherein an inorganic material having a refractive index different from that of a material of a wall portion forming the mesopores is present inside the mesopores,
wherein a difference in refractive index between the antireflection film including the inorganic material and the substrate is smaller than a difference in refractive index between the antireflection film not including the inorganic material and the substrate, and
wherein $0.1<\sigma/p<0.5$, where p is an average interval between tips of the salient portions adjacent to each other and $\sigma$ is a standard deviation of a distribution of intervals between the tips.

9. The optical member according to claim 8,
wherein conical surfaces of the salient portions adjacent to each other are merged with each other, and
wherein positions where the conical surfaces are merged with each other are present in an antireflection film side with respect to the surface of the substrate, and a distance between a portion where the conical surfaces are merged with each other and the substrate is not constant.

10. The optical member according to claim 1, wherein the mesopores have a cylindrical shape and are oriented parallel to the substrate.

11. The optical member according to claim 1, wherein the antireflection film comprises a layer in contact with the substrate,
wherein the layer comprises the mesopores, and
wherein $0 \leq |na-nb| \leq 0.05$, where na is a refractive index of the substrate and nb is an effective refractive index of the layer.

12. The optical member according to claim 1, wherein the inorganic material has a band gap of 2.5 eV to 10 eV.

13. The optical member according to claim 1, wherein the wall portion forming the mesopores comprises a material having a band gap of 2.5 eV to 10 eV.

14. The optical member according to claim 1, wherein a refractive index of the inorganic material is higher than that of the material of the wall portion.

15. The optical member according to claim 1, p is 100 nm or less.

16. The optical member according to claim 1, wherein the mesopores, from a tip of the conical portions to a bottom portion of the conical portions, have a uniform diameter.

17. The optical member according to claim 1, wherein the conical portions have, on a surface thereof, a protective layer having a porosity smaller than that of the conical portions.

18. The optical member according to claim 17, wherein the protective layer comprises the inorganic material.

19. The optical member according to claim 1, wherein conical surfaces of the conical portions adjacent to each other are merged with each other, and
wherein positions where the conical surfaces are merged each other are present in an antireflection film side with respect to the surface of the substrate, and a distance between a portion where the conical surfaces are merged with each other and the substrate is not constant.

20. The optical member according to claim 1, wherein p and σ are determined by calculating distances between respective said tips in twenty electron microscope photographs with a field of view of 1 μm taken impartially in a region where the mesostructure has been formed.

21. The optical member according to claim 1, wherein at least a part of the wall portion of the mesopores is chemically modified with a hydrophobic functional group.

22. The optical member according to claim 21, wherein the at least the part of the wall portion modified with the hydrophobic functional group has a contact angle with water of greater than 90°.

23. The optical member according to claim 21, wherein the hydrophobic functional group comprises at least one selected from the group consisting of formulae (a) to (g):

(1) n = 1

(a)

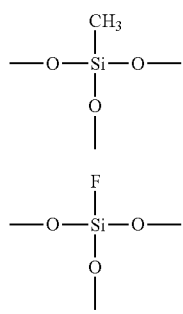

(b)

-continued (2) n = 2

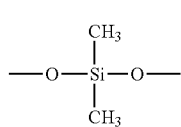

(c)

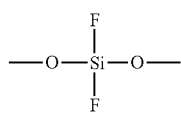

(d)

(3) n = 3

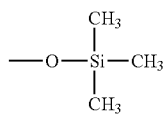

(e)

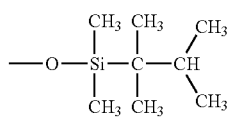

(f)

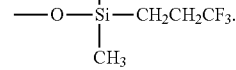

(g)

* * * * *